US011460678B2

(12) United States Patent
Wang et al.

(10) Patent No.: US 11,460,678 B2
(45) Date of Patent: Oct. 4, 2022

(54) PHOTOGRAPHING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Kuo-Jui Wang, Taichung (TW); Cheng-Chen Lin, Taichung (TW); Wei-Yu Chen, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 357 days.

(21) Appl. No.: 16/838,772

(22) Filed: Apr. 2, 2020

(65) Prior Publication Data
US 2021/0199933 A1  Jul. 1, 2021

(30) Foreign Application Priority Data

Dec. 25, 2019  (TW) .................................. 108147636

(51) Int. Cl.
*G02B 9/64* (2006.01)
*G02B 13/18* (2006.01)
*G02B 13/00* (2006.01)

(52) U.S. Cl.
CPC .............. *G02B 13/18* (2013.01); *G02B 9/64* (2013.01); *G02B 13/0045* (2013.01)

(58) Field of Classification Search
CPC . G02B 9/64; G02B 9/00; G02B 13/18; G02B 13/0045; G02B 13/002; G02B 13/0015; G02B 13/001; G02B 13/00
USPC ....................................................... 359/708
See application file for complete search history.

(56) References Cited

U.S. PATENT DOCUMENTS

| | | | |
|---|---|---|---|
| 9,547,155 B2 | 1/2017 | Liao | |
| 10,295,790 B2* | 5/2019 | Lai | G02B 27/0025 |
| 10,394,002 B2* | 8/2019 | Huang | G02B 9/64 |
| 10,481,368 B2* | 11/2019 | Chen | G02B 3/04 |
| 10,606,035 B2* | 3/2020 | Chen | G02B 7/09 |

(Continued)

FOREIGN PATENT DOCUMENTS

| | | |
|---|---|---|
| CN | 104749748 A | 7/2015 |
| CN | 107065141 A | 7/2015 |

(Continued)

OTHER PUBLICATIONS

IN Office Action dated Aug. 17, 2021 as received in Application No. 202034023790.

*Primary Examiner* — William R Alexander
(74) *Attorney, Agent, or Firm* — Maschoff Brennan

(57) ABSTRACT

A photographing optical lens assembly includes seven lens elements, which are, in order from an object side to an image side along an optical path: a first lens element, a second lens element, a third lens element, a fourth lens element, a fifth lens element, a sixth lens element and a seventh lens element. The first lens element has negative refractive power. The third lens element with positive refractive power has an image-side surface being convex in a paraxial region thereof. The fifth lens element has an object-side surface being concave in a paraxial region thereof. The sixth lens element has an object-side surface being convex in a paraxial region thereof. The seventh lens element has an image-side surface being concave in a paraxial region thereof and having at least one convex critical point in an off-axis region thereof.

33 Claims, 36 Drawing Sheets

(56) References Cited

U.S. PATENT DOCUMENTS

| | | | |
|---|---|---|---|
| 10,656,393 B2* | 5/2020 | Yang | G02B 13/18 |
| 10,908,393 B2 | 2/2021 | Chen | |
| 2015/0185441 A1* | 7/2015 | Liao | G02B 9/64 |
| | | | 359/708 |
| 2018/0003926 A1* | 1/2018 | Huang | G02B 9/00 |
| 2018/0011297 A1* | 1/2018 | Lai | G02B 27/0025 |
| 2018/0031807 A1 | 2/2018 | Chen et al. | |
| 2018/0348484 A1* | 12/2018 | Chen | G02B 7/09 |
| 2019/0049701 A1* | 2/2019 | Chen | G02B 13/18 |
| 2019/0154974 A1 | 5/2019 | Chen | |
| 2019/0271831 A1 | 9/2019 | Hsu et al. | |
| 2019/0285863 A1* | 9/2019 | Yang | G02B 13/0045 |
| 2020/0003992 A1 | 1/2020 | Fan et al. | |

FOREIGN PATENT DOCUMENTS

| | | | |
|---|---|---|---|
| CN | 108919463 A | 11/2018 | |
| CN | 108919465 A | 11/2018 | |
| CN | 108957692 A | 12/2018 | |
| CN | 109270662 A | 1/2019 | |
| CN | 109298515 A | 2/2019 | |
| CN | 109375351 A | 2/2019 | |
| TW | 201939093 A | 10/2019 | |
| WO | 2018010433 A1 | 1/2018 | |
| WO | 2018056555 A1 | 3/2018 | |

* cited by examiner

PHOTOGRAPHING OPTICAL LENS ASSEMBLY, IMAGE CAPTURING UNIT AND ELECTRONIC DEVICE

RELATED APPLICATIONS

This application claims priority to Taiwan Application 108147636, filed on Dec. 25, 2019, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element.

The first lens element has negative refractive power. The third lens element with positive refractive power has an image-side surface being convex in a paraxial region thereof. The fifth lens element has an object-side surface being concave in a paraxial region thereof. The sixth lens element has an object-side surface being convex in a paraxial region thereof. The seventh lens element has an image-side surface being concave in a paraxial region thereof, and the image-side surface of the seventh lens element has at least one convex critical point in an off-axis region thereof.

When a sum of axial distances between each of all adjacent lens elements of the photographing optical lens assembly is ΣAT, an axial distance between the first lens element and the second lens element is T12, an axial distance between the second lens element and the third lens element is T23, an axial distance between the sixth lens element and the seventh lens element is T67, a maximum effective radius of an object-side surface of the first lens element is Y11, a maximum image height of the photographing optical lens assembly is ImgH, and an axial distance between the object-side surface of the first lens element and an image surface is TL, the following conditions are satisfied:

$1.0 < \Sigma AT/(T12+T67) < 3.75$;

$Y11/ImgH < 1.40$;

$TL/ImgH < 3.0$; and $1.50 < T12/T23$.

According to another aspect of the present disclosure, a photographing optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element.

The first lens element has negative refractive power. The third lens element with positive refractive power has an image-side surface being convex in a paraxial region thereof. The fifth lens element with negative refractive power has an object-side surface being concave in a paraxial region thereof. The sixth lens element has positive refractive power. The seventh lens element has an image-side surface being concave in a paraxial region thereof, and the image-side surface of the seventh lens element has at least one convex critical point in an off-axis region thereof.

When a sum of axial distances between each of all adjacent lens elements of the photographing optical lens assembly is ΣAT, an axial distance between the first lens element and the second lens element is T12, an axial distance between the sixth lens element and the seventh lens element is T67, a maximum effective radius of an object-side surface of the first lens element is Y11, a maximum image height of the photographing optical lens assembly is ImgH, and an axial distance between the object-side surface of the first lens element and an image surface is TL, the following conditions are satisfied:

$1.0 < \Sigma AT/(T12+T67) < 1.80$;

$Y11/ImgH < 1.40$; and $TL/ImgH < 3.0$.

According to another aspect of the present disclosure, a photographing optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element.

The first lens element has negative refractive power. The third lens element with positive refractive power has an object-side surface being convex in a paraxial region thereof and an image-side surface being convex in a paraxial region thereof. The fifth lens element has negative refractive power. The sixth lens element has positive refractive power. The seventh lens element has an image-side surface being concave in a paraxial region thereof, and the image-side surface of the seventh lens element has at least one convex critical point in an off-axis region thereof.

When a sum of axial distances between each of all adjacent lens elements of the photographing optical lens assembly is ΣAT, an axial distance between the first lens element and the second lens element is T12, an axial distance between the sixth lens element and the seventh lens element is T67, a maximum effective radius of an object-side surface of the first lens element is Y11, a maximum image height of the photographing optical lens assembly is ImgH, an axial distance between the object-side surface of the first lens element and an image surface is TL, a curvature radius of an object-side surface of the sixth lens element is R11, and a curvature radius of an image-side surface of the sixth lens element is R12, the following conditions are satisfied:

$1.0 < \Sigma AT/(T12+T67) < 1.80;$ $Y11/ImgH < 1.40;$ $TL/ImgH < 3.0;$ and $(R11+R12)/(R11-R12) < 0.$ According to another aspect of the present disclosure, an image capturing unit includes one of the aforementioned photographing optical lens assemblies and an image sensor, wherein the image sensor is disposed on the image surface of the photographing optical lens assembly.

According to another aspect of the present disclosure, an electronic device includes the aforementioned image capturing unit.

According to another aspect of the present disclosure, an electronic device includes at least two image capturing units facing the same direction. The at least two image capturing units includes the aforementioned image capturing unit, and maximum fields of view of the at least two image capturing units differ by at least 30 degrees.

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element.

Figure 33:
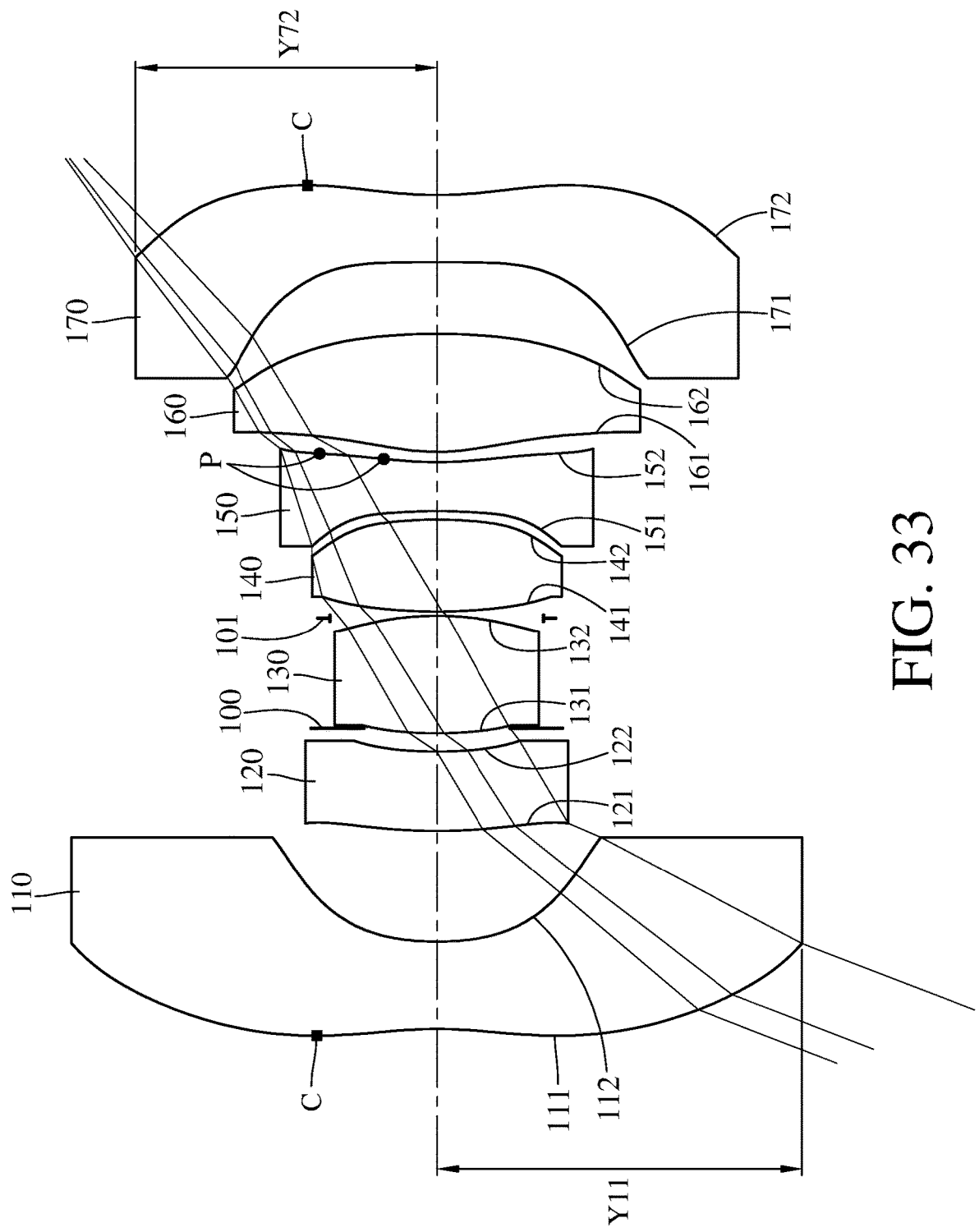
FIG. 33 shows a schematic view of Y11 and Y72 and several inflection points and critical points of the lens elements according to the 1st embodiment of the present disclosure.

The first lens element has negative refractive power. Therefore, it is favorable for gathering light rays at wide field of view in the photographing optical lens assembly. The first lens element can have an object-side surface being concave in a paraxial region thereof and having at least one convex critical point in an off-axis region thereof. Therefore, the overall shape of the first lens element can be configured in accordance with the dimensions restriction of a small camera module, which is favorable for preventing the shape of the first lens element from being overly protruding, providing a wider view angle with sufficient incident light. Please refer to FIG. 33, which shows a schematic view of non-axial critical points C of the first lens element 110 and the seventh lens element 170 according to the 1st embodiment of the present disclosure. The non-axial critical points of the first and seventh lens elements in FIG. 33 are only exemplary. Lens elements other than the first and seventh lens elements in the embodiments of the present disclosure may also have one or more non-axial critical points.

The third lens element has positive refractive power. Therefore, it is favorable for light convergence while reducing the total track length of the photographing optical lens assembly so as to achieve compactness. The third lens element can have an object-side surface being convex in a paraxial region thereof and has an image-side surface being convex in a paraxial region thereof. Therefore, it is favorable for further enhancing light convergence of the third lens element.

The fifth lens element can have negative refractive power. Therefore, it is favorable for correcting aberrations. The fifth lens element can have an object-side surface being concave in a paraxial region thereof. Therefore, it is favorable for correcting spherical aberration and astigmatism so as to improve image quality. The fifth lens element can have an image-side surface having at least one critical point in an off-axis region thereof. Therefore, it is favorable for correcting off-axis aberrations so as to increase relative illuminance on an image surface. Moreover, the image-side surface of the fifth lens element can have at least two inflection points in the off-axis region thereof. Moreover, the image-side surface of the fifth lens element can have at least two critical points in the off-axis region thereof. Please refer to FIG. 33, which shows a schematic view of two non-axial inflection points P of the image-side surface 152 of the fifth lens element 150 according to the 1st embodiment of the present disclosure. The non-axial inflection points of the fifth lens element in FIG. 33 are only exemplary. Besides the image-side surface of the fifth lens element, the other lens surfaces in the embodiments of the present disclosure may also have one or more non-axial inflection points.

The sixth lens element can have positive refractive power. Therefore, it is favorable for reducing the total track length of the photographing optical lens assembly. The sixth lens element can have an object-side surface being convex in a paraxial region thereof and having at least one concave critical point in an off-axis region thereof. Therefore, it is favorable for correcting aberrations at the image periphery so as to increase relative illuminance on the image surface.

The seventh lens element can have an object-side surface being convex in a paraxial region thereof, and the seventh lens element has an image-side surface being concave in a paraxial region thereof. Therefore, it is favorable for reducing the back focal length of the photographing optical lens assembly. The object-side surface of the seventh lens element can have at least one concave critical point in an off-axis region thereof, and the image-side surface of the seventh lens element has at least one convex critical point in an off-axis region thereof. Therefore, it is favorable for correcting the Petzval sum to flatten the image surface and correcting off-axis aberrations.

When a sum of axial distances between each of all adjacent lens elements of the photographing optical lens assembly is $\Sigma AT$, an axial distance between the first lens element and the second lens element is T12, and an axial distance between the sixth lens element and the seventh lens element is T67, the following condition is satisfied: $1.0 < \Sigma AT/(T12+T67) < 3.75$. Therefore, it is favorable for providing a proper space between the first and second elements so as to obtain a wide angle configuration, and the arrangement of the axial distance between the sixth and seventh lens elements is favorable for reducing the total track length of the photographing optical lens assembly. Moreover, the following condition can also be satisfied: $1.0 < \Sigma AT/(T12+T67) < 3.0$. Moreover, the following condition can also be satisfied: $1.0 < \Sigma AT/(T12+T67) < 2.0$. Moreover, the following condition can also be satisfied: $1.0 < \Sigma AT/(T12+T67) < 1.80$. Moreover, the following condition can also be satisfied: $1.0 < \Sigma AT/(T12+T67) < 1.60$.

When a maximum effective radius of the object-side surface of the first lens element is Y11, and a maximum image height of the photographing optical lens assembly (half of a diagonal length of an effective photosensitive area of an image sensor) is ImgH, the following condition is satisfied: $Y11/ImgH < 1.40$. Therefore, it is favorable for further controlling the radial dimension of the first lens element so as to reduce the size of the photographing optical lens assembly. Moreover, the following condition can also be satisfied: $0.50 < Y11/ImgH < 1.25$. Moreover, the following condition can also be satisfied: $0.60 < Y11/ImgH < 1.05$. Please refer to FIG. 33, which shows a schematic view of Y11 according to the 1st embodiment of the present disclosure.

When an axial distance between the object-side surface of the first lens element and the image surface is TL, and the maximum image height of the photographing optical lens assembly is ImgH, the following condition is satisfied: $TL/ImgH < 3.0$. Therefore, it is favorable for balancing among the field of view, compactness and manufacturing feasibility of the photographing optical lens assembly. Moreover, the following condition can also be satisfied: $0.80 < TL/ImgH < 2.40$.

When the axial distance between the first lens element and the second lens element is T12, and an axial distance between the second lens element and the third lens element is T23, the following condition can be satisfied: $1.50 < T12/T23$. Therefore, the arrangement of the second lens element is favorable for providing sufficient space around the first lens element so as to obtain a wide field of view configuration. Moreover, the following condition can also be satisfied: $2.5 < T12/T23 < 20.0$. Moreover, the following condition can also be satisfied: $3.0 < T12/T23 < 15.0$.

When a curvature radius of the object-side surface of the sixth lens element is R11, and a curvature radius of an image-side surface of the sixth lens element is R12, the following condition can be satisfied: $(R11+R12)/(R11-R12) < 0$. Therefore, the surface shape of the sixth lens element is favorable for having a short back focal length and large image height in the photographing optical lens assembly. Moreover, the following condition can also be satisfied: $-2.0 < (R11+R12)/(R11-R12) < 0$.

When a curvature radius of the object-side surface of the first lens element is R1, and a curvature radius of an image-side surface of the first lens element is R2, the following condition can be satisfied: $-1.50 < (R1+R2)/(R1-R2) < 0.75$. Therefore, it is favorable for the overall shape of the first lens element to be configured in accordance with the dimensions restriction of a small camera module so as to prevent the shape of the lens element from being overly protruding while achieving a wide view angle with sufficient incident light.

When a focal length of the first lens element is f1, a focal length of the second lens element is f2, a focal length of the third lens element is f3, a focal length of the fourth lens element is f4, a focal length of the fifth lens element is f5, and a focal length of the sixth lens element is f6, the following conditions can be satisfied: $|f1/f2| < 1.0$; $|f3/f2| < 1.0$; $|f4/f2| < 1.0$; $|f5/f2| < 1.0$; and $|f6/f2| < 1.0$. Therefore, the refractive power of the second lens element is favorable for retrieving light in the photographing optical lens assembly while avoiding excessive stray light from overly curved lens surfaces.

When an axial distance between an object-side surface of the second lens element and the image-side surface of the sixth lens element is Dr3r12, the axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following condition can be satisfied: $4.0 < Dr3r12/(T23+T34+T45+T56)$. Therefore, it is favorable for preventing the distances between adjacent lens elements from being overly large or small so as to improve space utilization.

When an f-number of the photographing optical lens assembly is Fno, the following condition can be satisfied: $1.20 < Fno < 2.60$. Therefore, it is favorable for providing sufficient incident light so as to improve image resolution.

When a maximum field of view of the photographing optical lens assembly is FOV, the following condition can be satisfied: $100 [deg.] < FOV < 160 [deg.]$. Therefore, it is favorable for achieving a wide view angle.

When an Abbe number of the second lens element is V2, an Abbe number of the fifth lens element is V5, and an Abbe number of the seventh lens element is V7, the following condition can be satisfied: $30 < V2+V5+V7 < 85$. Therefore, it is favorable for correcting chromatic aberration.

When a maximum value among refractive indices of all lens elements of the photographing optical lens assembly is Nmax, the following condition can be satisfied: $Nmax \leq 1.73$. Therefore, a proper selection of materials of the lens elements is favorable for controlling the refractive power of each lens element so as to prevent excessive correction and thus reduce aberrations.

When the Abbe number of the seventh lens element is V7, the following condition can be satisfied: $V7 < 30$. Therefore, it is favorable for correcting chromatic aberration at the image side of the photographing optical lens assembly.

When a maximum effective radius of the image-side surface of the seventh lens element is Y72, and a focal length of the photographing optical lens assembly is f, the following condition can be satisfied: $1.0 < Y72/f < 2.0$. Therefore, it is favorable for enlarging the optically effective area of the seventh lens element so as to further increase illuminance on the peripheral region of the image surface. Please refer to FIG. 33, which shows a schematic view of Y72 according to the 1st embodiment of the present disclosure.

When a central thickness of the second lens element is CT2, and an axial distance between the image-side surface of the seventh lens element and the image surface is BL, the following condition can be satisfied: $0.50 < CT2/BL < 1.50$. Therefore, it is favorable for further reducing the back focal length so as to further reduce the size of the photographing optical lens assembly.

When an Abbe number of the first lens element is V1, the Abbe number of the second lens element is V2, an Abbe number of the third lens element is V3, an Abbe number of the fourth lens element is V4, the Abbe number of the fifth lens element is V5, an Abbe number of the sixth lens element is V6, the Abbe number of the seventh lens element is V7, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, and a refractive index of the i-th lens element is Ni, at least two lens elements of the photographing optical lens assembly can satisfy the following condition: $5.0 < Vi/Ni < 12.0$, wherein $i=1, 2, 3, 4, 5, 6$ or $7$. Therefore, it is favorable for enhancing chromatic aberration corrections. Moreover, at least three lens elements of the photographing optical lens assembly can also satisfy the following condition: $5.0 < Vi/Ni < 12.0$, wherein $i=1, 2, 3, 4, 5, 6$ or $7$.

When the maximum effective radius of the image-side surface of the seventh lens element is Y72, and the axial distance between the image-side surface of the seventh lens element and the image surface is BL, the following condition can be satisfied: $1.5 < Y72/BL < 5.0$. Therefore, it is favorable for further reducing the back focal length so as to reduce the total track length of the photographing optical lens assembly.

When the maximum effective radius of the object-side surface of the first lens element is Y11, and the maximum effective radius of the image-side surface of the seventh lens element is Y72, the following condition can be satisfied: $0.50 < Y11/Y72 < 1.30$. Therefore, it is favorable for controlling the dimensions of the first lens element so as to achieve a compact photographing optical lens assembly.

When the focal length of the sixth lens element is f6, and a focal length of the seventh lens element is f7, the following condition can be satisfied: $f6/f7 < 0.30$. Therefore, it is favorable for balancing the refractive power at the image side of the photographing optical lens assembly so as to prevent aberration over-corrections.

According to the present disclosure, the aforementioned features and conditions can be utilized in numerous combinations so as to achieve corresponding effects.

According to the present disclosure, the lens elements of the photographing optical lens assembly can be made of either glass or plastic material. When the lens elements are made of glass material, the refractive power distribution of the photographing optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the photographing optical lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing optical lens assembly, based on the corresponding image sensor, can be flat or curved, especially a curved surface being concave facing towards the object side of the photographing optical lens assembly.

According to the present disclosure, an image correction unit, such as a field flattener, can be optionally disposed between the lens element closest to the image side of the photographing optical lens assembly and the image surface on the imaging optical path for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 34:
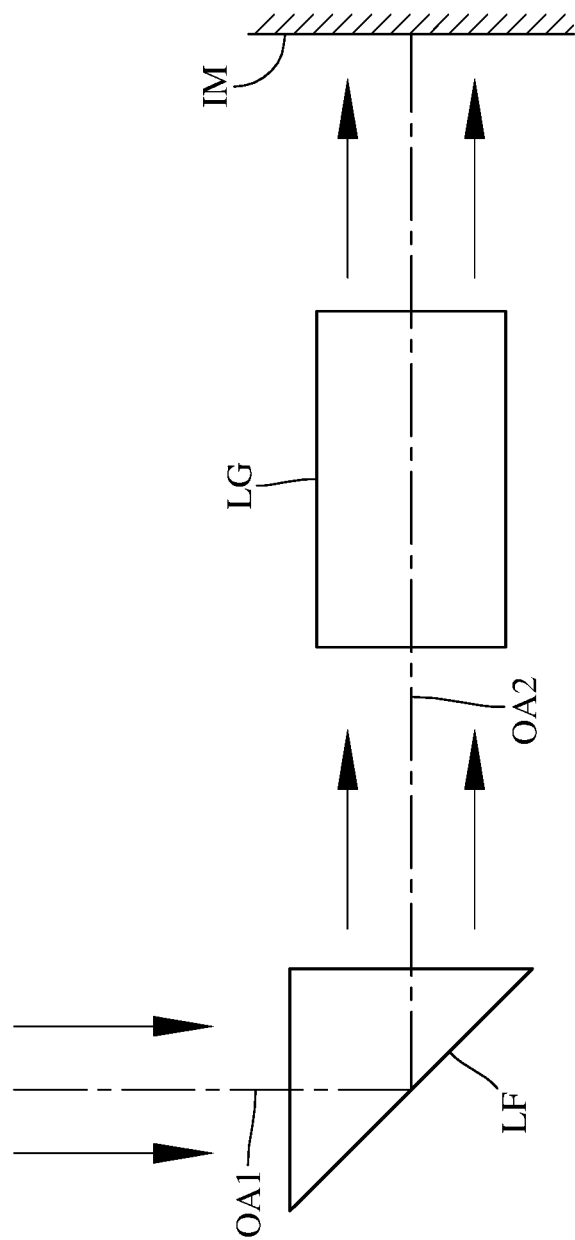
FIG. 34 shows a schematic view of a configuration of a light-folding element in a photographing optical lens assembly according to one embodiment of the present disclosure.
Figure 35:
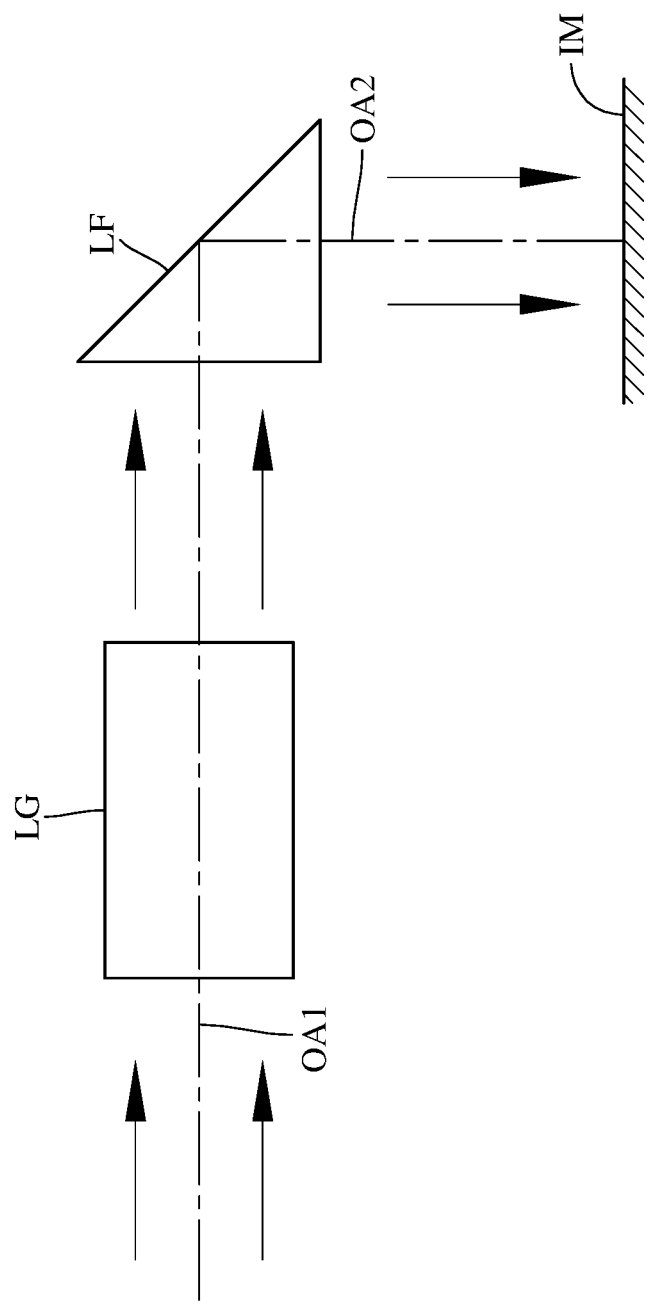
FIG. 35 shows a schematic view of another configuration of a light-folding element in a photographing optical lens assembly according to one embodiment of the present disclosure.
Figure 36:
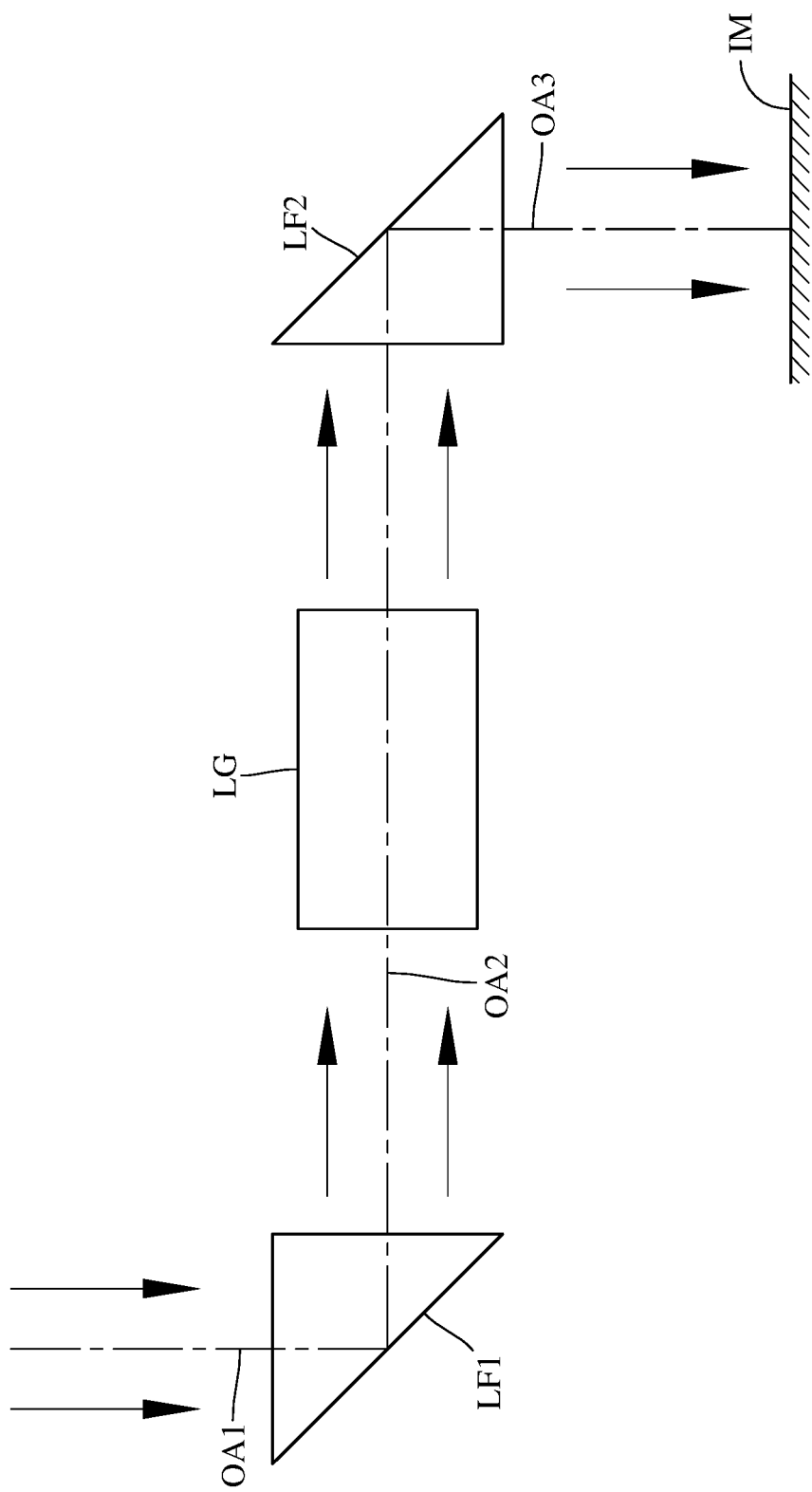
FIG. 36 shows a schematic view of a configuration of two light-folding elements in a photographing optical lens assembly according to one embodiment of the present disclosure.

According to the present disclosure, at least one light-folding element, such as a prism or a mirror, can be optionally disposed between an imaged object and the image surface on the imaging optical path, such that the photographing optical lens assembly can be more flexible in space arrangement, and therefore the dimensions of an electronic device is not restricted by the total track length of the photographing optical lens assembly. Specifically, please refer to FIG. 34 and FIG. 35. FIG. 34 shows a schematic view of a configuration of a light-folding element in a photographing optical lens assembly according to one embodiment of the present disclosure, and FIG. 35 shows a schematic view of another configuration of a light-folding element in a photographing optical lens assembly according to one embodiment of the present disclosure. In FIG. 34 and FIG. 35, the photographing optical lens assembly can have, in order from an imaged object (not shown in figure) to an image surface IM along an optical path, a first optical axis OA1, a light-folding element LF and a second optical axis OA2. The light-folding element LF can be disposed between the imaged object and a lens group LG of the photographing optical lens assembly as shown in FIG. 34 or disposed between a lens group LG of the photographing optical lens assembly and the image surface IM as shown in FIG. 35. Furthermore, please refer to FIG. 36, which shows a schematic view of a configuration of two light-folding elements in a photographing optical lens assembly according to one embodiment of the present disclosure. In FIG. 36, the photographing optical lens assembly can have, in order from an imaged object (not shown in figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the photographing optical lens assembly, and the second light-folding element LF2 is disposed between the lens group LG of the photographing optical lens assembly and the image surface IM. The photographing optical lens assembly can be optionally provided with three or more light-folding elements, and the present disclosure is not limited to the type, amount and position of the light-folding elements of the embodiments disclosed in the aforementioned figures.

According to the present disclosure, the photographing optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens assembly and thereby provides a wider field of view for the same.

According to the present disclosure, the photographing optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
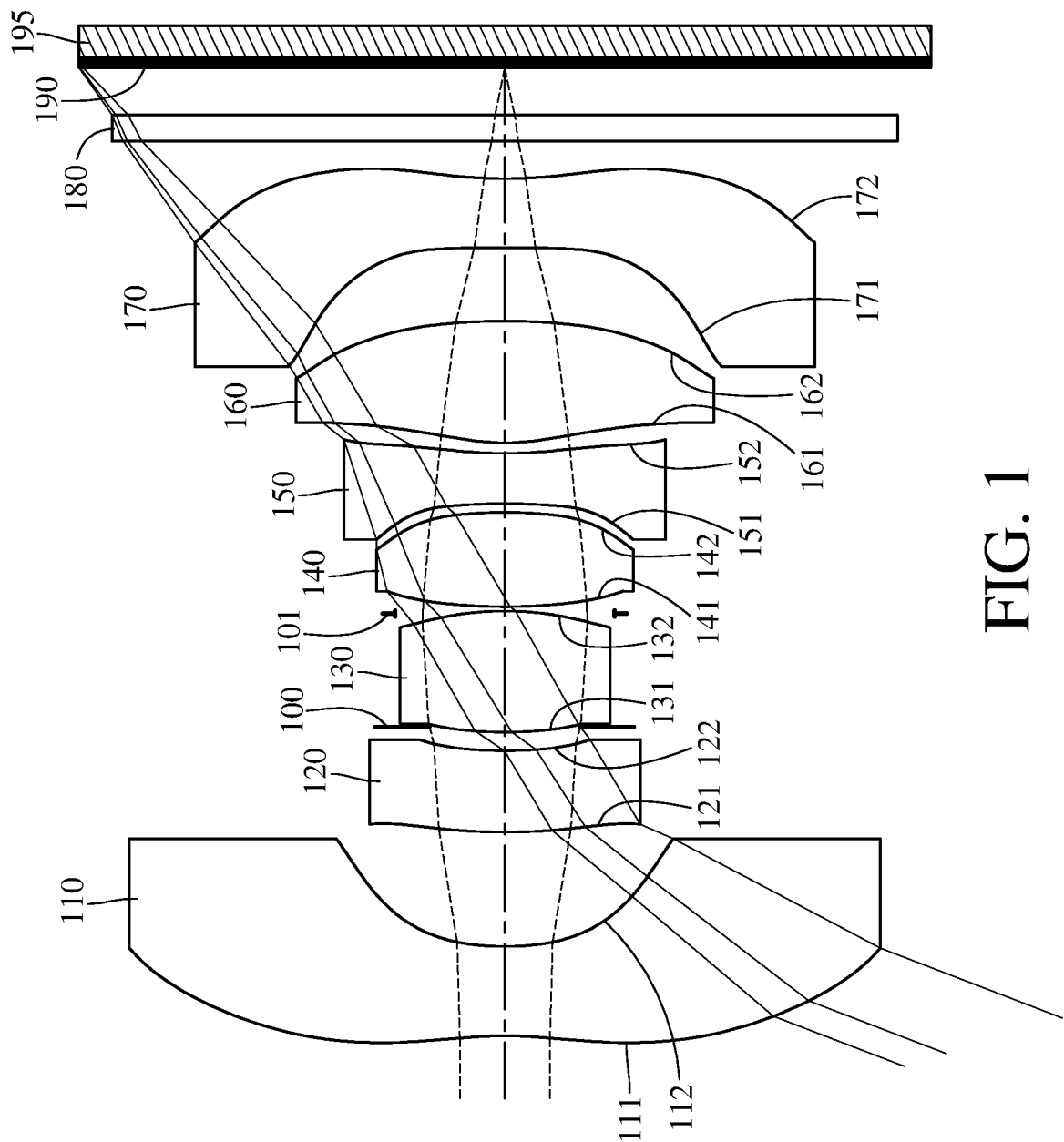
FIG. 1 is a schematic view of an image capturing unit according to the 1st embodiment of the present disclosure.
Figure 2:
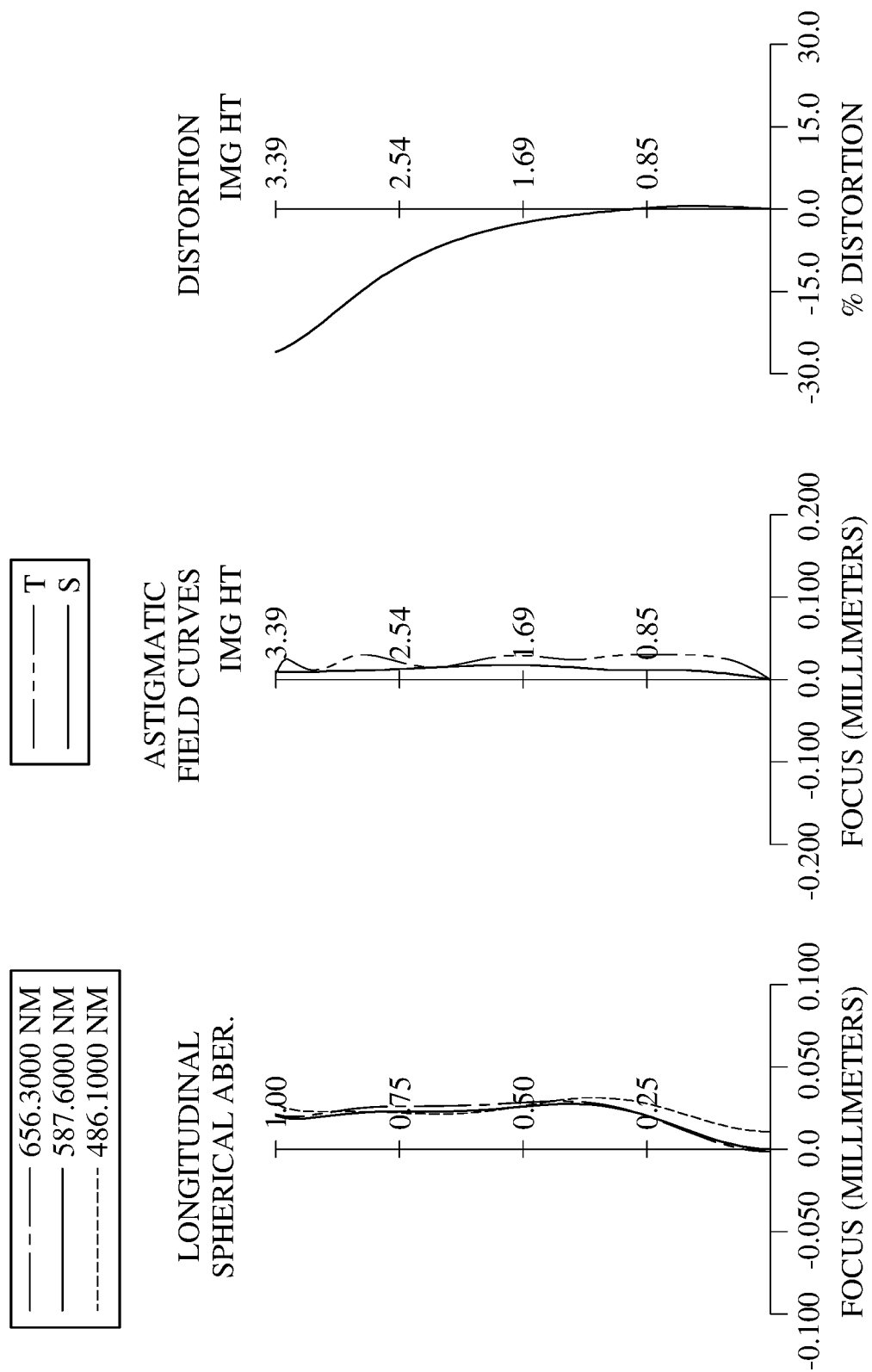
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 195. The photographing optical lens assembly includes, in order from an object side to an image side along an optical path, a first lens element 110, a second lens element 120, an aperture stop 100, a third lens element 130, a stop 101, a fourth lens element 140, a fifth lens element 150, a sixth lens element 160, a seventh lens element 170, an IR-cut filter 180 and an image surface 190. The photographing optical lens assembly includes seven lens elements (110, 120, 130, 140, 150, 160 and 170) with no additional lens element disposed between each of the adjacent seven lens elements.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has at least one convex critical point in an off-axis region thereof.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least two inflection points in an off-axis region thereof.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric.

The seventh lens element 170 with negative refractive power has an object-side surface 171 being concave in a paraxial region thereof and an image-side surface 172 being concave in a paraxial region thereof. The seventh lens element 170 is made of plastic material and has the object-side surface 171 and the image-side surface 172 being both aspheric. The image-side surface 172 of the seventh lens element 170 has at least one convex critical point in an off-axis region thereof.

The IR-cut filter 180 is made of glass material and located between the seventh lens element 170 and the image surface 190, and will not affect the focal length of the photographing optical lens assembly. The image sensor 195 is disposed on or near the image surface 190 of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i} (Ai) \times (Y^i),$$

where,

X is a displacement in parallel with an optical axis from an axial vertex on the aspheric surface to a point at a distance of Y from the optical axis on the aspheric surface;

Y is a vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing optical lens assembly of the image capturing unit according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=1.76 millimeters (mm), Fno=2.45, HFOV=68.9 degrees (deg.).

When the maximum field of view of the photographing optical lens assembly is FOV, the following condition is satisfied: FOV=137.8 [deg.].

When a maximum value among refractive indices of all lens elements of the photographing optical lens assembly is Nmax, the following condition is satisfied: Nmax=1.686. In this embodiment, among the first through seventh lens elements (110-170), a refractive index of the seventh lens element 170 is larger than refractive indices of the other lens elements, and Nmax is equal to the refractive index of the seventh lens element 170.

When an Abbe number of the first lens element 110 is V1, the refractive index of the first lens element 110 is N1, an Abbe number of the second lens element 120 is V2, the refractive index of the second lens element 120 is N2, an Abbe number of the third lens element 130 is V3, the refractive index of the third lens element 130 is N3, an Abbe number of the fourth lens element 140 is V4, the refractive index of the fourth lens element 140 is N4, an Abbe number of the fifth lens element 150 is V5, the refractive index of the fifth lens element 150 is N5, an Abbe number of the sixth lens element 160 is V6, the refractive index of the sixth lens element 160 is N6, an Abbe number of the seventh lens element 170 is V7, and the refractive index of the seventh lens element 170 is N7, the following conditions are satisfied: V1/N1=36.30; V2/N2=16.09; V3/N3=25.95; V4/N4=36.26; V5/N5=13.21; V6/N6=36.26; and V7/N7=10.90.

When the Abbe number of the second lens element 120 is V2, the Abbe number of the fifth lens element 150 is V5, and the Abbe number of the seventh lens element 170 is V7, the following condition is satisfied: V2+V5+V7=66.14.

When the Abbe number of the seventh lens element 170 is V7, the following condition is satisfied: V7=18.38.

When an axial distance between the first lens element 110 and the second lens element 120 is T12, and an axial distance between the second lens element 120 and the third lens element 130 is T23, the following condition is satisfied: T12/T23=6.12. In this embodiment, an axial distance between two adjacent lens elements is a distance in a paraxial region between two adjacent lens surfaces of the two adjacent lens elements.

When a central thickness of the second lens element 120 is CT2, and an axial distance between the image-side surface 172 of the seventh lens element 170 and the image surface 190 is BL, the following condition is satisfied: CT2/BL=0.73.

When an axial distance between the object-side surface 121 of the second lens element 120 and the image-side surface 162 of the sixth lens element 160 is Dr3r12, the axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following condition is satisfied: Dr3r12/(T23+T34+T45+T56)=12.04.

When a sum of axial distances between each of all adjacent lens elements of the photographing optical lens assembly is ΣAT, the axial distance between the first lens element 110 and the second lens element 120 is T12, and an axial distance between the sixth lens element 160 and the seventh lens element 170 is T67, the following condition is satisfied: ΣAT/(T12+T67)=1.23. In this embodiment, ΣAT is a sum of the axial distances between the first lens element 110 and the second lens element 120, the second lens element 120 and the third lens element 130, the third lens element 130 and the fourth lens element 140, the fourth lens element 140 and the fifth lens element 150, the fifth lens element 150 and the sixth lens element 160, and the sixth lens element 160 and the seventh lens element 170.

When an axial distance between the object-side surface 111 of the first lens element 110 and the image surface 190 is TL, and a maximum image height of the photographing optical lens assembly is ImgH, the following condition is satisfied: TL/ImgH=2.28.

When a maximum effective radius of the object-side surface 111 of the first lens element 110 is Y11, the following condition is satisfied: Y11=2.99 [mm].

When a maximum effective radius of the image-side surface 172 of the seventh lens element 170 is Y72, the following condition is satisfied: Y72=2.47 [mm].

When the maximum effective radius of the object-side surface 111 of the first lens element 110 is Y11, and the maximum effective radius of the image-side surface 172 of the seventh lens element 170 is Y72, the following condition is satisfied: Y11/Y72=1.21.

When the maximum effective radius of the object-side surface 111 of the first lens element 110 is Y11, and the maximum image height of the photographing optical lens assembly is ImgH, the following condition is satisfied: Y11/ImgH=0.88.

When the maximum effective radius of the image-side surface 172 of the seventh lens element 170 is Y72, and the focal length of the photographing optical lens assembly is f, the following condition is satisfied: Y72/f=1.41.

When the maximum effective radius of the image-side surface 172 of the seventh lens element 170 is Y72, and the axial distance between the image-side surface 172 of the seventh lens element 170 and the image surface 190 is BL, the following condition is satisfied: Y72/BL=2.79.

When a curvature radius of the object-side surface 111 of the first lens element 110 is R1, and a curvature radius of the image-side surface 112 of the first lens element 110 is R2, the following condition is satisfied: (R1+R2)/(R1−R2)=0.13.

When a curvature radius of the object-side surface 161 of the sixth lens element 160 is R11, and a curvature radius of the image-side surface 162 of the sixth lens element 160 is R12, the following condition is satisfied: (R11+R12)/(R11−R12)=−0.49.

When a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, and a focal length of the seventh lens element 170 is f7, the following conditions are satisfied: |f1/f2|=0.04; |f3/f2|=0.05; |f4/f2|=0.05; |f5/f2|=0.04; |f6/f2|=0.04; and f6/f7=−0.52.

The detailed optical data of the 1st embodiment are shown in Table 1 and the aspheric surface data are shown in Table 2 below.

TABLE 1

1st Embodiment
f = 1.76 mm, Fno = 2.45, HFOV = 68.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.182 | (ASP) | 0.714 | Plastic | 1.545 | 56.1 | −2.43 |
| 2 | | 2.447 | (ASP) | 0.912 | | | | |
| 3 | Lens 2 | 4.581 | (ASP) | 0.650 | Plastic | 1.614 | 26.0 | −58.92 |
| 4 | | 3.847 | (ASP) | 0.190 | | | | |
| 5 | Ape. Stop | Plano | | −0.041 | | | | |
| 6 | Lens 3 | 3.677 | (ASP) | 0.966 | Plastic | 1.559 | 40.4 | 2.92 |
| 7 | | −2.662 | (ASP) | −0.020 | | | | |
| 8 | Stop | Plano | | 0.055 | | | | |
| 9 | Lens 4 | 4.058 | (ASP) | 0.754 | Plastic | 1.544 | 56.0 | 3.14 |
| 10 | | −2.763 | (ASP) | 0.070 | | | | |
| 11 | Lens 5 | −3.316 | (ASP) | 0.400 | Plastic | 1.650 | 21.8 | −2.51 |

TABLE 1-continued

1st Embodiment
f = 1.76 mm, Fno = 2.45, HFOV = 68.9 deg.

| Surface # | | Curvature Radius | | Thickness | Material | Index | Abbe # | Focal Length |
|---|---|---|---|---|---|---|---|---|
| 12 | | 3.348 | (ASP) | 0.085 | | | | |
| 13 | Lens 6 | 1.764 | (ASP) | 0.971 | Plastic | 1.544 | 56.0 | 2.54 |
| 14 | | −5.149 | (ASP) | 0.586 | | | | |
| 15 | Lens 7 | −100.000 | (ASP) | 0.551 | Plastic | 1.686 | 18.4 | −4.89 |
| 16 | | 3.481 | (ASP) | 0.300 | | | | |
| 17 | IR-cut filter | Plano | | 0.210 | Glass | 1.517 | 64.2 | — |
| 18 | | Plano | | 0.375 | | | | |
| 19 | Image | Plano | | 0.000 | | | | |

Note:
Reference wavelength is 587.6 nm (d-line).
An effective radius of the stop 101 (Surface 8) is 0.875 mm.

TABLE 2

Aspheric Coefficients

| Surface # | 1 | 2 | 3 | 4 | 6 |
|---|---|---|---|---|---|
| k = | −4.1621E+01 | −4.4779E−01 | 0.0000E+00 | −3.9997E+00 | 0.0000E+00 |
| A4 = | 5.7789E−02 | 2.6379E−01 | −1.1231E−02 | 1.1498E−01 | 7.4412E−02 |
| A6 = | −2.0067E−02 | −3.0518E−01 | −4.5684E−02 | 9.1180E−02 | 1.7819E−01 |
| A8 = | 5.0000E−03 | 6.0794E−01 | 1.0755E−01 | 2.7585E−02 | −4.6635E−01 |
| A10 = | −8.2572E−04 | −7.9443E−01 | −1.8282E−01 | −4.6498E−01 | 7.9560E−01 |
| A12 = | 8.5396E−05 | 6.1346E−01 | 1.0733E−01 | 4.7058E−01 | −6.8566E−01 |
| A14 = | −4.9854E−06 | −2.4815E−01 | −1.5030E−02 | — | — |
| A16 = | 1.2705E−07 | 3.9504E−02 | −2.6932E−03 | — | — |

| Surface # | 7 | 9 | 10 | 11 | 12 |
|---|---|---|---|---|---|
| k = | 0.0000E+00 | 0.0000E+00 | −8.3452E+01 | 1.9974E+00 | −1.0000E+00 |
| A4 = | −1.2370E−01 | −1.1855E−01 | 1.0715E+00 | 6.7481E−01 | 4.8775E−03 |
| A6 = | 3.6063E−01 | 4.2359E−01 | −1.3821E+00 | −3.3316E+00 | −6.4100E−01 |
| A8 = | −2.1675E−01 | −6.6673E−01 | 2.3691E+00 | 8.3417E+00 | 1.7051E+00 |
| A10 = | −6.6711E−01 | 7.1540E−01 | −2.1402E+00 | −1.5963E+01 | −2.3980E+00 |
| A12 = | 1.8309E+00 | −5.0904E−01 | 1.0812E+00 | 2.2661E+01 | 2.0071E+00 |
| A14 = | −1.7884E+00 | 2.1927E−01 | −2.3623E−01 | −2.2420E+01 | −9.9439E−01 |
| A16 = | 6.4408E−01 | −4.4194E−02 | 5.5150E−04 | 1.4464E+01 | 2.7046E−01 |
| A18 = | — | — | — | −5.4185E+00 | −3.1233E−02 |
| A20 = | — | — | — | 8.8684E−01 | — |

| Surface # | 13 | 14 | 15 | 16 |
|---|---|---|---|---|
| k = | −5.3482E+00 | 0.0000E+00 | 0.0000E+00 | 0.0000E+00 |
| A4 = | −1.5805E−01 | −5.5203E−03 | −1.0509E−01 | −4.6868E−02 |
| A6 = | 3.8156E−02 | 1.6616E−02 | 5.9571E−02 | −5.7904E−02 |
| A8 = | 9.2462E−03 | −1.7020E−01 | −2.5075E−01 | 5.4787E−02 |
| A10 = | 2.5540E−01 | 2.5703E−01 | 3.3166E−01 | −2.3288E−02 |
| A12 = | −5.4646E−01 | −1.6074E−01 | −2.2151E−01 | 5.6943E−03 |
| A14 = | 4.8809E−01 | 3.7163E−02 | 8.8544E−02 | −8.3973E−04 |
| A16 = | −2.2663E−01 | 4.8231E−03 | −2.3049E−02 | 7.2273E−05 |
| A18 = | 5.4071E−02 | −3.7349E−03 | 3.7582E−03 | −3.2220E−06 |
| A20 = | −5.2621E−03 | 4.8360E−04 | −2.8442E−04 | 5.3878E−08 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
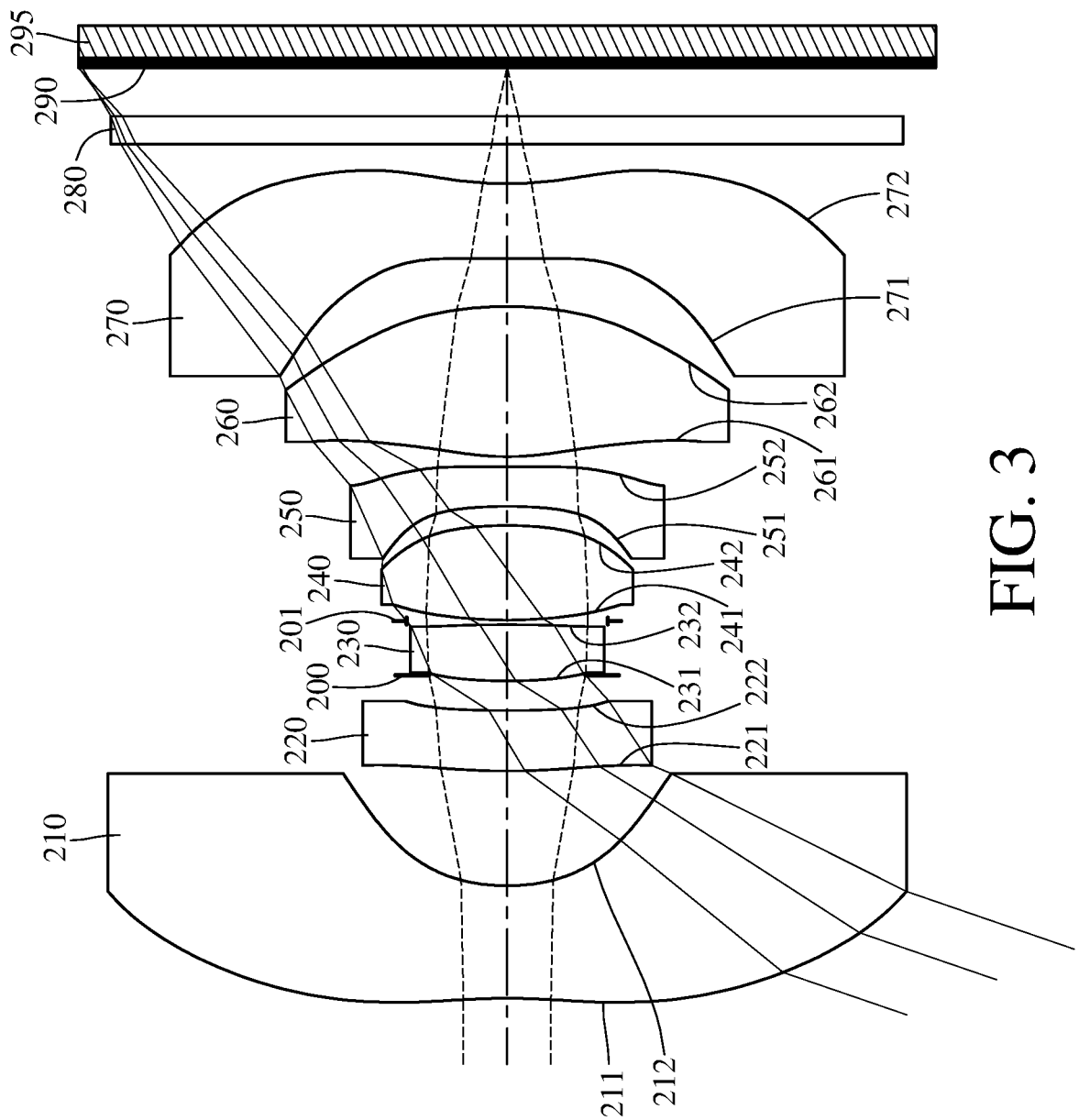
FIG. 3 is a schematic view of an image capturing unit according to the 2nd embodiment of the present disclosure.
Figure 4:
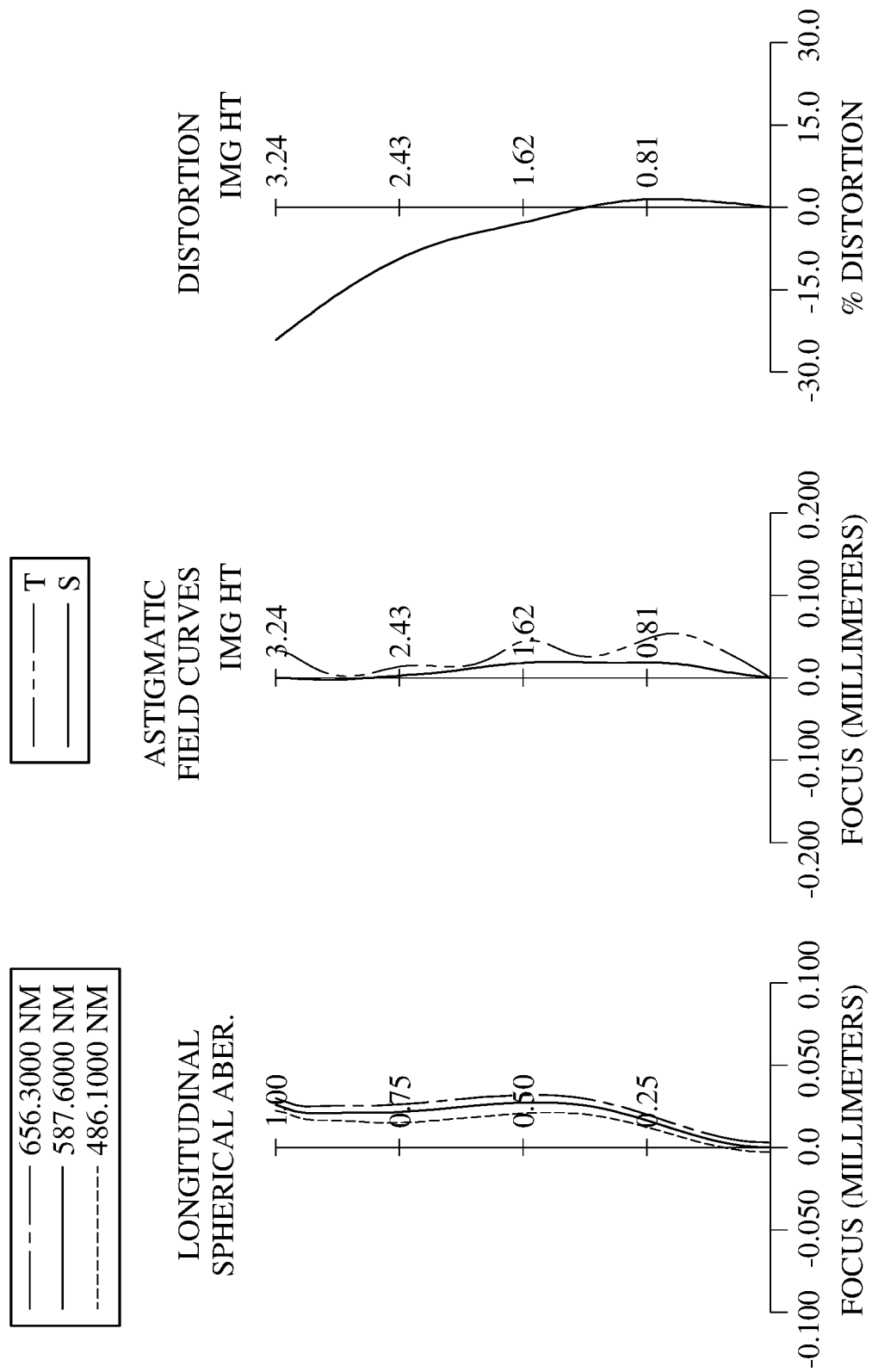
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 295. The photographing optical lens assembly includes, in order from an object side to an image side along an optical path, a first lens element 210, a second lens element 220, an aperture stop 200, a third lens element 230, a stop 201, a fourth lens element 240, a fifth lens element 250, a sixth lens element 260, a seventh lens element 270, an IR-cut filter 280 and an image surface 290. The photographing optical lens assembly includes seven lens elements (210, 220, 230, 240, 250, 260 and 270) with no additional lens element disposed between each of the adjacent seven lens elements.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has at least one convex critical point in an off-axis region thereof.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has at least one two inflection points in an off-axis region thereof.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has at least one concave critical point in an off-axis region thereof.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has at least one concave critical point in an off-axis region thereof. The image-side surface 272 of the seventh lens element 270 has at least one convex critical point in an off-axis region thereof.

The IR-cut filter 280 is made of glass material and located between the seventh lens element 270 and the image surface 290, and will not affect the focal length of the photographing optical lens assembly. The image sensor 295 is disposed on or near the image surface 290 of the photographing optical lens assembly.

The detailed optical data of the 2nd embodiment are shown in Table 3 and the aspheric surface data are shown in Table 4 below.

TABLE 3

2nd Embodiment
f = 1.46 mm, Fno = 2.21, HFOV = 71.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −4.213 | (ASP) | 0.852 | Plastic | 1.544 | 56.0 | −2.02 |
| 2 |  | 1.594 | (ASP) | 0.868 |  |  |  |  |
| 3 | Lens 2 | 4.820 | (ASP) | 0.458 | Plastic | 1.621 | 23.6 | 14.75 |
| 4 |  | 9.803 | (ASP) | 0.266 |  |  |  |  |
| 5 | Ape. Stop | Plano |  | −0.042 |  |  |  |  |
| 6 | Lens 3 | 4.048 | (ASP) | 0.426 | Plastic | 1.591 | 27.2 | 5.41 |
| 7 |  | −14.666 | (ASP) | 0.028 |  |  |  |  |
| 8 | Stop | Plano |  | 0.007 |  |  |  |  |
| 9 | Lens 4 | 3.402 | (ASP) | 0.716 | Plastic | 1.544 | 56.0 | 2.93 |
| 10 |  | −2.780 | (ASP) | 0.145 |  |  |  |  |
| 11 | Lens 5 | −3.019 | (ASP) | 0.300 | Plastic | 1.698 | 16.3 | −4.47 |
| 12 |  | −98.660 | (ASP) | 0.076 |  |  |  |  |
| 13 | Lens 6 | 1.974 | (ASP) | 1.137 | Plastic | 1.544 | 56.0 | 2.30 |
| 14 |  | −2.716 | (ASP) | 0.363 |  |  |  |  |
| 15 | Lens 7 | 24.868 | (ASP) | 0.567 | Plastic | 1.705 | 14.0 | −4.50 |
| 16 |  | 2.785 | (ASP) | 0.300 |  |  |  |  |
| 17 | IR-cut filter | Plano |  | 0.210 | Glass | 1.517 | 64.2 | — |
| 18 |  | Plano |  | 0.366 |  |  |  |  |
| 19 | Image | Plano |  | 0.000 |  |  |  |  |

Note:
Reference wavelength is 587.6 nm (d-line).
An effective radius of the stop 201 (Surface 8) is 0.760 mm.
An effective radius of the image-side surface 272 (Surface 16) is 2.550 mm.

TABLE 4

Aspheric Coefficients

| Surface # | 1 | 2 | 3 | 4 | 6 |
|---|---|---|---|---|---|
| k = | −9.0000E+01 | −8.7504E−01 | 0.0000E+00 | 2.3026E+01 | 0.0000E+00 |
| A4 = | 5.7453E−02 | 3.3062E−01 | −6.5727E−02 | 5.6207E−02 | 7.3197E−02 |
| A6 = | −2.3092E−02 | −5.3812E−01 | −8.8703E−03 | 5.9949E−02 | 4.6337E−01 |

TABLE 4-continued

| Aspheric Coefficients | | | | | |
|---|---|---|---|---|---|
| A8 = | 7.3024E−03 | 1.2811E+00 | 6.5975E−02 | 2.2511E−01 | −3.0912E+00 |
| A10 = | −1.6738E−03 | −2.0857E+00 | −2.9040E−01 | −1.3594E+00 | 2.5435E+00 |
| A12 = | 2.6930E−04 | 2.1896E+00 | 7.2610E−01 | 6.4752E+00 | 1.2774E+02 |
| A14 = | −2.9449E−05 | −1.4104E+00 | −9.6721E−01 | −1.7028E+01 | −9.4576E+02 |
| A16 = | 2.0877E−06 | 4.9028E−01 | 7.1409E−01 | 2.5781E+01 | 3.0749E+03 |
| A18 = | −8.6698E−08 | −6.5583E−02 | −2.8102E−01 | −2.2885E+01 | −4.9008E+03 |
| A20 = | 1.6115E−09 | −1.9904E−03 | 4.6760E−02 | 9.5083E+00 | 3.1134E+03 |

| Surface # | 7 | 9 | 10 | 11 | 12 |
|---|---|---|---|---|---|
| k = | 0.0000E+00 | 0.0000E+00 | −6.9027E+00 | 6.5856E+00 | −1.0000E+00 |
| A4 = | −1.6825E−01 | −1.6259E−01 | 8.3536E−02 | 3.3862E−01 | 1.3859E−01 |
| A6 = | 1.3634E+00 | 1.1525E+00 | −2.1540E+00 | −2.7778E+00 | −1.6626E+00 |
| A8 = | −9.5080E+00 | −5.9318E+00 | 8.6006E+00 | 7.8959E+00 | 4.7657E+00 |
| A10 = | 5.4559E+01 | 2.3993E+01 | −2.4160E+01 | −1.6265E+01 | −7.8235E+00 |
| A12 = | −2.1243E+02 | −6.7181E+01 | 4.5339E+01 | 2.4459E+01 | 8.1021E+00 |
| A14 = | 5.3713E+02 | 1.2434E+02 | −5.4971E+01 | −3.1236E+01 | −5.3867E+00 |
| A16 = | −8.3959E+02 | −1.4457E+02 | 4.1537E+01 | 3.3887E+01 | 2.2596E+00 |
| A18 = | 7.3464E+02 | 9.5458E+01 | −1.7574E+01 | −2.3627E+01 | −5.5257E−01 |
| A20 = | −2.7521E+02 | −2.7357E+01 | 3.0378E+00 | 7.0924E+00 | 6.1150E−02 |

| Surface # | 13 | 14 | 15 | 16 |
|---|---|---|---|---|
| k = | −6.5240E+00 | 0.0000E+00 | 0.0000E+00 | 0.0000E+00 |
| A4 = | −9.6566E−02 | 4.5866E−03 | −1.1342E−01 | −1.9040E−02 |
| A6 = | −3.5146E−01 | 3.0898E−02 | 1.0363E−01 | −1.6260E−01 |
| A8 = | 1.0843E+00 | −3.1203E−01 | −6.0312E−01 | 1.4488E−01 |
| A10 = | −1.4332E+00 | 5.0219E−01 | 9.2135E−01 | −6.3578E−02 |
| A12 = | 1.1157E+00 | −3.6376E−01 | −6.7404E−01 | 1.6539E−02 |
| A14 = | −5.5044E−01 | 1.3845E−01 | 2.7480E−01 | −2.6769E−03 |
| A16 = | 1.7088E−01 | −2.7346E−02 | −6.4242E−02 | 2.6556E−04 |
| A18 = | −3.0634E−02 | 2.3365E−03 | 8.0973E−03 | −1.4829E−05 |
| A20 = | 2.4177E−03 | −3.1615E−05 | −4.2812E−04 | 3.5776E−07 |

In the 2nd embodiment, the equation of the aspheric surface profiles of the aforementioned lens elements is the same as the equation of the 1st embodiment. Also, the definitions of these parameters shown in the following table are the same as those stated in the above embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.46 | ΣAT/(T12 + T67) | 1.39 |
| Fno | 2.21 | TL/ImgH | 2.18 |
| HFOV [deg.] | 71.0 | Y11 [mm] | 2.79 |
| FOV [deg.] | 142.0 | Y72 [mm] | 2.55 |
| Nmax | 1.705 | Y11/Y72 | 1.10 |
| V1/N1 | 36.26 | Y11/ImgH | 0.86 |
| V2/N2 | 14.56 | Y72/f | 1.74 |
| V3/N3 | 17.10 | Y72/BL | 2.91 |
| V4/N4 | 36.26 | (R1 + R2)/(R1 − R2) | 0.45 |
| V5/N5 | 9.60 | (R11 + R12)/(R11 − R12) | −0.16 |
| V6/N6 | 36.26 | |f1/f2| | 0.14 |
| V7/N7 | 8.21 | |f3/f2| | 0.37 |
| V2 + V5 + V7 | 53.90 | |f4/f2| | 0.20 |
| V7 | 14.00 | |f5/f2| | 0.30 |
| T12/T23 | 3.88 | |f6/f2| | 0.16 |
| CT2/BL | 0.52 | f6/f7 | −0.51 |
| Dr3r12/(T23 + T34 + T45 + T56) | 7.33 | — | — |

3rd Embodiment

Figure 5:
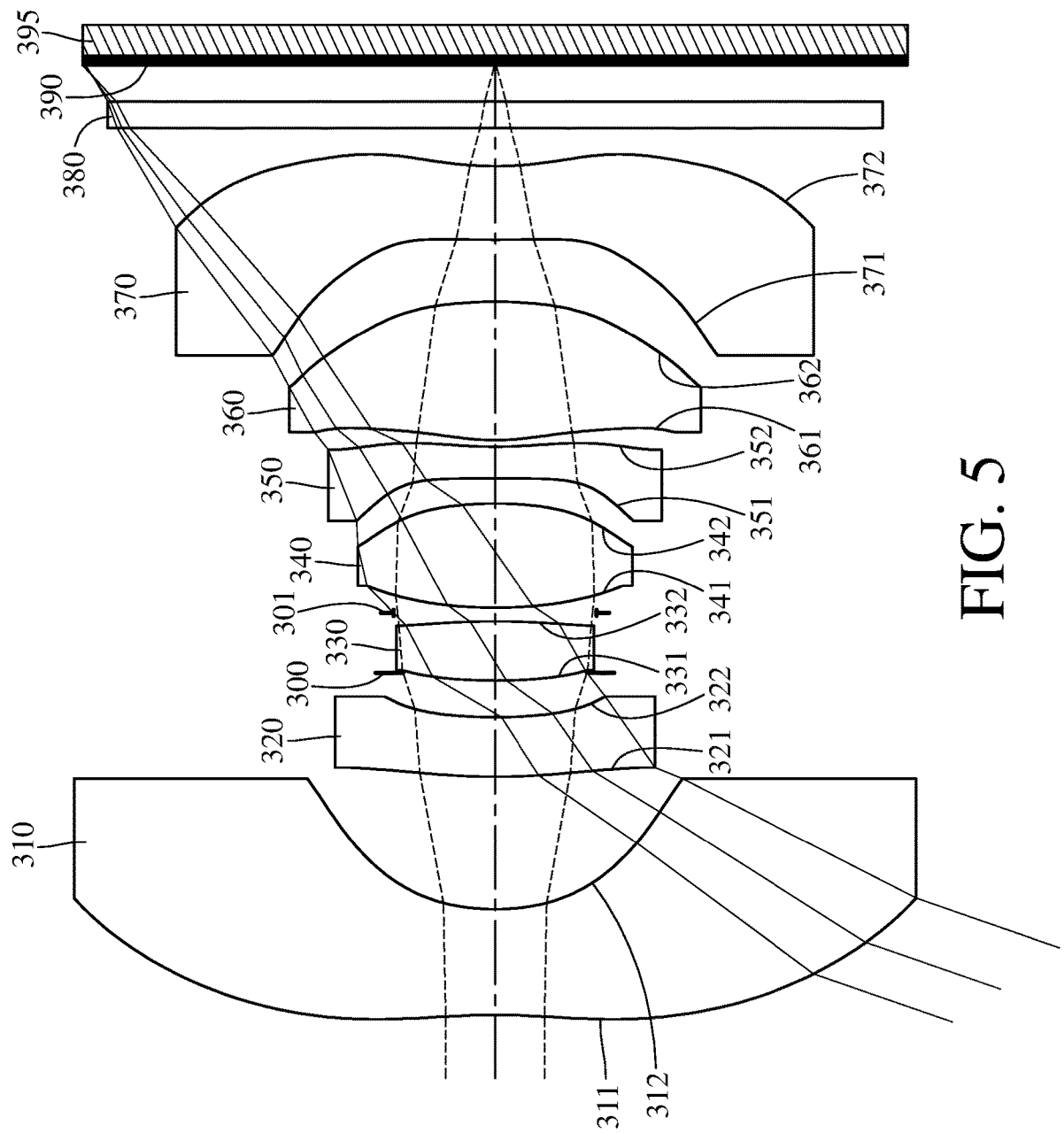
FIG. 5 is a schematic view of an image capturing unit according to the 3rd embodiment of the present disclosure.
Figure 6:
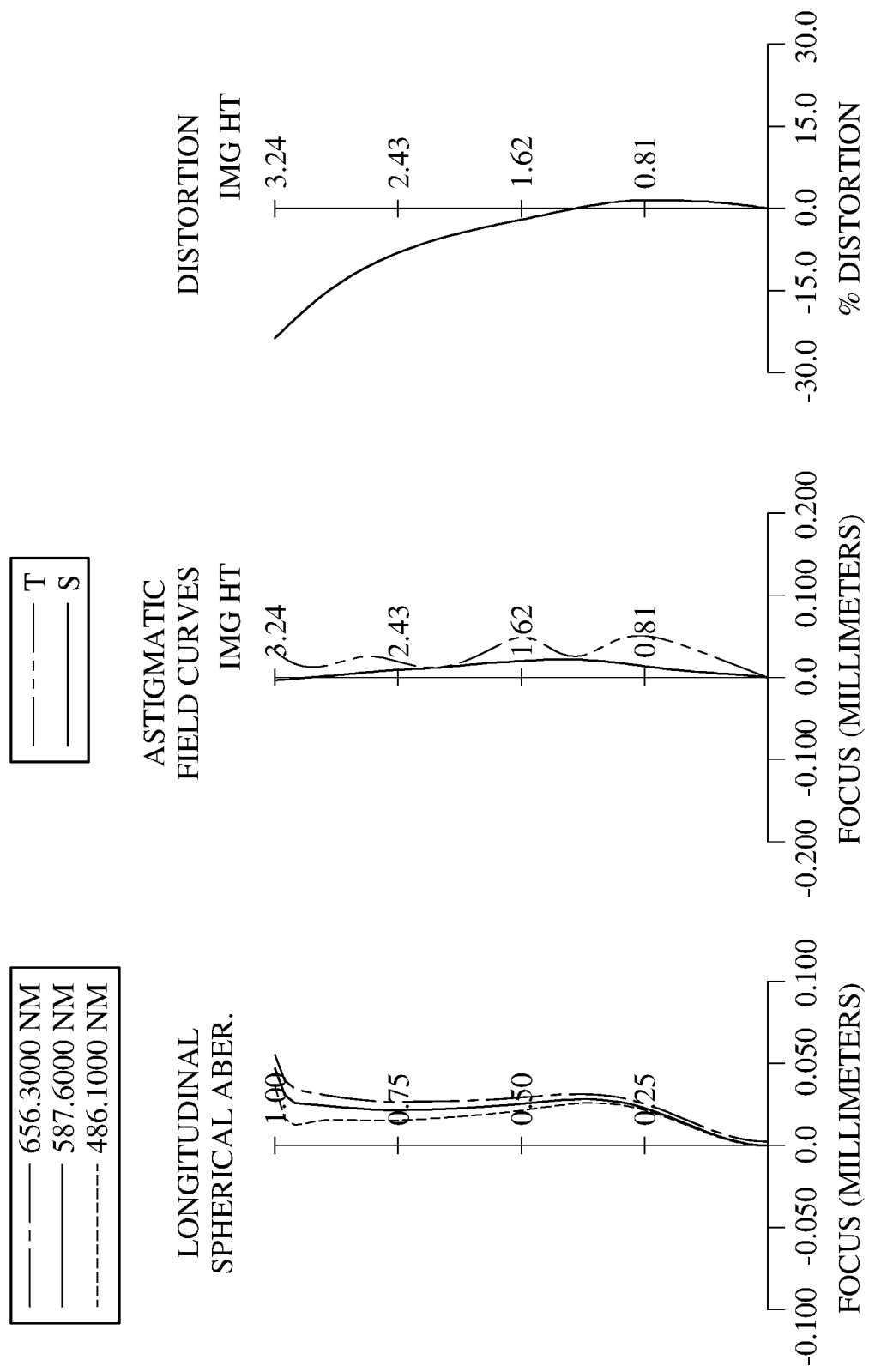
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 395. The photographing optical lens assembly includes, in order from an object side to an image side along an optical path, a first lens element 310, a second lens element 320, an aperture stop 300, a third lens element 330, a stop 301, a fourth lens element 340, a fifth lens element 350, a sixth lens element 360, a seventh lens element 370, an IR-cut filter 380 and an image surface 390. The photographing optical lens assembly includes seven lens elements (310, 320, 330, 340, 350, 360 and 370) with no additional lens element disposed between each of the adjacent seven lens elements.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has at least one convex critical point in an off-axis region thereof.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least two inflection points and at least two critical points in an off-axis region thereof.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has at least one concave critical point in an off-axis region thereof.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has at least one concave critical point in an off-axis region thereof. The image-side surface 372 of the seventh lens element 370 has at least one convex critical point in an off-axis region thereof.

The IR-cut filter 380 is made of glass material and located between the seventh lens element 370 and the image surface 390, and will not affect the focal length of the photographing optical lens assembly. The image sensor 395 is disposed on or near the image surface 390 of the photographing optical lens assembly.

The detailed optical data of the 3rd embodiment are shown in Table 5 and the aspheric surface data are shown in Table 6 below.

TABLE 5

3rd Embodiment
f = 1.46 mm, Fno = 1.87, HFOV = 70.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.663 | (ASP) | 0.834 | Plastic | 1.544 | 56.0 | −2.35 |
| 2 | | 1.868 | (ASP) | 1.046 | | | | |
| 3 | Lens 2 | 4.942 | (ASP) | 0.470 | Plastic | 1.607 | 26.6 | −49.01 |
| 4 | | 4.086 | (ASP) | 0.351 | | | | |
| 5 | Ape. Stop | Plano | | −0.062 | | | | |
| 6 | Lens 3 | 4.485 | (ASP) | 0.467 | Plastic | 1.583 | 30.2 | 4.45 |
| 7 | | −5.919 | (ASP) | 0.067 | | | | |
| 8 | Stop | Plano | | 0.041 | | | | |
| 9 | Lens 4 | 3.794 | (ASP) | 0.823 | Plastic | 1.544 | 56.0 | 3.30 |
| 10 | | −3.139 | (ASP) | 0.198 | | | | |
| 11 | Lens 5 | −27.903 | (ASP) | 0.250 | Plastic | 1.698 | 16.3 | −4.56 |
| 12 | | 3.605 | (ASP) | 0.052 | | | | |
| 13 | Lens 6 | 1.877 | (ASP) | 1.096 | Plastic | 1.544 | 56.0 | 2.42 |
| 14 | | −3.522 | (ASP) | 0.487 | | | | |
| 15 | Lens 7 | 10.727 | (ASP) | 0.580 | Plastic | 1.705 | 14.0 | −5.43 |
| 16 | | 2.759 | (ASP) | 0.300 | | | | |
| 17 | IR-cut filter | Plano | | 0.210 | Glass | 1.517 | 64.2 | — |
| 18 | | Plano | | 0.286 | | | | |
| 19 | Image | Plano | | 0.000 | | | | |

Note:
Reference wavelength is 587.6 nm (d-line).
An effective radius of the stop 301 (Surface 8) is 0.800 mm.

TABLE 6

Aspheric Coefficients

| Surface # | 1 | 2 | 3 | 4 | 6 |
|---|---|---|---|---|---|
| k = | −9.0000E+01 | −3.1518E+00 | 0.0000E+00 | 2.0019E+00 | 0.0000E+00 |
| A4 = | 4.0512E−02 | 2.3042E−01 | −4.3496E−02 | 6.8206E−02 | 3.3946E−02 |
| A6 = | −1.1037E−02 | −1.8289E−01 | −1.8856E−02 | −1.1197E−01 | 4.9048E−01 |
| A8 = | 2.1428E−03 | 2.7179E−01 | 8.9692E−02 | 1.5562E+00 | −4.7548E+00 |
| A10 = | −2.7326E−04 | −2.8776E−01 | −1.4958E−01 | −7.3628E+00 | 3.0255E+01 |
| A12 = | 2.2120E−05 | 1.7865E−01 | 1.5858E−01 | 2.2219E+01 | −1.2032E+02 |
| A14 = | −1.0301E−06 | −5.8059E−02 | −1.1848E−01 | −4.2149E+01 | 3.0143E+02 |
| A16 = | 2.1154E−08 | 7.4645E−03 | 5.9343E−02 | 4.8590E+01 | −4.6377E+02 |
| A18 = | — | — | −1.7470E−02 | −3.1192E+01 | 4.0081E+02 |
| A20 = | — | — | 2.2631E−03 | 8.5283E+00 | −1.4932E+02 |

TABLE 6-continued

Aspheric Coefficients

| Surface # | 7 | 9 | 10 | 11 | 12 |
|---|---|---|---|---|---|
| k = | 0.0000E+00 | 0.0000E+00 | −2.4122E+01 | −9.0000E+01 | −1.0000E+00 |
| A4 = | 4.1064E−02 | 4.0308E−02 | −1.1901E−01 | 6.7942E−02 | −4.0297E−02 |
| A6 = | −5.1376E−02 | 8.4809E−02 | −6.4369E−01 | −1.1016E+00 | −1.0618E+00 |
| A8 = | −5.6473E−02 | −6.2005E−01 | 2.5347E+00 | 2.4113E+00 | 3.4901E+00 |
| A10 = | 3.2567E+00 | 2.0983E+00 | −6.4098E+00 | −3.2038E+00 | −6.0458E+00 |
| A12 = | −2.0033E+01 | −4.3226E+00 | 1.0636E+01 | 8.8086E−01 | 6.3925E+00 |
| A14 = | 6.0917E+01 | 5.5620E+00 | −1.1146E+01 | 3.1630E+00 | −4.2460E+00 |
| A16 = | −1.0172E+02 | −4.3371E+00 | 7.0896E+00 | −4.1245E+00 | 1.7382E+00 |
| A18 = | 8.9316E+01 | 1.8781E+00 | −2.4758E+00 | 2.0717E+00 | −4.0156E−01 |
| A20 = | −3.2389E+01 | −3.4724E−01 | 3.6040E−01 | −3.9714E−01 | 3.9983E−02 |

| Surface # | 13 | 14 | 15 | 16 |
|---|---|---|---|---|
| k = | −9.4548E+00 | 0.0000E+00 | 0.0000E+00 | 0.0000E+00 |
| A4 = | −1.1490E−01 | −2.5694E−02 | −1.2543E−01 | −2.6730E−03 |
| A6 = | −4.7140E−01 | −1.3920E−01 | 8.3976E−02 | −2.2258E−01 |
| A8 = | 1.5538E+00 | 1.0017E−01 | −7.8918E−01 | 2.0236E−01 |
| A10 = | −2.1118E+00 | −1.5355E−02 | 1.3874E+00 | −9.2007E−02 |
| A12 = | 1.6200E+00 | 4.7263E−02 | −1.1458E+00 | 2.5017E−02 |
| A14 = | −7.4201E−01 | −7.4979E−02 | 5.3379E−01 | −4.2602E−03 |
| A16 = | 1.9571E−01 | 4.3696E−02 | −1.4495E−01 | 4.4715E−04 |
| A18 = | −2.5956E−02 | −1.1555E−02 | 2.1495E−02 | −2.6548E−05 |
| A20 = | 1.1594E−03 | 1.1824E−03 | −1.3472E−03 | 6.8407E−07 |

In the 3rd embodiment, the equation of the aspheric surface profiles of the aforementioned lens elements is the same as the equation of the 1st embodiment. Also, the definitions of these parameters shown in the following table are the same as those stated in the above embodiments with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.46 | ΣAT/(T12 + T67) | 1.42 |
| Fno | 1.87 | TL/ImgH | 2.32 |
| HFOV [deg.] | 70.9 | Y11 [mm] | 3.32 |
| FOV [deg.] | 141.8 | Y72 [mm] | 2.51 |
| Nmax | 1.705 | Y11/Y72 | 1.32 |
| V1/N1 | 36.26 | Y11/ImgH | 1.02 |
| V2/N2 | 16.57 | Y72/f | 1.72 |
| V3/N3 | 19.11 | Y72/BL | 3.16 |
| V4/N4 | 36.26 | (R1 + R2)/(R1 − R2) | 0.43 |
| V5/N5 | 9.60 | (R11 + R12)/(R11 − R12) | −0.30 |
| V6/N6 | 36.26 | |f1/f2| | 0.05 |
| V7/N7 | 8.21 | |f3/f2| | 0.09 |
| V2 + V5 + V7 | 56.94 | |f4/f2| | 0.07 |
| V7 | 14.00 | |f5/f2| | 0.09 |
| T12/T23 | 3.62 | |f6/f2| | 0.05 |
| CT2/BL | 0.59 | f6/f7 | −0.45 |
| Dr3r12/(T23 + T34 + T45 + T56) | 5.80 | — | — |

4th Embodiment

Figure 7:
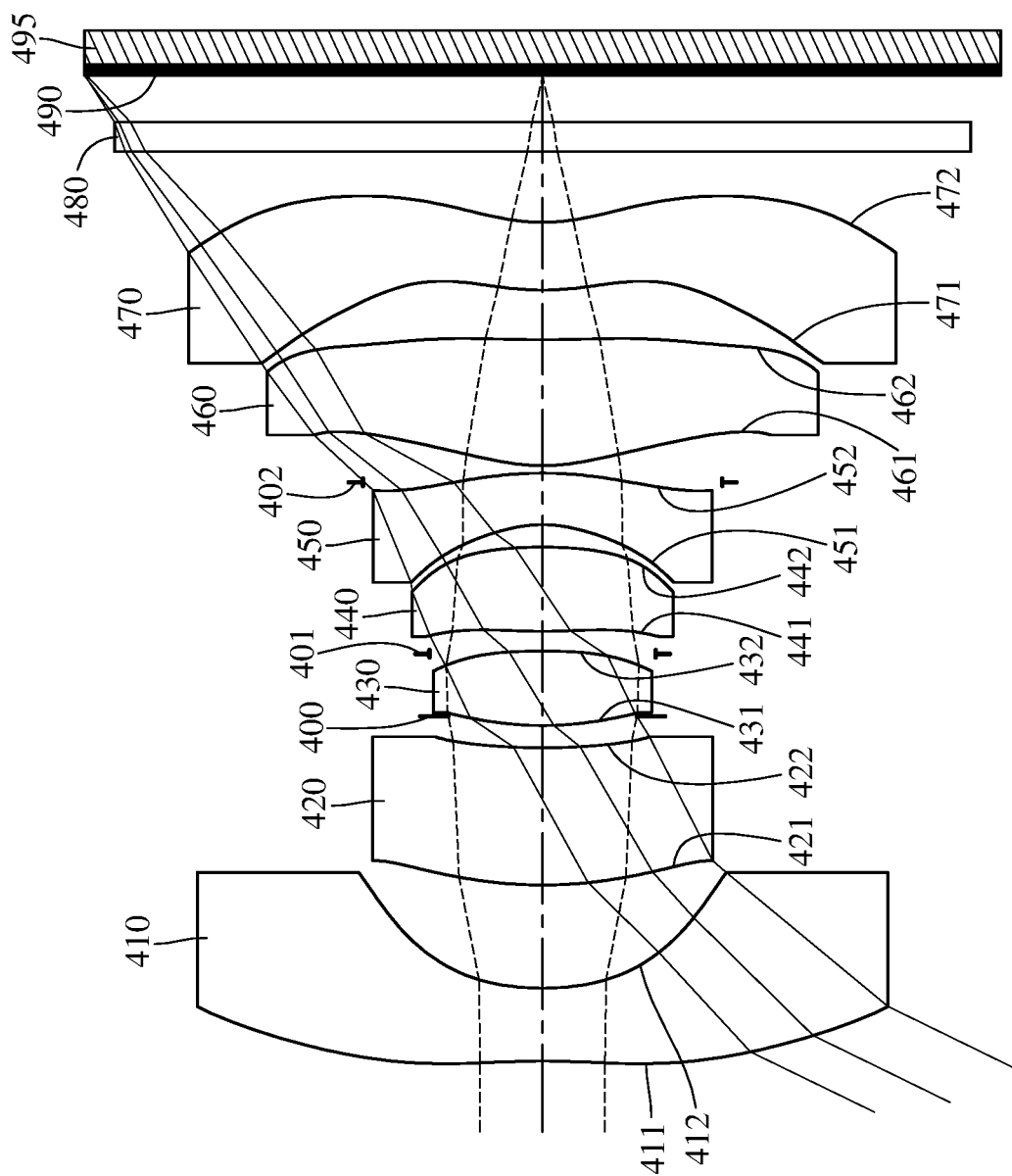
FIG. 7 is a schematic view of an image capturing unit according to the 4th embodiment of the present disclosure.
Figure 8:
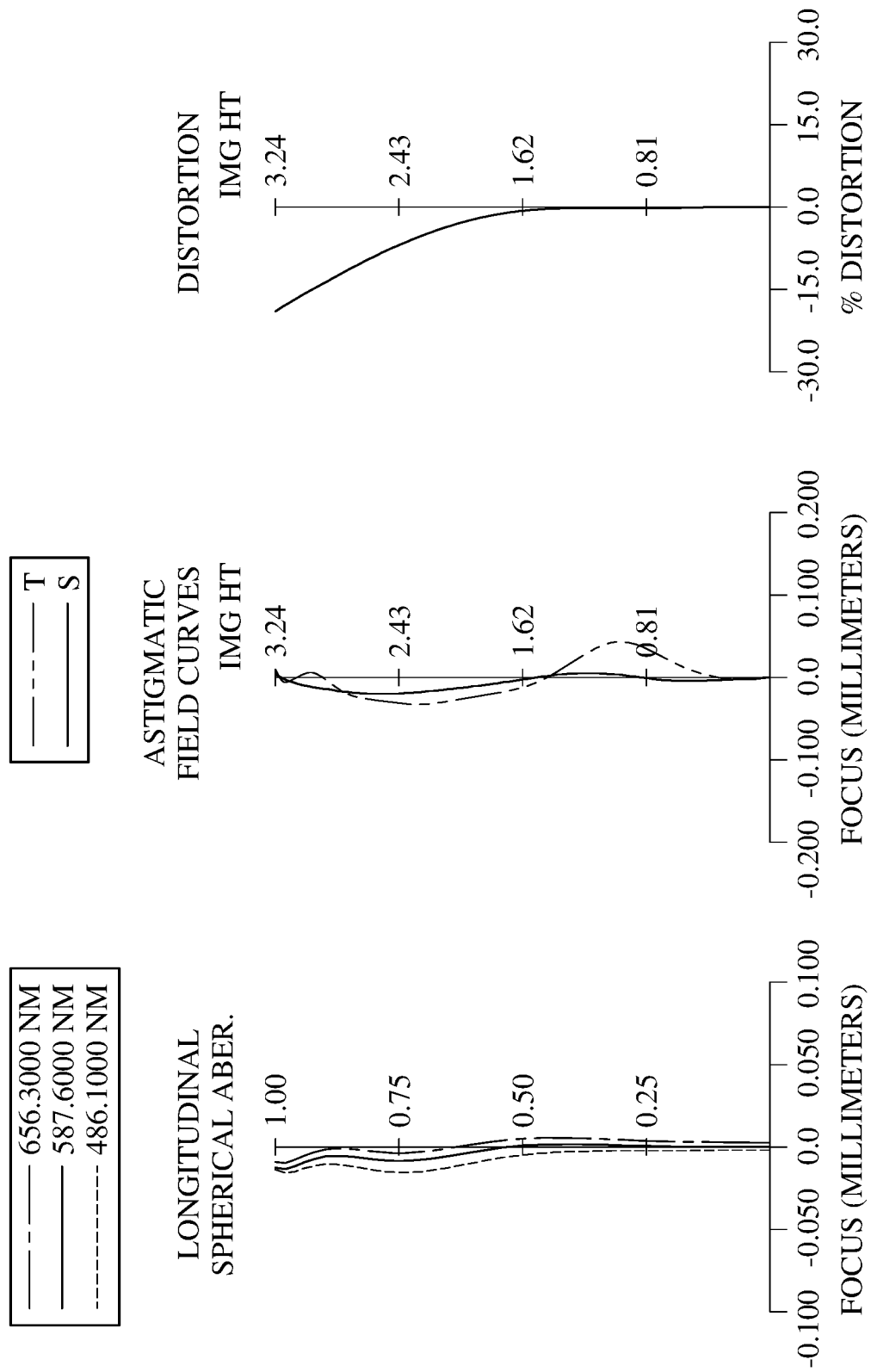
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 495. The photographing optical lens assembly includes, in order from an object side to an image side along an optical path, a first lens element 410, a second lens element 420, an aperture stop 400, a third lens element 430, a stop 401, a fourth lens element 440, a fifth lens element 450, a stop 402, a sixth lens element 460, a seventh lens element 470, an IR-cut filter 480 and an image surface 490. The photographing optical lens assembly includes seven lens elements (410, 420, 430, 440, 450, 460 and 470) with no additional lens element disposed between each of the adjacent seven lens elements.

The first lens element 410 with negative refractive power has an object-side surface 411 being concave in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has at least one convex critical point in an off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The image-side surface 452 of the fifth lens element 450 has at least one inflection point and at least one critical point in an off-axis region thereof.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has at least one concave critical point in an off-axis region thereof.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has at least one concave critical point in an off-axis region thereof. The image-side surface 472 of the seventh lens element 470 has at least one convex critical point in an off-axis region thereof.

The IR-cut filter 480 is made of glass material and located between the seventh lens element 470 and the image surface 490, and will not affect the focal length of the photographing optical lens assembly. The image sensor 495 is disposed on or near the image surface 490 of the photographing optical lens assembly.

The detailed optical data of the 4th embodiment are shown in Table 7 and the aspheric surface data are shown in Table 8 below.

TABLE 7

4th Embodiment
f = 1.95 mm, Fno = 2.21, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.145 | (ASP) | 0.516 | Plastic | 1.545 | 56.1 | −2.54 |
| 2 | | 1.962 | (ASP) | 0.729 | | | | |
| 3 | Lens 2 | 2.993 | (ASP) | 0.971 | Plastic | 1.639 | 23.5 | 11.59 |
| 4 | | 4.390 | (ASP) | 0.223 | | | | |
| 5 | Ape. Stop | Plano | | −0.066 | | | | |
| 6 | Lens 3 | 2.225 | (ASP) | 0.527 | Plastic | 1.545 | 55.5 | 2.99 |
| 7 | | −5.604 | (ASP) | −0.019 | | | | |
| 8 | Stop | Plano | | 0.159 | | | | |
| 9 | Lens 4 | 4.110 | (ASP) | 0.596 | Plastic | 1.544 | 56.0 | 3.20 |
| 10 | | −2.864 | (ASP) | 0.158 | | | | |
| 11 | Lens 5 | −0.874 | (ASP) | 0.365 | Plastic | 1.639 | 23.5 | −2.30 |
| 12 | | −2.512 | (ASP) | −0.065 | | | | |
| 13 | Stop | Plano | | 0.118 | | | | |
| 14 | Lens 6 | 1.347 | (ASP) | 0.891 | Plastic | 1.544 | 56.0 | 2.77 |
| 15 | | 9.859 | (ASP) | 0.350 | | | | |
| 16 | Lens 7 | 1.802 | (ASP) | 0.480 | Plastic | 1.587 | 28.3 | −12.19 |
| 17 | | 1.298 | (ASP) | 0.500 | | | | |
| 18 | IR-cut filter | Plano | | 0.210 | Glass | 1.517 | 64.2 | — |
| 19 | | Plano | | 0.328 | | | | |
| 20 | Image | Plano | | 0.000 | | | | |

Note:
Reference wavelength is 587.6 nm (d-line).
An effective radius of the stop 401 (Surface 8) is 0.800 mm.
An effective radius of the stop 402 (Surface 13) is 1.270 mm.
An effective radius of the image-side surface 472 (Surface 17) is 2.500 mm.

TABLE 8

Aspheric Coefficients

| Surface # | 1 | 2 | 3 | 4 | 6 |
|---|---|---|---|---|---|
| k = | −9.9000E+01 | 2.7423E−02 | −3.0145E+01 | −5.4598E+01 | −2.7691E+00 |
| A4 = | 8.9708E−02 | 1.9875E−01 | 1.1369E−01 | 1.3744E−02 | −7.3865E−02 |
| A6 = | −4.7586E−02 | −9.0282E−02 | −1.7707E−01 | 3.1843E−01 | 2.0635E−03 |
| A8 = | 1.6787E−02 | 1.1257E−01 | 1.8632E−01 | −1.5993E+00 | 9.3668E−01 |
| A10 = | −3.8492E−03 | −2.2288E−01 | −1.0646E−01 | 5.2969E+00 | −3.7612E+00 |
| A12 = | 5.4132E−04 | 2.4312E−01 | 2.0041E−02 | −8.4169E+00 | 6.2206E+00 |
| A14 = | −4.2072E−05 | −1.1948E−01 | 2.9243E−04 | 5.2529E+00 | −3.7539E+00 |
| A16 = | 1.3916E−06 | 2.0830E−02 | — | — | — |

| Surface # | 7 | 9 | 10 | 11 | 12 |
|---|---|---|---|---|---|
| k = | −6.0864E+00 | −1.3913E+01 | −3.1431E+00 | −1.1822E+00 | −3.0241E+01 |
| A4 = | −4.2699E−01 | −4.2784E−01 | 4.2362E−02 | 9.5247E−01 | −8.4085E−03 |
| A6 = | 4.8164E−01 | 7.4118E−01 | −9.2109E−01 | −4.0582E+00 | −5.0257E−01 |
| A8 = | −5.9136E−01 | −2.9950E+00 | 8.6064E−01 | 1.3806E+01 | 1.9506E+00 |
| A10 = | 1.0741E+00 | 9.6278E+00 | 1.2710E+00 | −4.0470E+01 | −3.4276E+00 |
| A12 = | −1.9664E+00 | −1.6436E+01 | −3.8377E+00 | 9.0554E+01 | 3.6465E+00 |
| A14 = | 1.7273E+00 | 1.3470E+01 | 3.1003E+00 | −1.3830E+02 | −2.5786E+00 |

TABLE 8-continued

| Aspheric Coefficients | | | | |
|---|---|---|---|---|
| A16 = | −2.8792E−01 | −4.0869E+00 | −7.3322E−01 | 1.3044E+02 | 1.2261E+00 |
| A18 = | — | — | — | −6.7309E+01 | −3.5651E−01 |
| A20 = | — | — | — | 1.4453E+01 | 4.7040E−02 |

| Surface # | 14 | 15 | 16 | 17 |
|---|---|---|---|---|
| k = | −6.2108E−01 | 0.0000E+00 | −6.0923E−01 | −9.3990E−01 |
| A4 = | −4.4367E−01 | −7.7558E−02 | −3.5735E−01 | −3.6884E−01 |
| A6 = | 4.7595E−01 | −2.0115E−02 | 8.8999E−02 | 2.3337E−01 |
| A8 = | −4.2236E−01 | 4.7058E−02 | 2.3280E−02 | −1.1179E−01 |
| A10 = | 2.7652E−01 | −7.2969E−03 | −2.6550E−02 | 3.8561E−02 |
| A12 = | −1.2957E−01 | −1.1572E−02 | 1.2944E−02 | −9.4067E−03 |
| A14 = | 3.9723E−02 | 6.8025E−03 | −4.5323E−03 | 1.5758E−03 |
| A16 = | −7.0662E−03 | −1.6157E−03 | 1.0053E−03 | −1.7273E−04 |
| A18 = | 5.9411E−04 | 1.8120E−04 | −1.1822E−04 | 1.1196E−05 |
| A20 = | −1.4300E−05 | −7.8266E−06 | 5.5117E−06 | −3.2591E−07 |

In the 4th embodiment, the equation of the aspheric surface profiles of the aforementioned lens elements is the same as the equation of the 1st embodiment. Also, the definitions of these parameters shown in the following table are the same as those stated in the above embodiments with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.95 | ΣAT/(T12 + T67) | 1.47 |
| Fno | 2.21 | TL/ImgH | 2.15 |
| HFOV [deg.] | 64.0 | Y11 [mm] | 2.44 |
| FOV [deg.] | 128.0 | Y72 [mm] | 2.50 |
| Nmax | 1.639 | Y11/Y72 | 0.98 |
| V1/N1 | 36.30 | Y11/ImgH | 0.75 |
| V2/N2 | 14.34 | Y72/f | 1.28 |
| V3/N3 | 35.94 | Y72/BL | 2.41 |
| V4/N4 | 36.26 | (R1 + R2)/(R1 − R2) | 0.45 |
| V5/N5 | 14.34 | (R11 + R12)/(R11 − R12) | −1.32 |
| V6/N6 | 36.26 | |f1/f2| | 0.22 |
| V7/N7 | 17.83 | |f3/f2| | 0.26 |
| V2 + V5 + V7 | 75.28 | |f4/f2| | 0.28 |
| V7 | 28.30 | |f5/f2| | 0.20 |
| T12/T23 | 4.64 | |f6/f2| | 0.24 |
| CT2/BL | 0.94 | f6/f7 | −0.23 |
| Dr3r12/(T23 + T34 + T45 + T56) | 7.59 | — | — |

5th Embodiment

Figure 9:
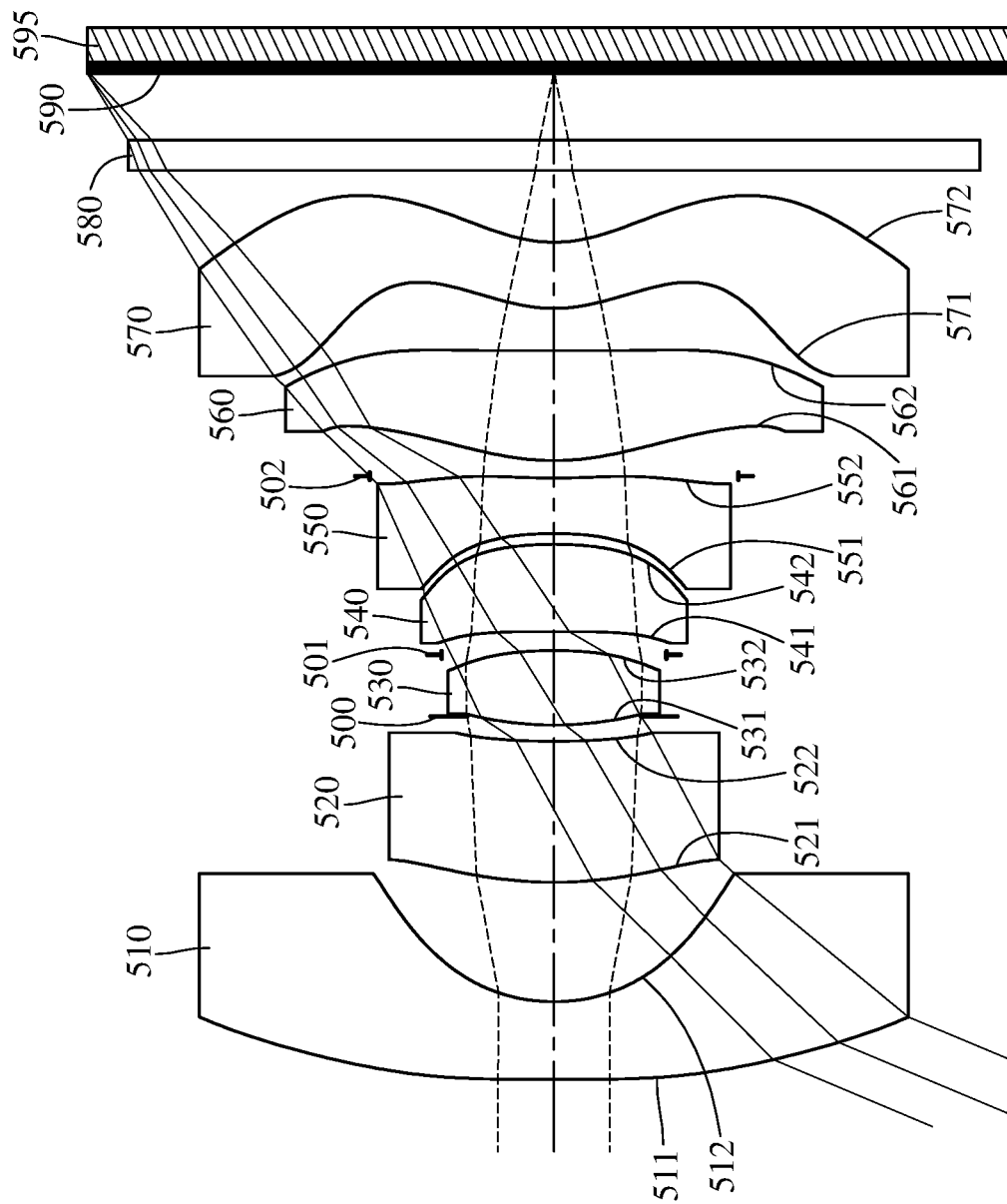
FIG. 9 is a schematic view of an image capturing unit according to the 5th embodiment of the present disclosure.
Figure 10:
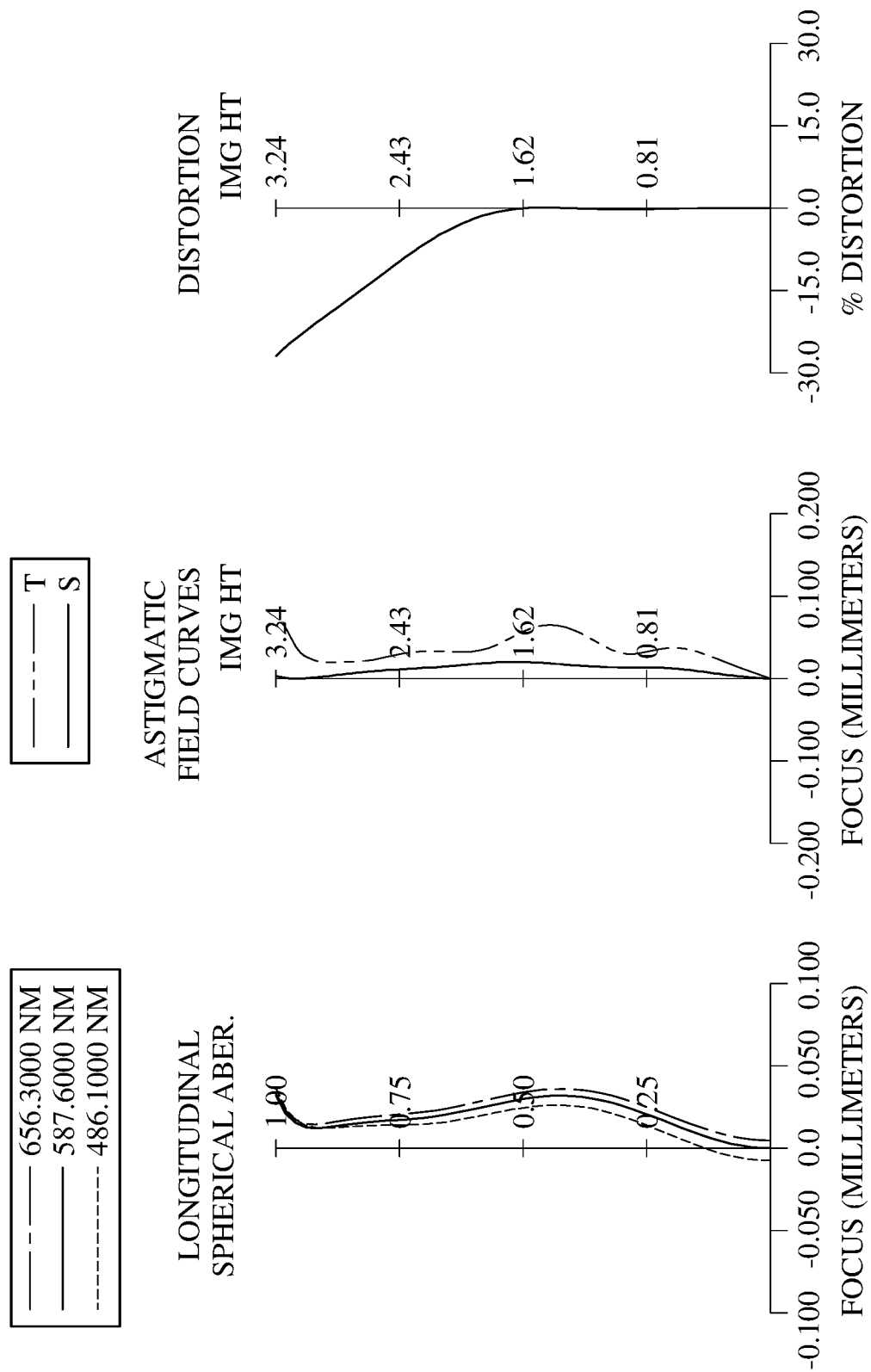
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 595. The photographing optical lens assembly includes, in order from an object side to an image side along an optical path, a first lens element 510, a second lens element 520, an aperture stop 500, a third lens element 530, a stop 501, a fourth lens element 540, a fifth lens element 550, a stop 502, a sixth lens element 560, a seventh lens element 570, an IR-cut filter 580 and an image surface 590. The photographing optical lens assembly includes seven lens elements (510, 520, 530, 540, 550, 560 and 570) with no additional lens element disposed between each of the adjacent seven lens elements.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least two inflection points and at least two critical points in an off-axis region thereof.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has at least one concave critical point in an off-axis region thereof.

The seventh lens element 570 with positive refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has at least one concave critical point in an off-axis region thereof. The image-side surface 572 of the seventh lens element 570 has at least one convex critical point in an off-axis region thereof.

The IR-cut filter 580 is made of glass material and located between the seventh lens element 570 and the image surface 590, and will not affect the focal length of the photographing optical lens assembly. The image sensor 595 is disposed on or near the image surface 590 of the photographing optical lens assembly.

The detailed optical data of the 5th embodiment are shown in Table 9 and the aspheric surface data are shown in Table 10 below.

TABLE 9

5th Embodiment
f = 1.86 mm, Fno = 2.39, HFOV = 67.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 200.000 | (ASP) | 0.540 | Plastic | 1.545 | 56.1 | −2.28 |
| 2 | | 1.236 | (ASP) | 0.830 | | | | |
| 3 | Lens 2 | 2.837 | (ASP) | 0.980 | Plastic | 1.639 | 23.5 | 8.83 |
| 4 | | 4.942 | (ASP) | 0.173 | | | | |
| 5 | Ape. Stop | Plano | | −0.060 | | | | |
| 6 | Lens 3 | 2.361 | (ASP) | 0.518 | Plastic | 1.545 | 56.1 | 2.49 |
| 7 | | −2.943 | (ASP) | −0.030 | | | | |
| 8 | Stop | Plano | | 0.161 | | | | |
| 9 | Lens 4 | 179.860 | (ASP) | 0.607 | Plastic | 1.544 | 56.0 | 5.05 |
| 10 | | −2.788 | (ASP) | 0.075 | | | | |
| 11 | Lens 5 | −2.764 | (ASP) | 0.385 | Plastic | 1.639 | 23.5 | −2.57 |
| 12 | | 4.265 | (ASP) | 0.014 | | | | |
| 13 | Stop | Plano | | 0.108 | | | | |
| 14 | Lens 6 | 1.764 | (ASP) | 0.764 | Plastic | 1.544 | 56.0 | 3.21 |
| 15 | | −174.409 | (ASP) | 0.294 | | | | |
| 16 | Lens 7 | 1.090 | (ASP) | 0.459 | Plastic | 1.534 | 55.9 | 107.62 |
| 17 | | 0.948 | (ASP) | 0.500 | | | | |
| 18 | IR-cut filter | Plano | | 0.210 | Glass | 1.517 | 64.2 | — |
| 19 | | Plano | | 0.463 | | | | |
| 20 | Image | Plano | | 0.000 | | | | |

Note:
Reference wavelength is 587.6 nm (d-line).
An effective radius of the stop 501 (Surface 8) is 0.780 mm.
An effective radius of the stop 502 (Surface 13) is 1.280 mm.

TABLE 10

Aspheric Coefficients

| Surface # | 1 | 2 | 3 | 4 | 6 |
|---|---|---|---|---|---|
| k = | −6.0652E+01 | −1.0000E+00 | −4.8463E+00 | −9.6000E+01 | 0.0000E+00 |
| A4 = | 5.9753E−02 | 1.1076E−01 | −1.5175E−04 | 1.0620E−01 | −6.1458E−02 |
| A6 = | −2.6548E−02 | 6.9375E−02 | −1.7122E−02 | −2.9826E−01 | 2.3851E−01 |
| A8 = | 6.8969E−03 | −8.9176E−02 | −7.8013E−02 | 1.5175E+00 | −8.6010E−01 |
| A10 = | −1.0445E−03 | −2.7718E−03 | 4.4390E−03 | −3.1583E+00 | 1.8355E+00 |
| A12 = | 8.5299E−05 | 5.1774E−02 | −4.1565E−03 | 3.0130E+00 | −1.1327E+00 |
| A14 = | −2.8537E−06 | −2.1019E−02 | — | — | — |

| Surface # | 7 | 9 | 10 | 11 | 12 |
|---|---|---|---|---|---|
| k = | −3.0055E+01 | 0.0000E+00 | 0.0000E+00 | 6.1849E+00 | 0.0000E+00 |
| A4 = | −3.7298E−01 | −2.4386E−01 | −3.4462E−01 | −4.7486E−01 | −3.5300E−01 |
| A6 = | 2.4104E−01 | 3.3637E−01 | 1.0900E+00 | 1.7083E+00 | 3.1250E−01 |
| A8 = | 2.0580E−01 | −1.5420E+00 | −6.7084E+00 | −8.0368E+00 | −4.2670E−02 |
| A10 = | −1.3576E+00 | 4.9629E+00 | 2.2912E+01 | 2.6183E+01 | −2.0642E−01 |
| A12 = | 1.8070E+00 | −9.2144E+00 | −4.6965E+01 | −5.4905E+01 | 2.1723E−01 |
| A14 = | — | 8.0885E+00 | 5.2417E+01 | 6.7668E+01 | −8.5179E−02 |
| A16 = | — | −2.2425E+00 | −2.4018E+01 | −4.4176E+01 | 9.6073E−03 |
| A18 = | — | — | −3.9923E+00 | 1.1876E+01 | 1.0206E−03 |
| A20 = | — | — | 5.3970E+00 | — | — |

| Surface # | 14 | 15 | 16 | 17 |
|---|---|---|---|---|
| k = | 0.0000E+00 | 0.0000E+00 | −1.0000E+00 | −1.0000E+00 |
| A4 = | −1.1955E−01 | 1.8654E−02 | −3.7386E−01 | −3.9351E−01 |
| A6 = | −9.9219E−02 | 7.6798E−02 | 1.4779E−01 | 2.2702E−01 |
| A8 = | 2.3353E−01 | −2.4619E−01 | −6.8513E−02 | −1.1522E−01 |
| A10 = | −2.5393E−01 | 2.7858E−01 | 1.3824E−02 | 4.4671E−02 |
| A12 = | 1.6464E−01 | −1.8000E−01 | −1.4726E−03 | −1.2562E−02 |

TABLE 10-continued

| Aspheric Coefficients | | | |
|---|---|---|---|
| A14 = | −6.5866E−02 | 7.1811E−02 | 2.2561E−03 | 2.4372E−03 |
| A16 = | 1.5527E−02 | −1.7404E−02 | −1.0695E−03 | −3.0436E−04 |
| A18 = | −1.8928E−03 | 2.3423E−03 | 1.8463E−04 | 2.1830E−05 |
| A20 = | 7.7388E−05 | −1.3403E−04 | −1.1119E−05 | −6.8144E−07 |

In the 5th embodiment, the equation of the aspheric surface profiles of the aforementioned lens elements is the same as the equation of the 1st embodiment. Also, the definitions of these parameters shown in the following table are the same as those stated in the above embodiments with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.86 | ΣAT/(T12 + T67) | 1.39 |
| Fno | 2.39 | TL/ImgH | 2.16 |
| HFOV [deg.] | 67.2 | Y11 [mm] | 2.46 |
| FOV [deg.] | 134.4 | Y72 [mm] | 2.46 |
| Nmax | 1.639 | Y11/Y72 | 1.00 |
| V1/N1 | 36.30 | Y11/ImgH | 0.76 |
| V2/N2 | 14.34 | Y72/f | 1.33 |
| V3/N3 | 36.30 | Y72/BL | 2.10 |
| V4/N4 | 36.26 | (R1 + R2)/(R1 − R2) | 1.01 |
| V5/N5 | 14.34 | (R11 + R12)/(R11 − R12) | −0.98 |
| V6/N6 | 36.26 | |f1/f2| | 0.26 |
| V7/N7 | 36.46 | |f3/f2| | 0.28 |
| V2 + V5 + V7 | 102.91 | |f4/f2| | 0.57 |
| V7 | 55.92 | |f5/f2| | 0.29 |
| T12/T23 | 7.35 | |f6/f2| | 0.36 |
| CT2/BL | 0.84 | f6/f7 | 0.03 |
| Dr3r12/(T23 + T34 + T45 + T56) | 8.38 | — | — |

6th Embodiment

Figure 11:
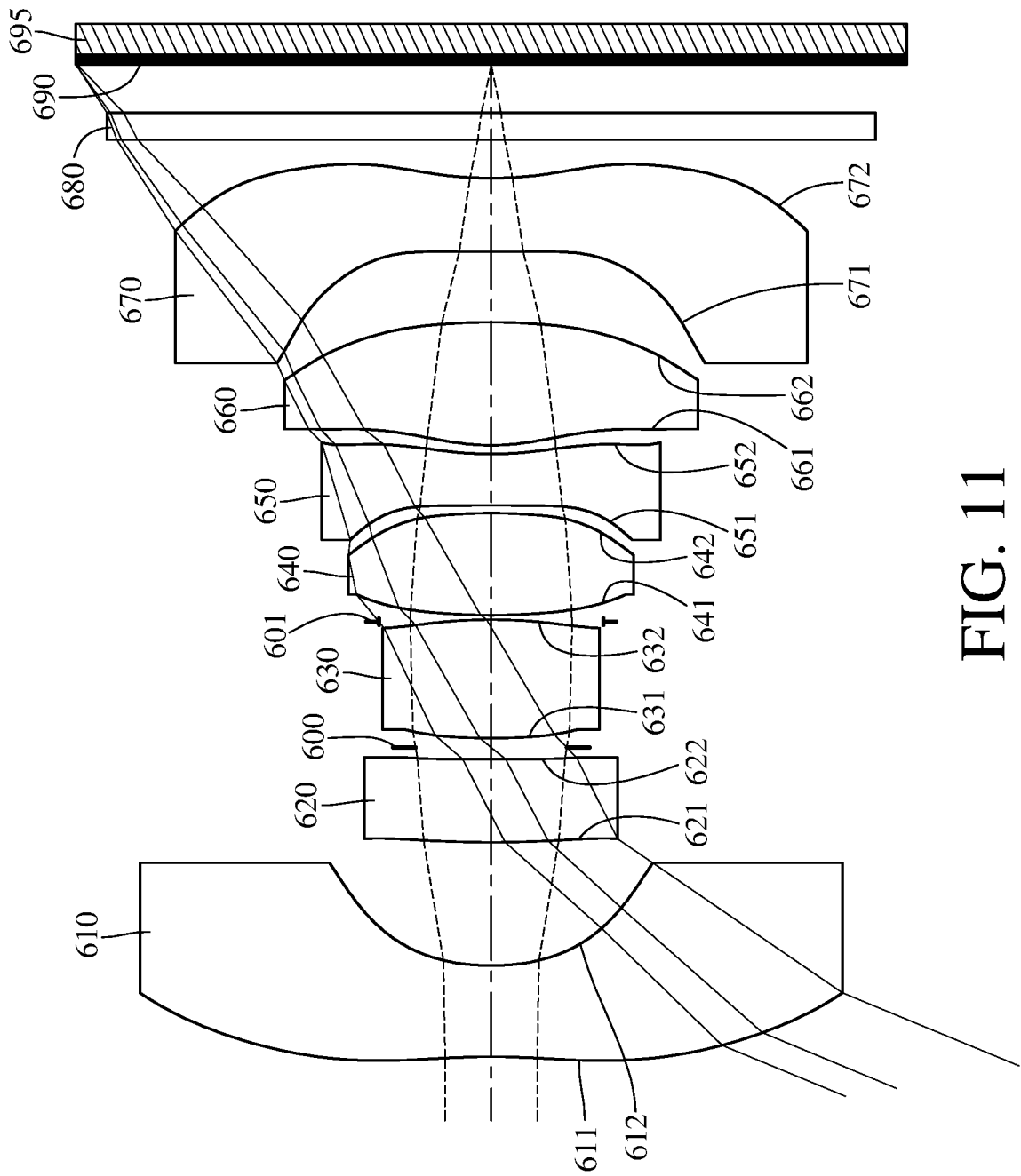
FIG. 11 is a schematic view of an image capturing unit according to the 6th embodiment of the present disclosure.
Figure 12:
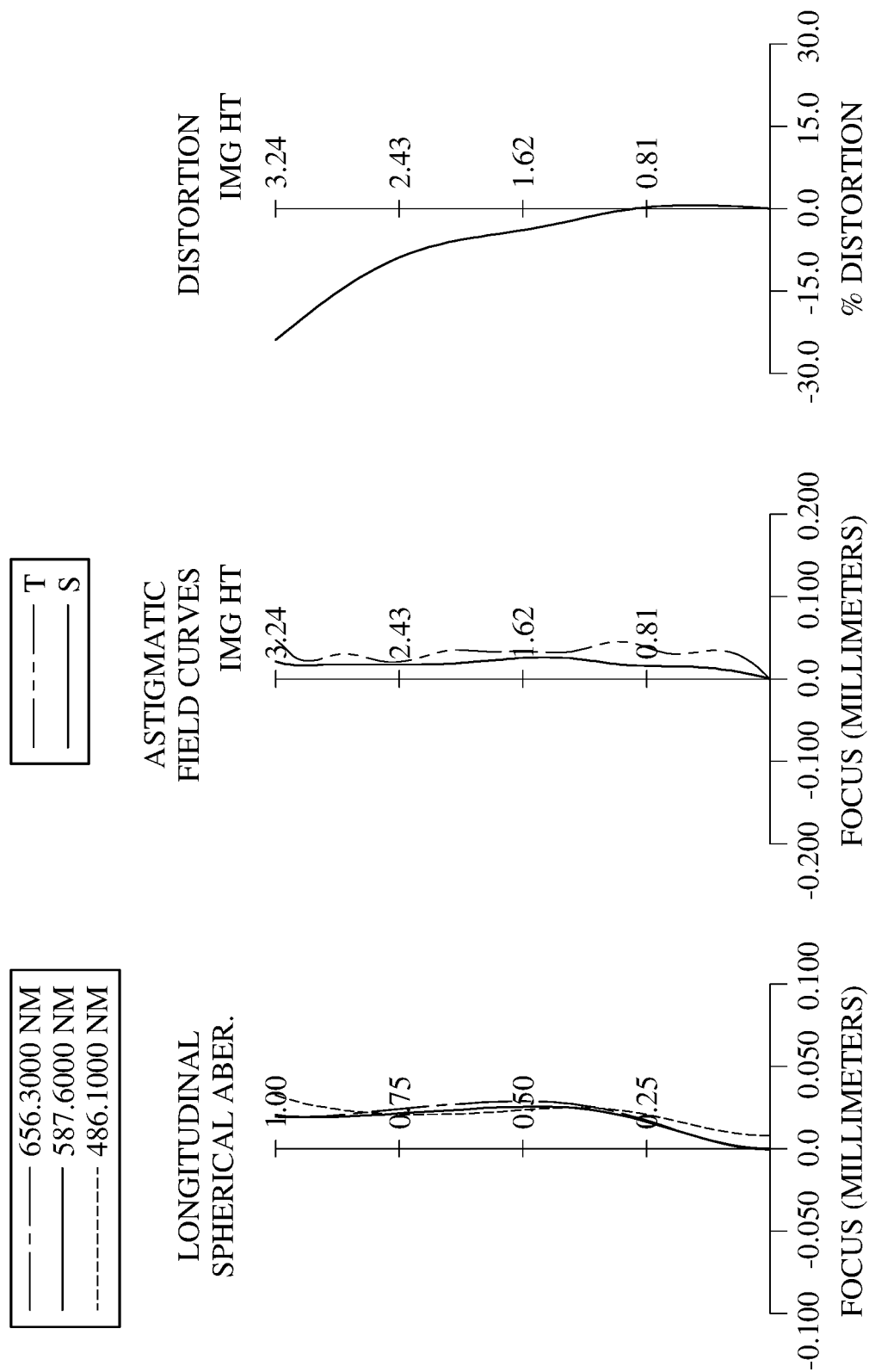
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 695. The photographing optical lens assembly includes, in order from an object side to an image side along an optical path, a first lens element 610, a second lens element 620, an aperture stop 600, a third lens element 630, a stop 601, a fourth lens element 640, a fifth lens element 650, a sixth lens element 660, a seventh lens element 670, an IR-cut filter 680 and an image surface 690. The photographing optical lens assembly includes seven lens elements (610, 620, 630, 640, 650, 660 and 670) with no additional lens element disposed between each of the adjacent seven lens elements.

The first lens element 610 with negative refractive power has an object-side surface 611 being concave in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has at least one convex critical point in an off-axis region thereof.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least two inflection points and at least two critical points in an off-axis region thereof.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has at least one concave critical point in an off-axis region thereof.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has at least one concave critical point in an off-axis region thereof. The image-side surface 672 of the seventh lens element 670 has at least one convex critical point in an off-axis region thereof.

The IR-cut filter 680 is made of glass material and located between the seventh lens element 670 and the image surface 690, and will not affect the focal length of the photographing optical lens assembly. The image sensor 695 is disposed on or near the image surface 690 of the photographing optical lens assembly.

The detailed optical data of the 6th embodiment are shown in Table 11 and the aspheric surface data are shown in Table 12 below.

TABLE 11

6th Embodiment
f = 1.76 mm, Fno = 2.45, HFOV = 67.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.845 | (ASP) | 0.711 | Plastic | 1.545 | 56.1 | −2.38 |
| 2 | | 1.862 | (ASP) | 0.962 | | | | |
| 3 | Lens 2 | 8.441 | (ASP) | 0.650 | Plastic | 1.669 | 19.5 | 10.13 |
| 4 | | −33.287 | (ASP) | 0.091 | | | | |
| 5 | Ape. Stop | Plano | | 0.072 | | | | |
| 6 | Lens 3 | 5.451 | (ASP) | 0.925 | Plastic | 1.545 | 56.1 | 4.53 |
| 7 | | −4.244 | (ASP) | −0.016 | | | | |
| 8 | Stop | Plano | | 0.051 | | | | |
| 9 | Lens 4 | 4.435 | (ASP) | 0.797 | Plastic | 1.544 | 56.0 | 3.41 |
| 10 | | −2.985 | (ASP) | 0.061 | | | | |
| 11 | Lens 5 | −6.177 | (ASP) | 0.400 | Plastic | 1.669 | 19.5 | −2.83 |
| 12 | | 2.799 | (ASP) | 0.068 | | | | |
| 13 | Lens 6 | 1.691 | (ASP) | 0.960 | Plastic | 1.544 | 56.0 | 2.45 |
| 14 | | −5.051 | (ASP) | 0.550 | | | | |
| 15 | Lens 7 | 20.160 | (ASP) | 0.575 | Plastic | 1.669 | 19.5 | −4.98 |
| 16 | | 2.827 | (ASP) | 0.300 | | | | |
| 17 | IR-cut filter | Plano | | 0.210 | Glass | 1.517 | 64.2 | — |
| 18 | | Plano | | 0.374 | | | | |
| 19 | Image | Plano | | 0.000 | | | | |

Note:
Reference wavelength is 587.6 nm (d-line).
An effective radius of the stop 601 (Surface 8) is 0.875 mm.

TABLE 12

Aspheric Coefficients

| Surface # | 1 | 2 | 3 | 4 | 6 |
|---|---|---|---|---|---|
| k = | −8.2890E+01 | −1.1355E+00 | 0.0000E+00 | 9.0000E+01 | 0.0000E+00 |
| A4 = | 5.2491E−02 | 2.1140E−01 | −1.8019E−02 | 1.0006E−01 | 1.3123E−01 |
| A6 = | −1.8614E−02 | −1.6749E−01 | 8.2753E−03 | 3.2499E−02 | 2.5537E−02 |
| A8 = | 4.8902E−03 | 3.6646E−01 | −3.0868E−02 | −1.3058E−01 | −8.8161E−02 |
| A10 = | −8.7520E−04 | −5.2424E−01 | 6.4032E−02 | 1.1552E−01 | 2.3623E−04 |
| A12 = | 9.9051E−05 | 4.4864E−01 | −1.6144E−01 | −8.0611E−02 | 3.6963E−02 |
| A14 = | −6.3147E−06 | −2.0180E−01 | 1.5726E−01 | — | — |
| A16 = | 1.7437E−07 | 3.5276E−02 | −5.2672E−02 | — | — |

| Surface # | 7 | 9 | 10 | 11 | 12 |
|---|---|---|---|---|---|
| k = | 0.0000E+00 | 0.0000E+00 | −9.0000E+01 | 5.4051E+00 | −1.0000E+00 |
| A4 = | −1.0896E−01 | −1.2165E−01 | 3.0648E−01 | 7.7860E−01 | 6.0973E−02 |
| A6 = | 4.2967E−01 | 4.4614E−01 | −2.2705E+00 | −3.7161E+00 | −7.3577E−01 |
| A8 = | −4.9368E−01 | −6.7720E−01 | 4.7561E+00 | 8.9475E+00 | 1.3519E+00 |
| A10 = | 2.2341E−01 | 7.0929E−01 | −5.6106E+00 | −1.5892E+01 | −1.3196E+00 |
| A12 = | 2.1153E−01 | −5.0799E−01 | 3.8481E+00 | 2.1510E+01 | 7.0076E−01 |
| A14 = | −3.3006E−01 | 2.2238E−01 | −1.4058E+00 | −2.1342E+01 | −1.6818E−01 |
| A16 = | 1.2312E−01 | −4.4531E−02 | 2.0912E−01 | 1.4150E+01 | 2.7978E−03 |
| A18 = | — | — | — | −5.4350E+00 | 3.8563E−03 |
| A20 = | — | — | — | 8.9988E−01 | — |

| Surface # | 13 | 14 | 15 | 16 |
|---|---|---|---|---|
| k = | −5.9904E+00 | 0.0000E+00 | 0.0000E+00 | 0.0000E+00 |
| A4 = | −1.0587E−01 | −8.1411E−03 | −7.0789E−02 | 1.4838E−02 |
| A6 = | 1.1362E−02 | 4.3112E−02 | 2.7566E−02 | −2.0892E−01 |
| A8 = | −3.2658E−01 | −3.2344E−01 | −4.5787E−01 | 1.8139E−01 |
| A10 = | 1.0605E+00 | 5.4600E−01 | 7.4430E−01 | −8.1402E−02 |
| A12 = | −1.4602E+00 | −4.4559E−01 | −5.5903E−01 | 2.2101E−02 |
| A14 = | 1.0861E+00 | 2.0096E−01 | 2.3603E−01 | −3.7851E−03 |
| A16 = | −4.5464E−01 | −5.0456E−02 | −5.8959E−02 | 4.0150E−04 |
| A18 = | 1.0097E−01 | 6.4258E−03 | 8.3253E−03 | −2.4155E−05 |
| A20 = | −9.2792E−03 | −3.0229E−04 | −5.1846E−04 | 6.3103E−07 |

In the 6th embodiment, the equation of the aspheric surface profiles of the aforementioned lens elements is the same as the equation of the 1st embodiment. Also, the definitions of these parameters shown in the following table are the same as those stated in the above embodiments with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.76 | ΣAT/(T12 + T67) | 1.22 |
| Fno | 2.45 | TL/ImgH | 2.39 |
| HFOV [deg.] | 67.5 | Y11 [mm] | 2.74 |
| FOV [deg.] | 135.0 | Y72 [mm] | 2.46 |
| Nmax | 1.669 | Y11/Y72 | 1.11 |
| V1/N1 | 36.30 | Y11/ImgH | 0.85 |
| V2/N2 | 11.65 | Y72/f | 1.40 |
| V3/N3 | 36.30 | Y72/BL | 2.78 |
| V4/N4 | 36.26 | (R1 + R2)/(R1 − R2) | 0.44 |
| V5/N5 | 11.65 | (R11 + R12)/(R11 − R12) | −0.50 |
| V6/N6 | 36.26 | |f1/f2| | 0.23 |
| V7/N7 | 11.65 | |f3/f2| | 0.45 |
| V2 + V5 + V7 | 58.36 | |f4/f2| | 0.34 |
| V7 | 19.45 | |f5/f2| | 0.28 |
| T12/T23 | 5.90 | |f6/f2| | 0.24 |
| CT2/BL | 0.73 | f6/f7 | −0.49 |
| Dr3r12/(T23 + T34 + T45 + T56) | 12.41 | — | — |

7th Embodiment

Figure 13:
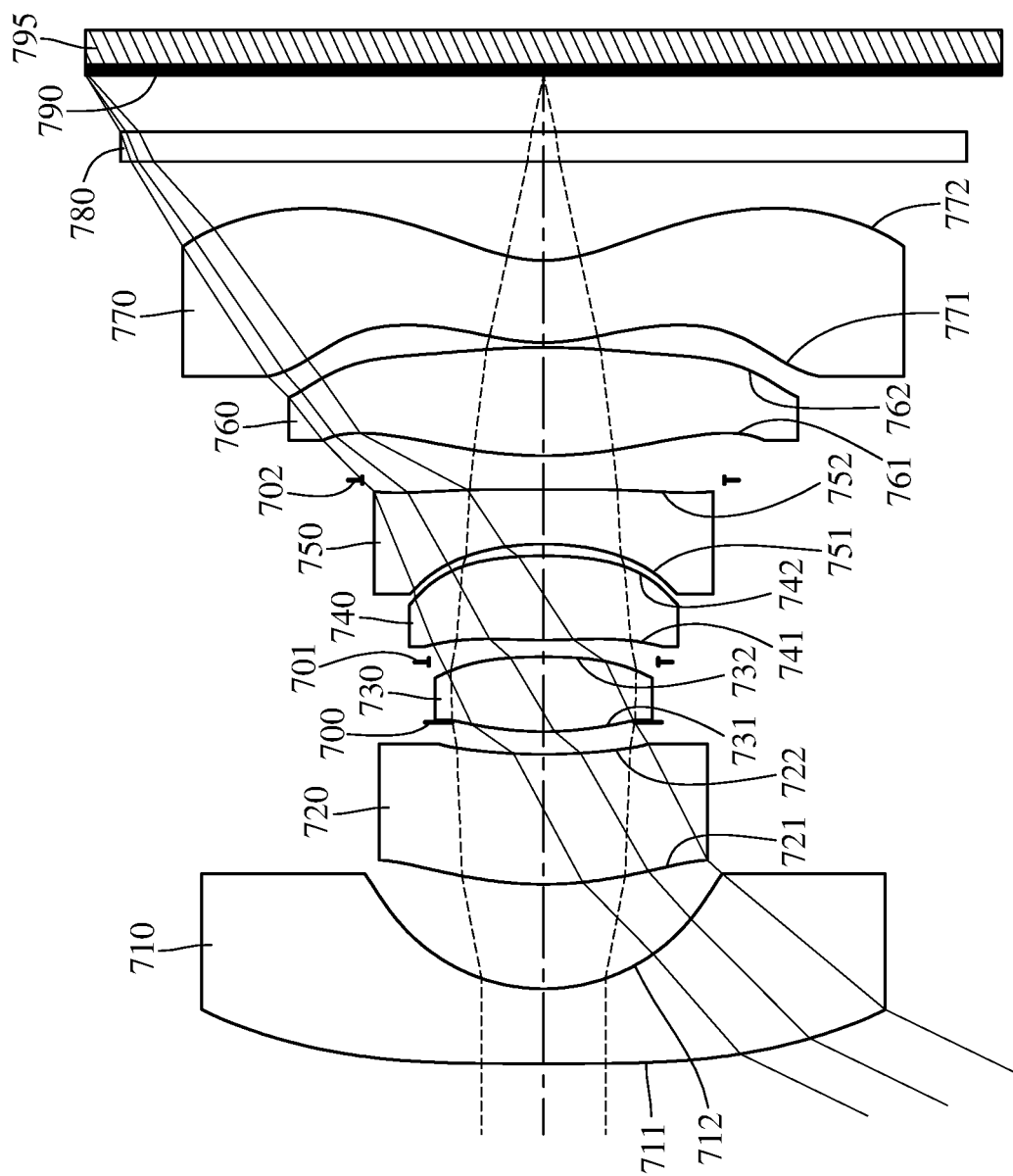
FIG. 13 is a schematic view of an image capturing unit according to the 7th embodiment of the present disclosure.
Figure 14:
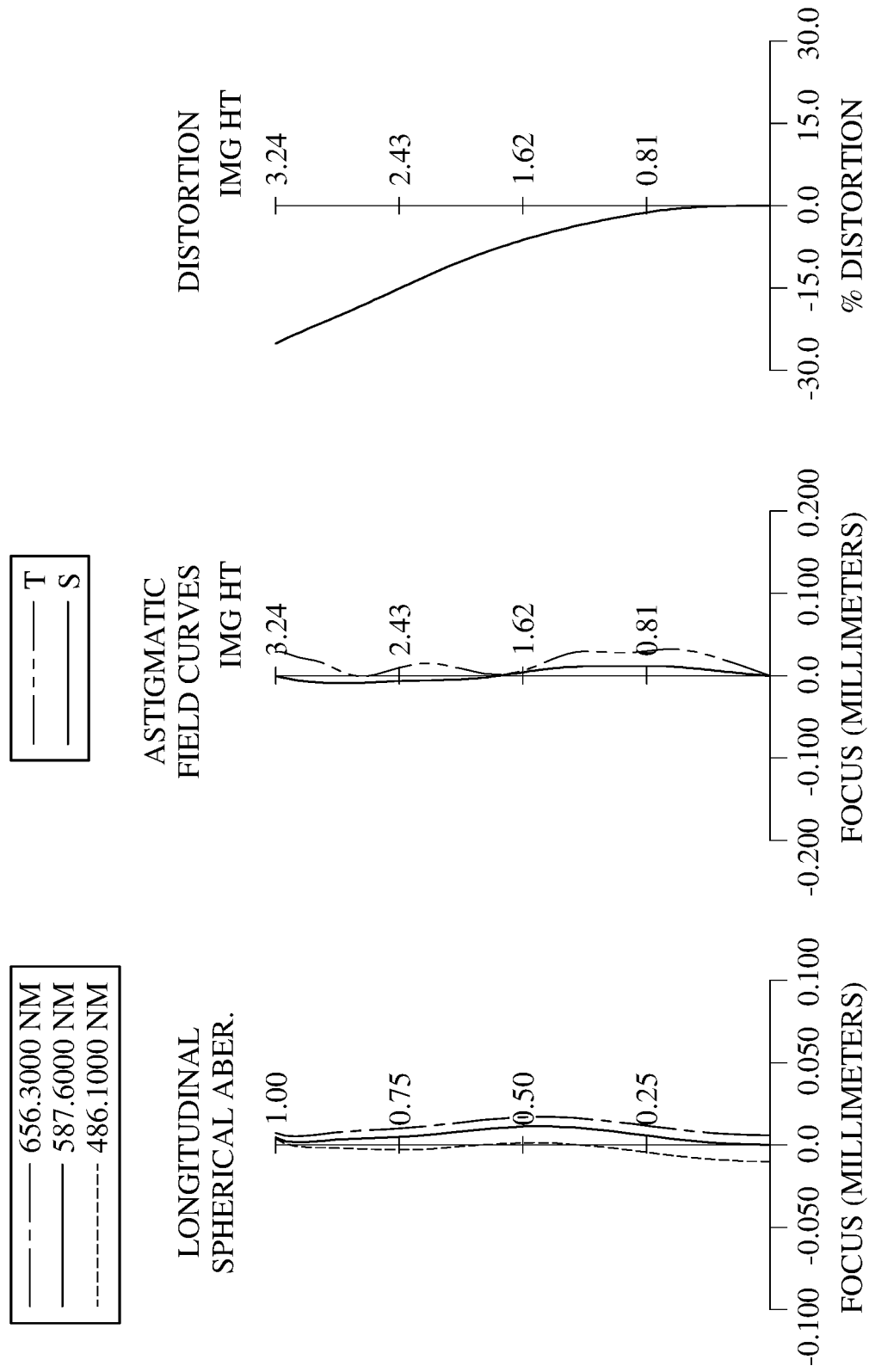
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 795. The photographing optical lens assembly includes, in order from an object side to an image side along an optical path, a first lens element 710, a second lens element 720, an aperture stop 700, a third lens element 730, a stop 701, a fourth lens element 740, a fifth lens element 750, a stop 702, a sixth lens element 760, a seventh lens element 770, an IR-cut filter 780 and an image surface 790. The photographing optical lens assembly includes seven lens elements (710, 720, 730, 740, 750, 760 and 770) with no additional lens element disposed between each of the adjacent seven lens elements.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least two inflection points and at least two critical points in an off-axis region thereof.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has at least one concave critical point in an off-axis region thereof.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has at least one concave critical point in an off-axis region thereof. The image-side surface 772 of the seventh lens element 770 has at least one convex critical point in an off-axis region thereof.

The IR-cut filter 780 is made of glass material and located between the seventh lens element 770 and the image surface 790, and will not affect the focal length of the photographing optical lens assembly. The image sensor 795 is disposed on or near the image surface 790 of the photographing optical lens assembly.

The detailed optical data of the 7th embodiment are shown in Table 13 and the aspheric surface data are shown in Table 14 below.

TABLE 13

7th Embodiment
f = 2.10 mm, Fno = 2.39, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 200.000 | (ASP) | 0.530 | Plastic | 1.545 | 56.1 | −2.48 |
| 2 | | 1.339 | (ASP) | 0.739 | | | | |
| 3 | Lens 2 | 2.582 | (ASP) | 0.920 | Plastic | 1.639 | 23.5 | 9.10 |
| 4 | | 4.002 | (ASP) | 0.226 | | | | |

TABLE 13-continued

7th Embodiment
f = 2.10 mm, Fno = 2.39, HFOV = 64.0 deg.

| Surface # | | Curvature Radius | | Thickness | Material | Index | Abbe # | Focal Length |
|---|---|---|---|---|---|---|---|---|
| 5 | Ape. Stop | Plano | | −0.066 | | | | |
| 6 | Lens 3 | 2.248 | (ASP) | 0.529 | Plastic | 1.545 | 56.1 | 2.89 |
| 7 | | −4.824 | (ASP) | −0.036 | | | | |
| 8 | Stop | Plano | | 0.155 | | | | |
| 9 | Lens 4 | 4.886 | (ASP) | 0.596 | Plastic | 1.544 | 56.0 | 3.40 |
| 10 | | −2.852 | (ASP) | 0.083 | | | | |
| 11 | Lens 5 | −2.019 | (ASP) | 0.385 | Plastic | 1.639 | 23.5 | −2.85 |
| 12 | | 19.936 | (ASP) | 0.067 | | | | |
| 13 | Stop | Plano | | 0.173 | | | | |
| 14 | Lens 6 | 3.105 | (ASP) | 0.766 | Plastic | 1.544 | 56.0 | 3.59 |
| 15 | | −4.818 | (ASP) | 0.035 | | | | |
| 16 | Lens 7 | 1.430 | (ASP) | 0.580 | Plastic | 1.534 | 55.9 | −10.48 |
| 17 | | 0.978 | (ASP) | 0.700 | | | | |
| 18 | IR-cut filter | Plano | | 0.210 | Glass | 1.517 | 64.2 | — |
| 19 | | Plano | | 0.399 | | | | |
| 20 | Image | Plano | | 0.000 | | | | |

Note:
Reference wavelength is 587.6 nm (d-line).
An effective radius of the stop 701 (Surface 8) is 0.810 mm.
An effective radius of the stop 702 (Surface 13) is 1.280 mm.

TABLE 14

Aspheric Coefficients

| Surface # | 1 | 2 | 3 | 4 | 6 |
|---|---|---|---|---|---|
| k = | 9.9000E+01 | −1.0000E+00 | 0.0000E+00 | −8.3734E+01 | 0.0000E+00 |
| A4 = | 2.6081E−02 | 4.8362E−02 | −5.3675E−02 | 8.2073E−02 | −1.1843E−01 |
| A6 = | −7.2472E−03 | 9.6222E−03 | −1.6589E−03 | −8.6224E−02 | 1.5959E−01 |
| A8 = | 1.9015E−03 | 3.7180E−02 | 2.7472E−02 | −2.1402E−01 | −2.9560E−01 |
| A10 = | −3.4801E−04 | −6.1261E−02 | −2.3464E−02 | 2.3118E+00 | 2.9898E−01 |
| A12 = | 3.5027E−05 | 5.9761E−02 | −2.0813E−03 | −5.1043E+00 | — |
| A14 = | −1.3544E−06 | −2.0427E−02 | 2.7036E−03 | 4.0276E+00 | — |

| Surface # | 7 | 9 | 10 | 11 | 12 |
|---|---|---|---|---|---|
| k = | −1.0459E+00 | 0.0000E+00 | 0.0000E+00 | 2.2263E+00 | 0.0000E+00 |
| A4 = | −4.1057E−01 | −3.8113E−01 | −6.4486E−02 | −8.2811E−02 | −1.5017E−01 |
| A6 = | 3.3351E−01 | 2.4745E−01 | −5.6220E−01 | 3.6579E−02 | 5.2506E−02 |
| A8 = | −3.6903E−02 | −4.6480E−01 | 7.7238E−01 | −5.6434E−01 | 3.5029E−01 |
| A10 = | −3.9952E−01 | 2.1392E+00 | 3.7564E−01 | 3.0339E+00 | −6.3511E−01 |
| A12 = | 4.4996E−01 | −4.3452E+00 | −2.5706E+00 | −6.3812E+00 | 4.9595E−01 |
| A14 = | — | 3.9162E+00 | 2.6878E+00 | 5.6529E+00 | −1.8775E−01 |
| A16 = | — | −1.2850E+00 | −8.6724E−01 | −1.7745E+00 | 2.8096E−02 |

| Surface # | 14 | 15 | 16 | 17 |
|---|---|---|---|---|
| k = | 0.0000E+00 | 0.0000E+00 | −1.0000E+00 | −1.0000E+00 |
| A4 = | 6.6513E−02 | 1.0812E−01 | −3.1858E−01 | −4.1310E−01 |
| A6 = | −3.5850E−01 | −2.2529E−01 | 2.6797E−03 | 2.7164E−01 |
| A8 = | 6.2989E−01 | 3.9865E−01 | 2.5021E−01 | −1.3357E−01 |
| A10 = | −6.8576E−01 | −4.1179E−01 | −2.5910E−01 | 4.5591E−02 |
| A12 = | 4.7127E−01 | 2.4377E−01 | 1.2852E−01 | −1.0708E−02 |
| A14 = | −2.0348E−01 | −8.6063E−02 | −3.6010E−02 | 1.7015E−03 |
| A16 = | 5.2877E−02 | 1.7910E−02 | 5.8478E−03 | −1.7462E−04 |
| A18 = | −7.4305E−03 | −2.0121E−03 | −5.1621E−04 | 1.0420E−05 |
| A20 = | 4.2075E−04 | 9.3075E−05 | 1.9246E−05 | −2.7413E−07 |

In the 7th embodiment, the equation of the aspheric surface profiles of the aforementioned lens elements is the same as the equation of the 1st embodiment. Also, the definitions of these parameters shown in the following table are the same as those stated in the above embodiments with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.10 | $\Sigma AT/(T12 + T67)$ | 1.78 |
| Fno | 2.39 | TL/ImgH | 2.16 |
| HFOV [deg.] | 64.0 | Y11 [mm] | 2.41 |
| FOV [deg.] | 128.0 | Y72 [mm] | 2.55 |
| Nmax | 1.639 | Y11/Y72 | 0.95 |
| V1/N1 | 36.30 | Y11/ImgH | 0.75 |
| V2/N2 | 14.34 | Y72/f | 1.21 |
| V3/N3 | 36.30 | Y72/BL | 1.95 |

-continued

7th Embodiment

| | | | |
|---|---|---|---|
| V4/N4 | 36.26 | (R1 + R2)/(R1 − R2) | 1.01 |
| V5/N5 | 14.34 | (R11 + R12)/(R11 − R12) | −0.22 |
| V6/N6 | 36.26 | |f1/f2| | 0.27 |
| V7/N7 | 36.46 | |f3/f2| | 0.32 |
| V2 + V5 + V7 | 102.91 | |f4/f2| | 0.37 |
| V7 | 55.92 | |f5/f2| | 0.31 |
| T12/T23 | 4.62 | |f6/f2| | 0.39 |
| CT2/BL | 0.70 | f6/f7 | −0.34 |
| Dr3r12/(T23 + T34 + T45 + T56) | 6.31 | — | — |

8th Embodiment

Figure 15:
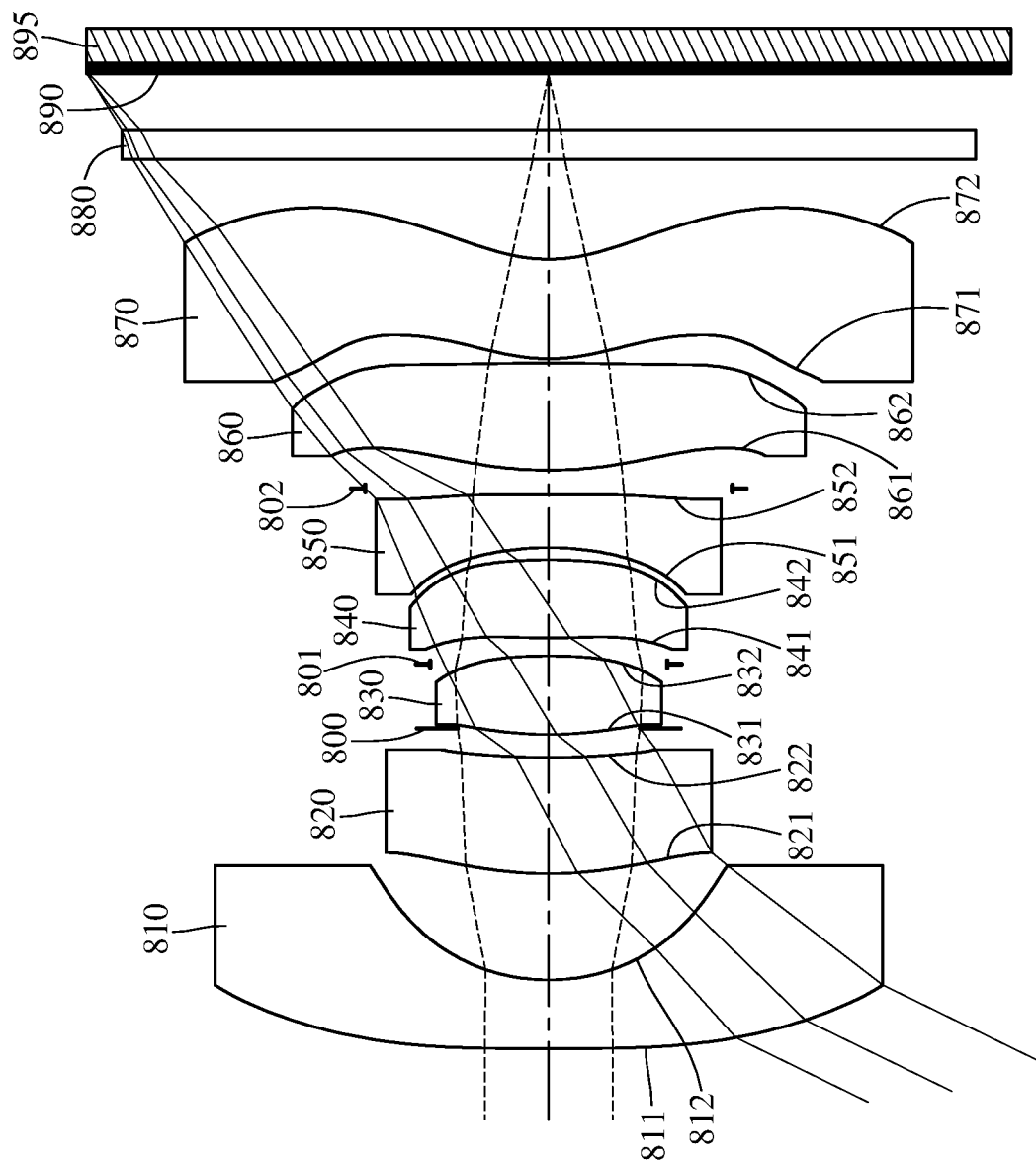
FIG. 15 is a schematic view of an image capturing unit according to the 8th embodiment of the present disclosure.
Figure 16:
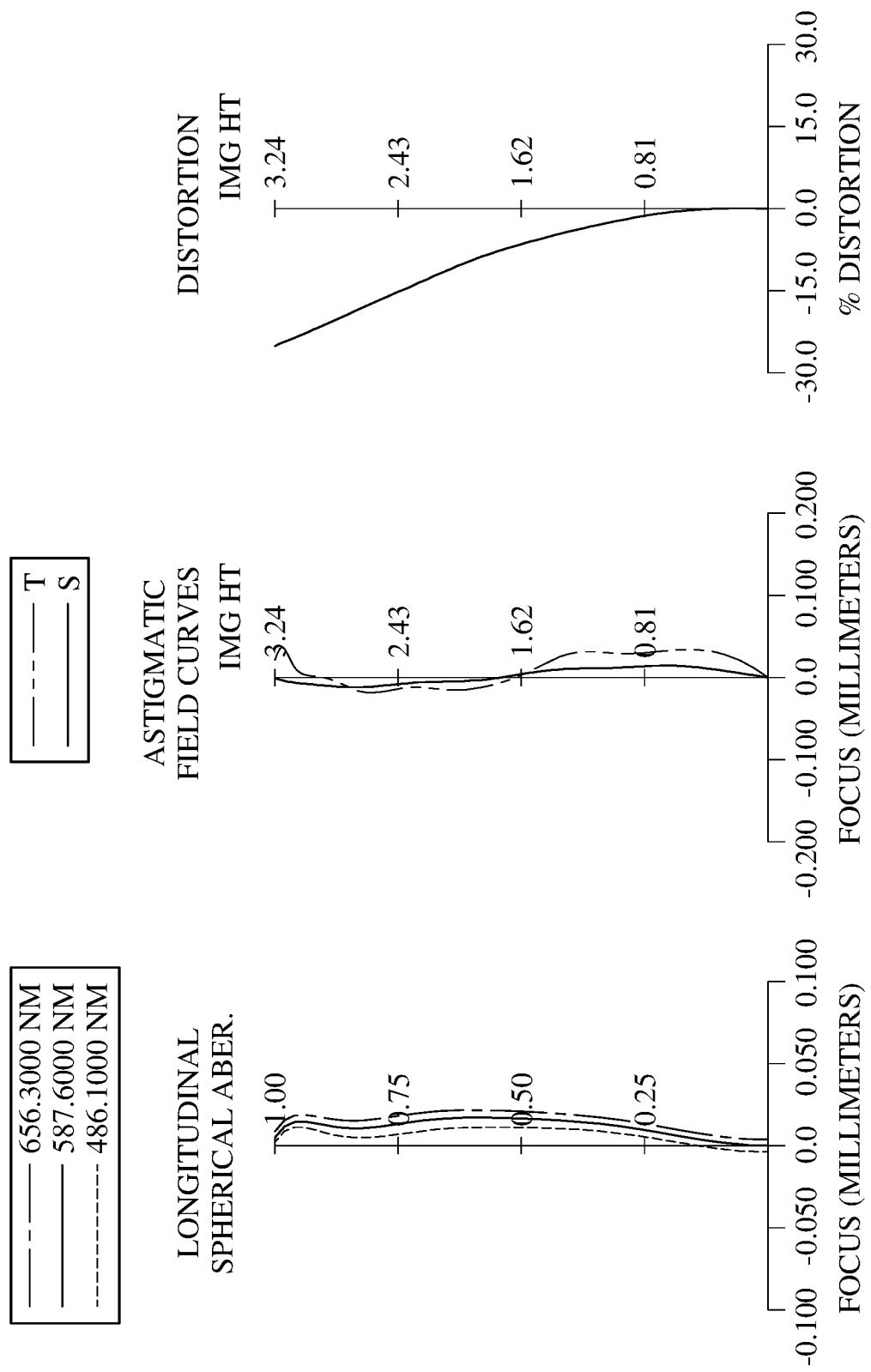
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 895. The photographing optical lens assembly includes, in order from an object side to an image side along an optical path, a first lens element 810, a second lens element 820, an aperture stop 800, a third lens element 830, a stop 801, a fourth lens element 840, a fifth lens element 850, a stop 802, a sixth lens element 860, a seventh lens element 870, an IR-cut filter 880 and an image surface 890. The photographing optical lens assembly includes seven lens elements (810, 820, 830, 840, 850, 860 and 870) with no additional lens element disposed between each of the adjacent seven lens elements.

The first lens element 810 with negative refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least two inflection points and at least two critical points in an off-axis region thereof.

The sixth lens element 860 with positive refractive power has an object-side surface 861 being convex in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has at least one concave critical point in an off-axis region thereof.

The seventh lens element 870 with positive refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has at least one concave critical point in an off-axis region thereof. The image-side surface 872 of the seventh lens element 870 has at least one convex critical point in an off-axis region thereof.

The IR-cut filter 880 is made of glass material and located between the seventh lens element 870 and the image surface 890, and will not affect the focal length of the photographing optical lens assembly. The image sensor 895 is disposed on or near the image surface 890 of the photographing optical lens assembly.

The detailed optical data of the 8th embodiment are shown in Table 15 and the aspheric surface data are shown in Table 16 below.

TABLE 15

8th Embodiment
f = 2.10 mm, Fno = 2.35, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 200.000 | (ASP) | 0.481 | Plastic | 1.545 | 56.1 | −2.60 |
| 2 | | 1.406 | (ASP) | 0.745 | | | | |
| 3 | Lens 2 | 2.712 | (ASP) | 0.815 | Plastic | 1.639 | 23.5 | 8.12 |
| 4 | | 5.018 | (ASP) | 0.204 | | | | |
| 5 | Ape. Stop | Plano | | −0.043 | | | | |
| 6 | Lens 3 | 2.501 | (ASP) | 0.550 | Plastic | 1.545 | 56.1 | 3.09 |
| 7 | | −4.745 | (ASP) | −0.057 | | | | |
| 8 | Stop | Plano | | 0.184 | | | | |
| 9 | Lens 4 | 5.113 | (ASP) | 0.548 | Plastic | 1.544 | 56.0 | 3.88 |
| 10 | | −3.458 | (ASP) | 0.085 | | | | |
| 11 | Lens 5 | −2.095 | (ASP) | 0.370 | Plastic | 1.660 | 20.4 | −2.92 |
| 12 | | 25.284 | (ASP) | 0.045 | | | | |

TABLE 15-continued

8th Embodiment
f = 2.10 mm, Fno = 2.35, HFOV = 64.0 deg.

| Surface # | | Curvature Radius | | Thickness | Material | Index | Abbe # | Focal Length |
|---|---|---|---|---|---|---|---|---|
| 13 | Stop | Plano | | 0.128 | | | | |
| 14 | Lens 6 | 3.058 | (ASP) | 0.751 | Plastic | 1.544 | 56.0 | 4.43 |
| 15 | | −10.413 | (ASP) | 0.030 | | | | |
| 16 | Lens 7 | 1.320 | (ASP) | 0.697 | Plastic | 1.544 | 56.0 | 111.29 |
| 17 | | 1.098 | (ASP) | 0.700 | | | | |
| 18 | IR-cut filter | Plano | | 0.210 | Glass | 1.517 | 64.2 | — |
| 19 | | Plano | | 0.389 | | | | |
| 20 | Image | Plano | | 0.000 | | | | |

Note:
Reference wavelength is 587.6 nm (d-line).
An effective radius of the stop 801 (Surface 8) is 0.830 mm.
An effective radius of the stop 802 (Surface 13) is 1.285 mm.

TABLE 16

Aspheric Coefficients

| Surface # | 1 | 2 | 3 | 4 | 6 |
|---|---|---|---|---|---|
| k = | 9.9000E+01 | −1.0000E+00 | 0.0000E+00 | −3.3989E+01 | 0.0000E+00 |
| A4 = | 4.1994E−02 | 7.5831E−02 | −5.5736E−02 | −4.0005E−02 | −1.2687E−01 |
| A6 = | −1.6491E−02 | 1.1899E−02 | 1.8464E−02 | 2.5789E−01 | 5.2101E−01 |
| A8 = | 5.1035E−03 | 1.8264E−02 | −3.5185E−02 | −1.1971E+00 | −3.5854E+00 |
| A10 = | −9.9285E−04 | −5.2336E−02 | 4.6832E−02 | 3.8858E+00 | 1.3911E+01 |
| A12 = | 1.0493E−04 | 6.1673E−02 | −4.2298E−02 | −6.1653E+00 | −3.0597E+01 |
| A14 = | −4.3971E−06 | −2.2254E−02 | 1.2753E−02 | 3.9442E+00 | 3.4137E+01 |
| A16 = | — | — | — | — | −1.4862E+01 |

| Surface # | 7 | 9 | 10 | 11 | 12 |
|---|---|---|---|---|---|
| k = | 1.5094E+01 | 0.0000E+00 | 0.0000E+00 | 2.6797E+00 | 0.0000E+00 |
| A4 = | −3.9432E−01 | −3.7918E−01 | 2.4951E−02 | 3.4985E−02 | −1.1491E−01 |
| A6 = | 3.3158E−01 | 9.8320E−02 | −2.0879E−01 | 4.0745E−01 | −5.9210E−02 |
| A8 = | −4.3218E−01 | −3.6794E−01 | −2.2077E+00 | −3.2597E+00 | 4.2706E−01 |
| A10 = | 6.1646E−01 | 1.9524E+00 | 7.3180E+00 | 8.5807E+00 | −5.5321E−01 |
| A12 = | 6.6726E−02 | −2.8014E+00 | −9.7235E+00 | −1.0818E+01 | 3.4145E−01 |
| A14 = | −1.7743E+00 | 1.2385E+00 | 5.9386E+00 | 6.4363E+00 | −1.0257E−01 |
| A16 = | 1.4428E+00 | 4.2866E−02 | −1.3659E+00 | −1.4089E+00 | 1.1860E−02 |

| Surface # | 14 | 15 | 16 | 17 |
|---|---|---|---|---|
| k = | 0.0000E+00 | 0.0000E+00 | −1.0000E+00 | −1.0000E+00 |
| A4 = | 1.4238E−01 | 1.7643E−01 | −2.4863E−01 | −2.9818E−01 |
| A6 = | −6.4811E−01 | −5.2149E−01 | −1.2932E−01 | 1.3768E−01 |
| A8 = | 1.2372E+00 | 9.4345E−01 | 3.7110E−01 | −3.5308E−02 |
| A10 = | −1.5157E+00 | −1.0122E+00 | −3.1394E−01 | −5.0686E−04 |
| A12 = | 1.2134E+00 | 6.6109E−01 | 1.3494E−01 | 3.1769E−03 |
| A14 = | −6.3303E−01 | −2.7070E−01 | −3.1785E−02 | −9.5906E−04 |
| A16 = | 2.0760E−01 | 6.8216E−02 | 4.0073E−03 | 1.3817E−04 |

In the 8th embodiment, the equation of the aspheric surface profiles of the aforementioned lens elements is the same as the equation of the 1st embodiment. Also, the definitions of these parameters shown in the following table are the same as those stated in the above embodiments with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.10 | ΣAT/(T12 + T67) | 1.70 |
| Fno | 2.35 | TL/ImgH | 2.11 |
| HFOV [deg.] | 64.0 | Y11 [mm] | 2.34 |
| FOV [deg.] | 128.0 | Y72 [mm] | 2.55 |
| Nmax | 1.660 | Y11/Y72 | 0.92 |
| V1/N1 | 36.30 | Y11/ImgH | 0.72 |
| V2/N2 | 14.34 | Y72/f | 1.21 |
| V3/N3 | 36.30 | Y72/BL | 1.96 |
| V4/N4 | 36.26 | (R1 + R2)/(R1 − R2) | 1.01 |
| V5/N5 | 12.29 | (R11 + R12)/(R11 − R12) | −0.55 |
| V6/N6 | 36.26 | |f1/f2| | 0.32 |
| V7/N7 | 36.26 | |f3/f2| | 0.38 |
| V2 + V5 + V7 | 99.87 | |f4/f2| | 0.48 |
| V7 | 55.98 | |f5/f2| | 0.36 |
| T12/T23 | 4.63 | |f6/f2| | 0.55 |
| CT2/BL | 0.63 | f6/f7 | 0.04 |
| Dr3r12/(T23 + T34 + T45 + T56) | 6.56 | — | — |

9th Embodiment

Figure 17:
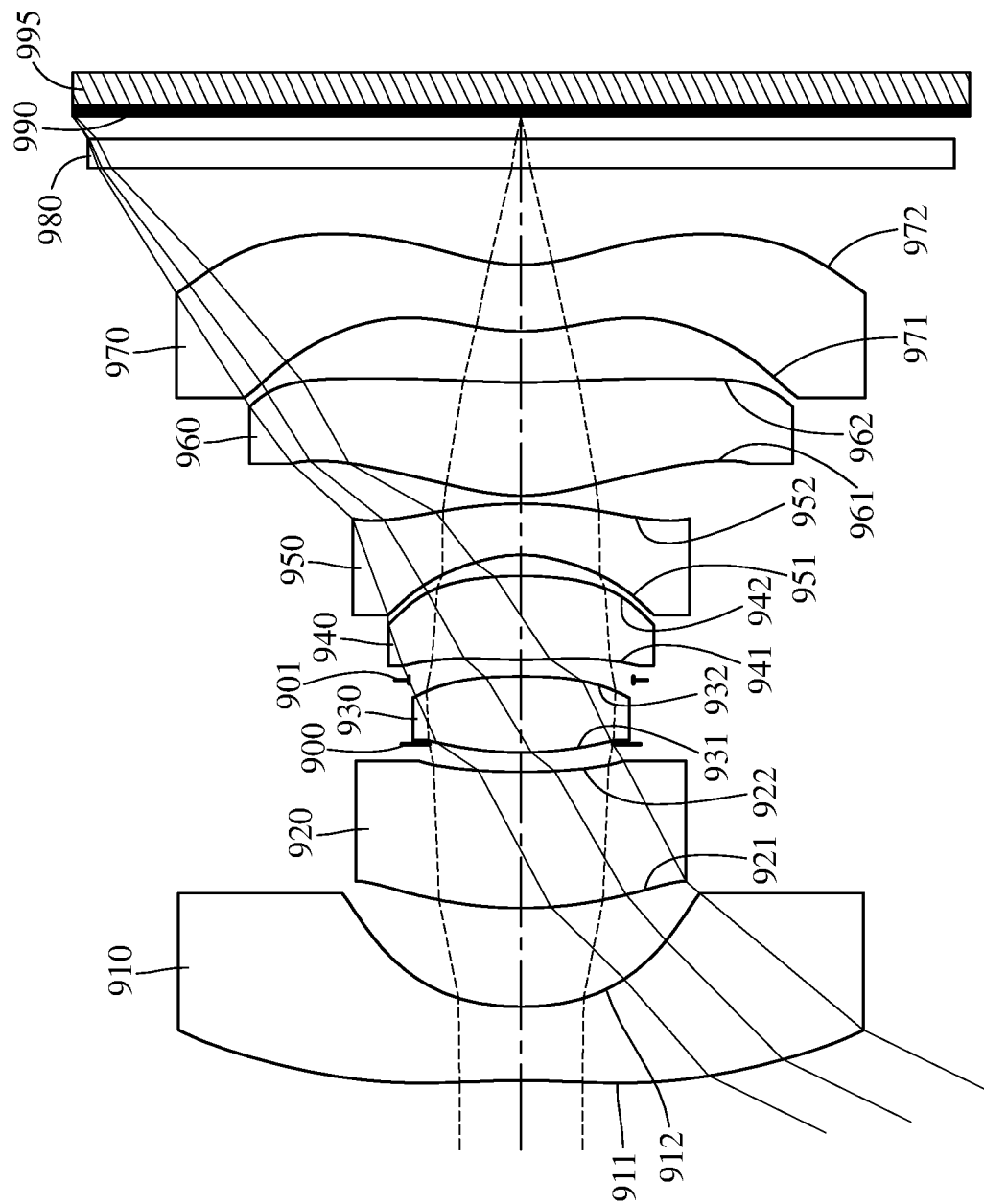
FIG. 17 is a schematic view of an image capturing unit according to the 9th embodiment of the present disclosure.
Figure 18:
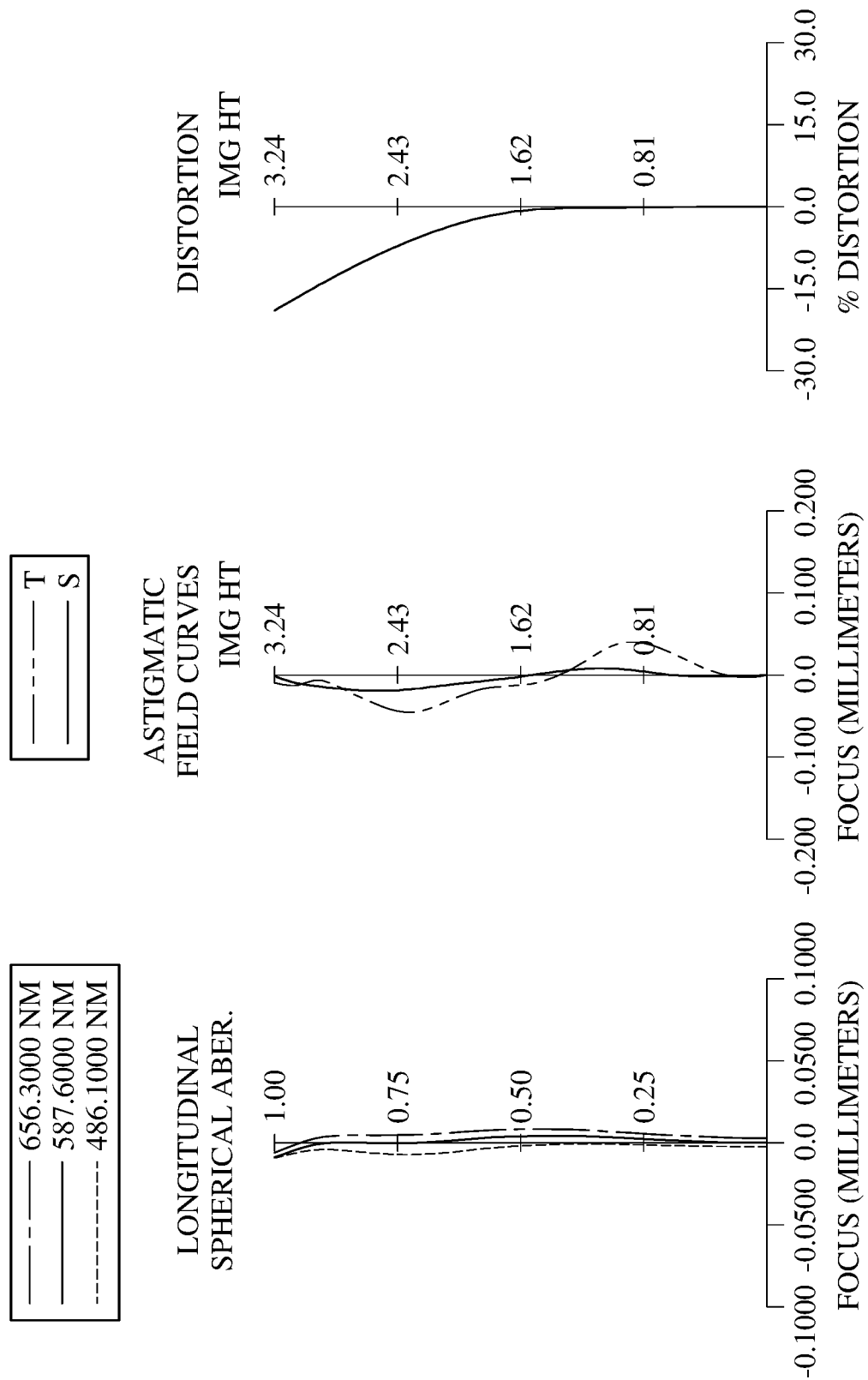
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens assembly (its reference numeral is omitted) of the present disclosure and an image sensor 995. The photographing optical lens assembly includes, in order from an object side to an image side along an optical path, a first lens element 910, a second lens element 920, an aperture stop 900, a third lens element 930, a stop 901, a fourth lens element 940, a fifth lens element 950, a sixth lens element 960, a seventh lens element 970, an IR-cut filter 980 and an image surface 990. The photographing optical lens assembly includes seven lens elements (910, 920, 930, 940, 950, 960 and 970) with no additional lens element disposed between each of the adjacent seven lens elements.

The first lens element 910 with negative refractive power has an object-side surface 911 being concave in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has at least one convex critical point in an off-axis region thereof.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The image-side surface 952 of the fifth lens element 950 has at least one inflection point and at least one critical point in an off-axis region thereof.

The sixth lens element 960 with positive refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has at least one concave critical point in an off-axis region thereof.

The seventh lens element 970 with negative refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric. The object-side surface 971 of the seventh lens element 970 has at least one concave critical point in an off-axis region thereof. The image-side surface 972 of the seventh lens element 970 has at least one convex critical point in an off-axis region thereof.

The IR-cut filter 980 is made of glass material and located between the seventh lens element 970 and the image surface 990, and will not affect the focal length of the photographing optical lens assembly. The image sensor 995 is disposed on or near the image surface 990 of the photographing optical lens assembly.

The detailed optical data of the 9th embodiment are shown in Table 17 and the aspheric surface data are shown in Table 18 below.

TABLE 17

9th Embodiment
f = 1.95 mm, Fno = 2.20, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.441 | (ASP) | 0.534 | Plastic | 1.545 | 56.1 | −2.50 |
| 2 | | 1.880 | (ASP) | 0.713 | | | | |
| 3 | Lens 2 | 2.893 | (ASP) | 0.985 | Plastic | 1.639 | 23.5 | 10.51 |
| 4 | | 4.409 | (ASP) | 0.201 | | | | |
| 5 | Ape. Stop | Plano | | −0.061 | | | | |
| 6 | Lens 3 | 2.306 | (ASP) | 0.550 | Plastic | 1.545 | 56.1 | 3.07 |
| 7 | | −5.596 | (ASP) | −0.026 | | | | |
| 8 | Stop | Plano | | 0.147 | | | | |
| 9 | Lens 4 | 4.149 | (ASP) | 0.606 | Plastic | 1.544 | 56.0 | 3.02 |
| 10 | | −2.575 | (ASP) | 0.152 | | | | |
| 11 | Lens 5 | −0.886 | (ASP) | 0.370 | Plastic | 1.639 | 23.5 | −2.23 |
| 12 | | −2.720 | (ASP) | 0.059 | | | | |
| 13 | Lens 6 | 1.320 | (ASP) | 0.818 | Plastic | 1.544 | 56.0 | 3.03 |
| 14 | | 5.205 | (ASP) | 0.371 | | | | |

TABLE 17-continued

9th Embodiment
f = 1.95 mm, Fno = 2.20, HFOV = 64.0 deg.

| Surface # | | Curvature Radius | | Thickness | Material | Index | Abbe # | Focal Length |
|---|---|---|---|---|---|---|---|---|
| 15 | Lens 7 | 1.468 | (ASP) | 0.480 | Plastic | 1.587 | 28.3 | −33.38 |
| 16 | | 1.201 | (ASP) | 0.700 | | | | |
| 17 | IR-cut filter | Plano | | 0.210 | Glass | 1.517 | 64.2 | — |
| 18 | | Plano | | 0.163 | | | | |
| 19 | Image | Plano | | 0.000 | | | | |

Note:
Reference wavelength is 587.6 nm (d-line).
An effective radius of the stop 901 (Surface 8) is 0.810 mm.

TABLE 18

Aspheric Coefficients

| Surface # | 1 | 2 | 3 | 4 | 6 |
|---|---|---|---|---|---|
| k = | −9.9000E+01 | −1.2635E+00 | −2.1483E+01 | −4.2642E+01 | −2.9867E+00 |
| A4 = | 8.3624E−02 | 1.9196E−01 | 9.0592E−02 | 1.4702E−02 | −8.1002E−02 |
| A6 = | −4.5392E−02 | 1.8596E−03 | −1.0330E−01 | 3.8947E−01 | 1.9148E−01 |
| A8 = | 1.6406E−02 | −1.1302E−01 | 8.0821E−02 | −1.9593E+00 | −2.9709E−01 |
| A10 = | −3.8365E−03 | 1.0877E−01 | −1.2753E−02 | 6.6210E+00 | 2.5358E−01 |
| A12 = | 5.4922E−04 | −2.6519E−02 | −2.4079E−02 | −1.0808E+01 | −5.7767E−02 |
| A14 = | −4.3437E−05 | −3.0844E−03 | 7.8978E−03 | 6.9253E+00 | — |
| A16 = | 1.4593E−06 | — | — | — | — |

| Surface # | 7 | 9 | 10 | 11 | 12 |
|---|---|---|---|---|---|
| k = | 1.5826E+01 | −1.4062E+01 | −4.5670E+00 | −1.1654E+00 | −3.0746E+01 |
| A4 = | −4.9312E−01 | −4.5275E−01 | 7.2910E−02 | 8.5927E−01 | −2.5718E−02 |
| A6 = | 7.9919E−01 | 5.8179E−01 | −1.2530E+00 | −3.1042E+00 | −3.6557E−01 |
| A8 = | −1.4726E+00 | −1.4161E+00 | 2.9155E+00 | 7.0813E+00 | 1.3628E+00 |
| A10 = | 2.4657E+00 | 4.3186E+00 | −4.7855E+00 | −1.0394E+01 | −2.0616E+00 |
| A12 = | −2.6906E+00 | −7.3766E+00 | 4.9445E+00 | 8.2589E+00 | 1.6768E+00 |
| A14 = | 1.3133E+00 | 5.8559E+00 | −2.9331E+00 | −2.8256E+00 | −7.4623E−01 |
| A16 = | — | −1.6397E+00 | 8.2233E−01 | 1.9196E−01 | 1.6783E−01 |
| A18 = | — | — | — | — | −1.4501E−02 |

| Surface # | 13 | 14 | 15 | 16 |
|---|---|---|---|---|
| k = | −6.2972E−01 | −1.0759E+01 | −8.5363E−01 | −1.0354E+00 |
| A4 = | −4.7048E−01 | −1.4068E−01 | −3.9544E−01 | −3.8378E−01 |
| A6 = | 6.0212E−01 | 1.6180E−01 | 1.3427E−01 | 2.6410E−01 |
| A8 = | −6.8800E−01 | −1.5141E−01 | 6.1268E−02 | −1.3694E−01 |
| A10 = | 5.9392E−01 | 1.1193E−01 | −1.2145E−01 | 5.0114E−02 |
| A12 = | −3.6764E−01 | −5.7009E−02 | 8.0899E−02 | −1.2784E−02 |
| A14 = | 1.5349E−01 | 1.8322E−02 | −2.9458E−02 | 2.2320E−03 |
| A16 = | −4.0473E−02 | −3.5225E−03 | 6.0848E−03 | −2.5547E−04 |
| A18 = | 6.0556E−03 | 3.6773E−04 | −6.6422E−04 | 1.7306E−05 |
| A20 = | −3.9240E−04 | −1.5934E−05 | 2.9650E−05 | −5.2452E−07 |

In the 9th embodiment, the equation of the aspheric surface profiles of the aforementioned lens elements is the same as the equation of the 1st embodiment. Also, the definitions of these parameters shown in the following table are the same as those stated in the above embodiments with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.95 | ΣAT/(T12 + T67) | 1.44 |
| Fno | 2.20 | TL/ImgH | 2.15 |
| HFOV [deg.] | 64.0 | Y11 [mm] | 2.47 |
| FOV [deg.] | 128.0 | Y72 [mm] | 2.49 |
| Nmax | 1.639 | Y11/Y72 | 0.99 |
| V1/N1 | 36.30 | Y11/ImgH | 0.76 |
| V2/N2 | 14.34 | Y72/f | 1.27 |
| V3/N3 | 36.30 | Y72/BL | 2.32 |
| V4/N4 | 36.26 | (R1 + R2)/(R1 − R2) | 0.49 |
| V5/N5 | 14.34 | (R11 + R12)/(R11 − R12) | −1.68 |
| V6/N6 | 36.26 | |f1/f2| | 0.24 |
| V7/N7 | 17.83 | |f3/f2| | 0.29 |
| V2 + V5 + V7 | 75.28 | |f4/f2| | 0.29 |
| V7 | 28.30 | |f5/f2| | 0.21 |
| T12/T23 | 5.09 | |f6/f2| | 0.29 |
| CT2/BL | 0.92 | f6/f7 | −0.09 |
| Dr3r12/(T23 + T34 + T45 + T56) | 8.05 | — | — |

10th Embodiment

Figure 19:
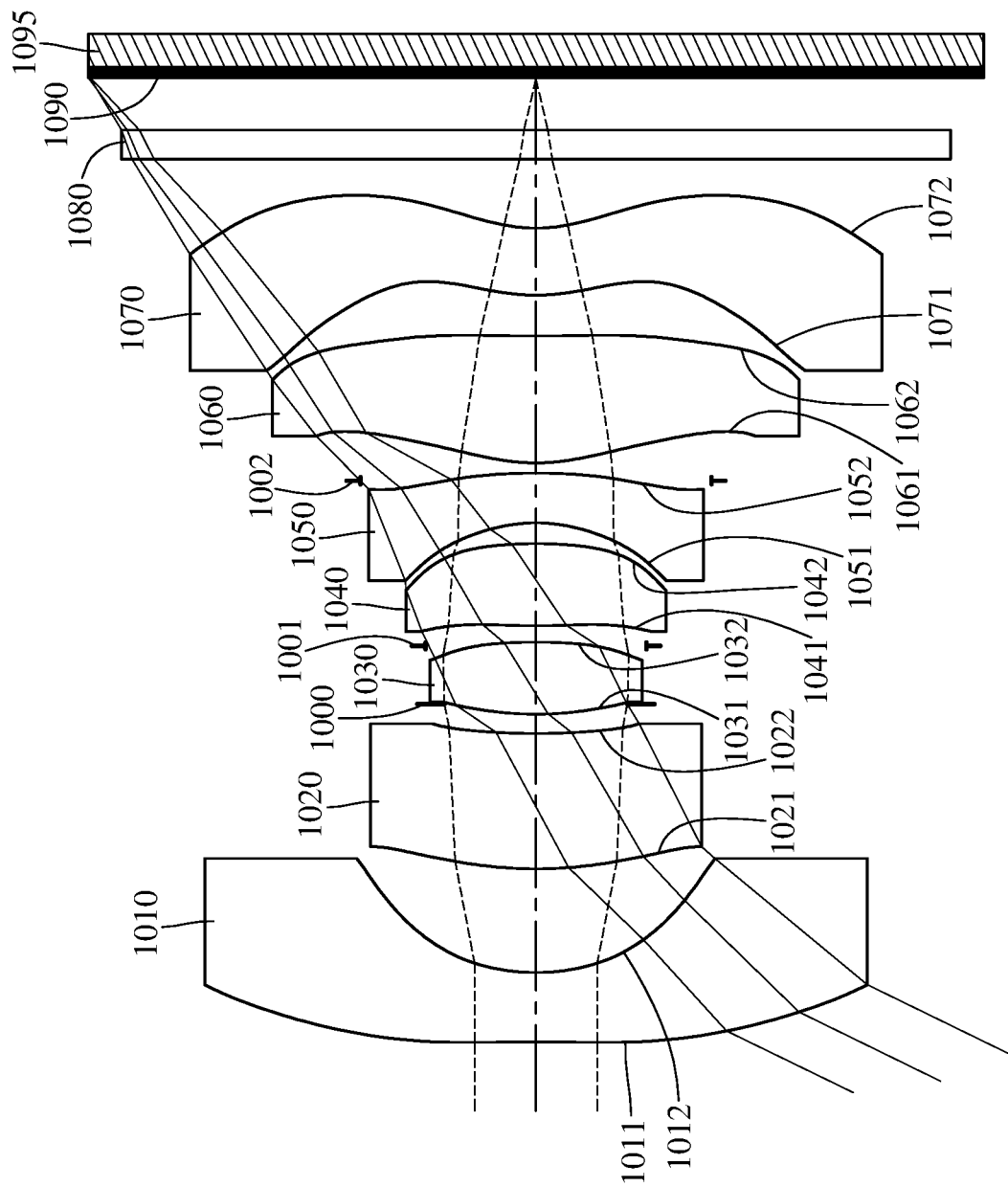
FIG. 19 is a schematic view of an image capturing unit according to the 10th embodiment of the present disclosure.
Figure 20:
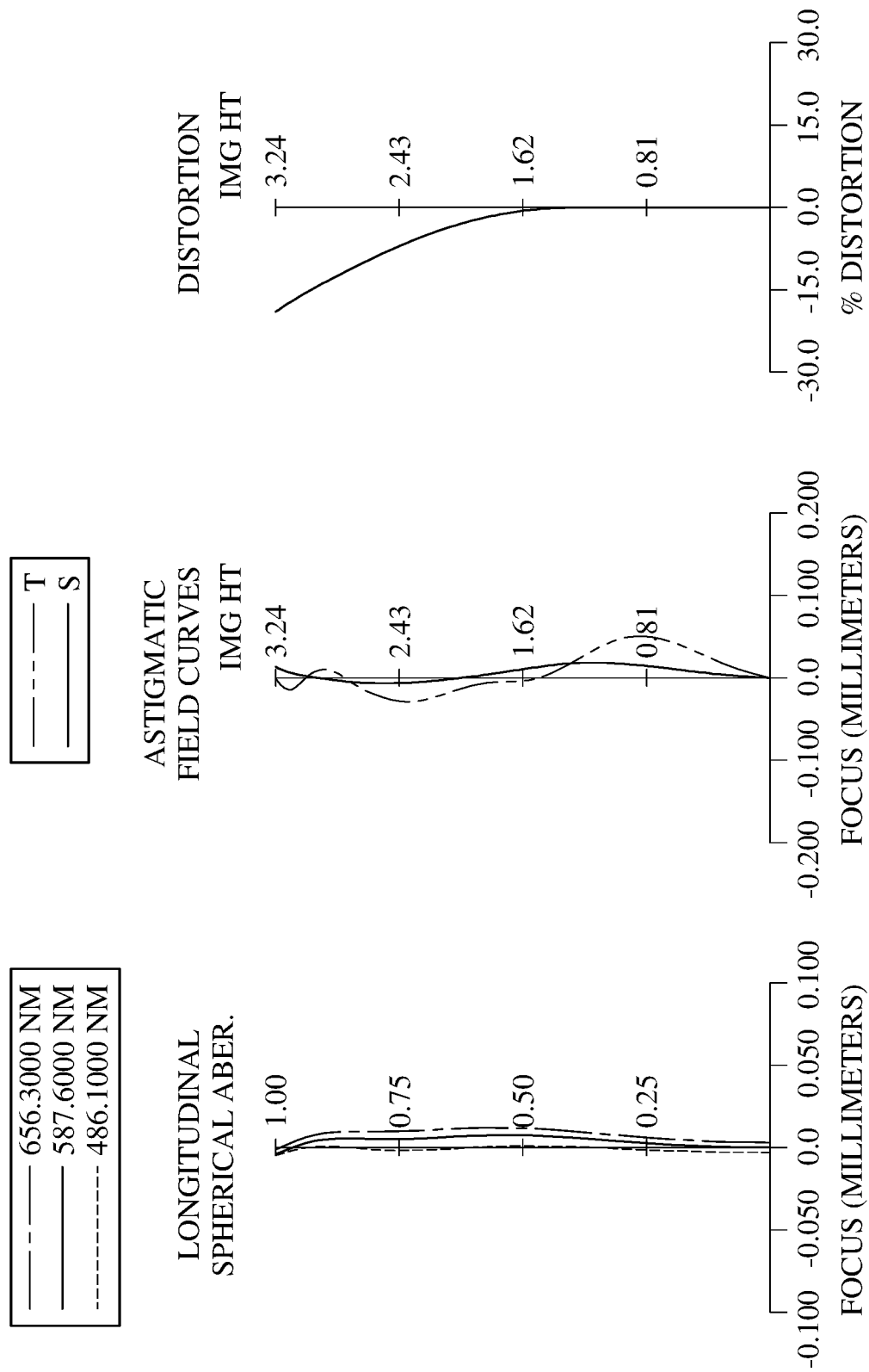
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical lens assembly (its reference numeral is omitted) of the present disclosure and an image sensor 1095. The photographing optical lens assembly includes, in order from an object side to an image side along an optical path, a first lens element 1010, a second lens element 1020, an aperture stop 1000, a third lens element 1030, a stop 1001, a fourth lens element 1040, a fifth lens element 1050, a stop 1002, a sixth lens element 1060, a seventh lens element 1070, an IR-cut filter 1080 and an image surface 1090. The photographing optical lens assembly includes seven lens elements (1010, 1020, 1030, 1040, 1050, 1060 and 1070) with no additional lens element disposed between each of the adjacent seven lens elements.

The first lens element 1010 with negative refractive power has an object-side surface 1011 being concave in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has at least one convex critical point in an off-axis region thereof.

The second lens element 1020 with positive refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. The image-side surface 1052 of the fifth lens element 1050 has at least one inflection point and at least one critical point in an off-axis region thereof.

The sixth lens element 1060 with positive refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. The object-side surface 1061 of the sixth lens element 1060 has at least one concave critical point in an off-axis region thereof.

The seventh lens element 1070 with negative refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric. The object-side surface 1071 of the seventh lens element 1070 has at least one concave critical point in an off-axis region thereof. The image-side surface 1072 of the seventh lens element 1070 has at least one convex critical point in an off-axis region thereof.

The IR-cut filter 1080 is made of glass material and located between the seventh lens element 1070 and the image surface 1090, and will not affect the focal length of the photographing optical lens assembly. The image sensor 1095 is disposed on or near the image surface 1090 of the photographing optical lens assembly.

The detailed optical data of the 10th embodiment are shown in Table 19 and the aspheric surface data are shown in Table 20 below.

TABLE 19

10th Embodiment
f = 1.95 mm, Fno = 2.20, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −13.357 | (ASP) | 0.502 | Plastic | 1.545 | 56.1 | −2.55 |
| 2 | | 1.573 | (ASP) | 0.751 | | | | |
| 3 | Lens 2 | 3.007 | (ASP) | 0.980 | Plastic | 1.639 | 23.5 | 9.64 |
| 4 | | 5.132 | (ASP) | 0.212 | | | | |
| 5 | Ape. Stop | Plano | | −0.072 | | | | |
| 6 | Lens 3 | 2.413 | (ASP) | 0.521 | Plastic | 1.545 | 56.1 | 3.20 |
| 7 | | −5.808 | (ASP) | −0.027 | | | | |
| 8 | Stop | Plano | | 0.146 | | | | |
| 9 | Lens 4 | 4.337 | (ASP) | 0.595 | Plastic | 1.544 | 56.0 | 3.40 |
| 10 | | −3.063 | (ASP) | 0.151 | | | | |
| 11 | Lens 5 | −1.058 | (ASP) | 0.360 | Plastic | 1.639 | 23.5 | −2.23 |
| 12 | | −4.668 | (ASP) | −0.055 | | | | |
| 13 | Stop | Plano | | 0.128 | | | | |
| 14 | Lens 6 | 1.351 | (ASP) | 0.920 | Plastic | 1.544 | 56.0 | 2.69 |
| 15 | | 13.315 | (ASP) | 0.295 | | | | |
| 16 | Lens 7 | 1.404 | (ASP) | 0.486 | Plastic | 1.587 | 28.3 | −26.70 |
| 17 | | 1.123 | (ASP) | 0.500 | | | | |

TABLE 19-continued

10th Embodiment
f = 1.95 mm, Fno = 2.20, HFOV = 64.0 deg.

| Surface # | | Curvature Radius | Thickness | Material | Index | Abbe # | Focal Length |
|---|---|---|---|---|---|---|---|
| 18 | IR-cut filter | Plano | 0.210 | Glass | 1.517 | 64.2 | — |
| 19 | | Plano | 0.378 | | | | |
| 20 | Image | Plano | 0.000 | | | | |

Note:
Reference wavelength is 587.6 nm (d-line).
An effective radius of the stop 1001 (Surface 8) is 0.800 mm.
An effective radius of the stop 1002 (Surface 13) is 1.270 mm.

TABLE 20

Aspheric Coefficients

| Surface # | 1 | 2 | 3 | 4 | 6 |
|---|---|---|---|---|---|
| k = | −9.9000E+01 | −1.0078E+00 | −3.3868E+01 | −6.3865E+01 | −1.1595E+00 |
| A4 = | 8.6789E−02 | 1.2344E−01 | 1.1229E−01 | 1.8989E−02 | −6.5753E−02 |
| A6 = | −4.7182E−02 | 5.3611E−02 | −1.6928E−01 | 3.0338E−01 | 1.3657E−01 |
| A8 = | 1.7209E−02 | −1.3888E−01 | 1.5624E−01 | −1.5786E+00 | −8.6790E−02 |
| A10 = | −4.0863E−03 | 1.1071E−01 | −7.6681E−02 | 5.4718E+00 | −1.5796E−01 |
| A12 = | 6.0008E−04 | −2.9651E−02 | 7.5060E−03 | −9.0729E+00 | 3.8718E−01 |
| A14 = | −4.9199E−05 | −4.4898E−04 | 2.5175E−03 | 5.9381E+00 | — |
| A16 = | 1.7291E−06 | — | — | — | — |

| Surface # | 7 | 9 | 10 | 11 | 12 |
|---|---|---|---|---|---|
| k = | −9.8026E+00 | −1.0833E+01 | −1.5935E+00 | −7.7563E−01 | −9.7609E+01 |
| A4 = | −4.6961E−01 | −4.2395E−01 | 7.4539E−02 | 6.4054E−01 | −1.0363E−01 |
| A6 = | 8.1527E−01 | 5.2576E−01 | −1.4802E+00 | −2.7269E+00 | −4.6676E−01 |
| A8 = | −1.8575E+00 | −1.4089E+00 | 3.9705E+00 | 6.7918E+00 | 1.9445E+00 |
| A10 = | 3.7708E+00 | 4.4567E+00 | −6.8477E+00 | −9.7397E+00 | −3.0797E+00 |
| A12 = | −4.7207E+00 | −7.9907E+00 | 6.8145E+00 | 6.3860E+00 | 2.6491E+00 |
| A14 = | 2.7281E+00 | 6.7641E+00 | −3.7108E+00 | −7.3278E−01 | −1.2944E+00 |
| A16 = | — | −2.0086E+00 | 9.5255E−01 | −5.9577E−01 | 3.4026E−01 |
| A18 = | — | — | — | — | −3.7887E−02 |

| Surface # | 14 | 15 | 16 | 17 |
|---|---|---|---|---|
| k = | −6.6149E−01 | −9.9000E+01 | −9.7608E−01 | −1.0797E+00 |
| A4 = | −4.1965E−01 | −7.0939E−02 | −3.8196E−01 | −3.6303E−01 |
| A6 = | 4.1025E−01 | 3.0786E−02 | 1.3254E−01 | 2.0664E−01 |
| A8 = | −3.1892E−01 | −7.2612E−02 | −8.5337E−02 | −9.1786E−02 |
| A10 = | 1.6674E−01 | 1.1281E−01 | 7.9607E−02 | 3.1152E−02 |
| A12 = | −4.7234E−02 | −7.9905E−02 | −4.0244E−02 | −7.7429E−03 |
| A14 = | −3.2811E−03 | 3.0152E−02 | 1.0356E−02 | 1.3328E−03 |
| A16 = | 7.5959E−03 | −6.3483E−03 | −1.3148E−03 | −1.4895E−04 |
| A18 = | −2.2815E−03 | 7.0394E−04 | 6.6913E−05 | 9.7056E−06 |
| A20 = | 2.2692E−04 | −3.1962E−05 | −2.5927E−07 | −2.8002E−07 |

In the 10th embodiment, the equation of the aspheric surface profiles of the aforementioned lens elements is the same as the equation of the 1st embodiment. Also, the definitions of these parameters shown in the following table are the same as those stated in the above embodiments with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.95 | ΣAT/(T12 + T67) | 1.46 |
| Fno | 2.20 | TL/ImgH | 2.16 |
| HFOV [deg.] | 64.0 | Y11 [mm] | 2.40 |
| FOV [deg.] | 128.0 | Y72 [mm] | 2.50 |
| Nmax | 1.639 | Y11/Y72 | 0.96 |
| V1/N1 | 36.30 | Y11/ImgH | 0.74 |
| V2/N2 | 14.34 | Y72/f | 1.29 |
| V3/N3 | 36.30 | Y72/BL | 2.30 |
| V4/N4 | 36.26 | (R1 + R2)/(R1 − R2) | 0.79 |
| V5/N5 | 14.34 | (R11 + R12)/(R11 − R12) | −1.23 |
| V6/N6 | 36.26 | |f1/f2| | 0.26 |
| V7/N7 | 17.83 | |f3/f2| | 0.33 |
| V2 + V5 + V7 | 75.28 | |f4/f2| | 0.35 |
| V7 | 28.30 | |f5/f2| | 0.23 |
| T12/T23 | 5.36 | |f6/f2| | 0.28 |
| CT2/BL | 0.90 | f6/f7 | −0.10 |
| Dr3r12/(T23 + T34 + T45 + T56) | 7.99 | — | — |

11th Embodiment

Figure 21:
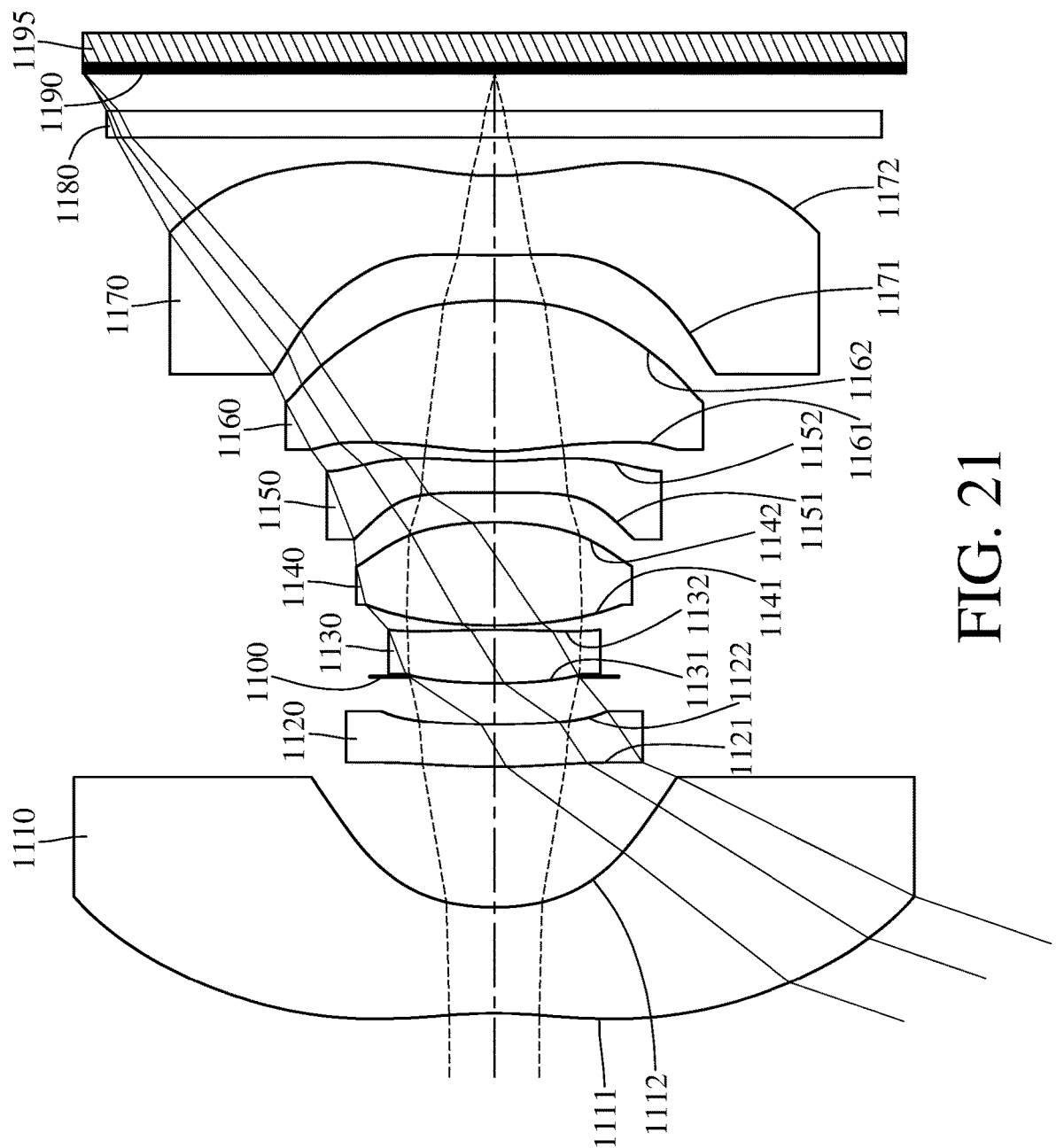
FIG. 21 is a schematic view of an image capturing unit according to the 11th embodiment of the present disclosure.

FIG. 21 is a schematic view of an image capturing unit according to the 11th embodiment of the present disclosure.

Figure 22:
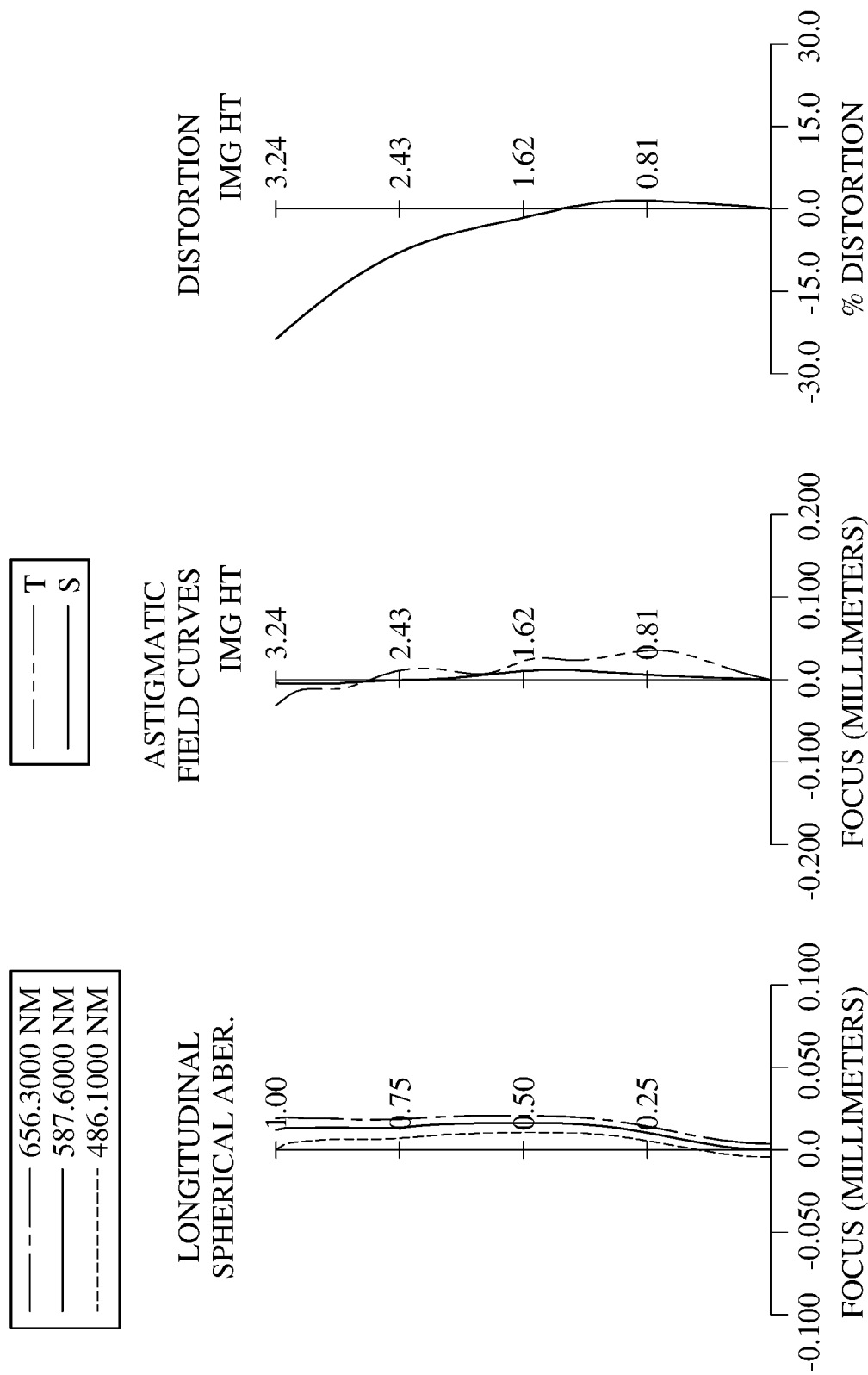
FIG. 22 shows spherical aberration curves, astigmatic field curves and a distortion curve of the image capturing unit according to the 11th embodiment.

FIG. 22 shows, in order from left to right, spherical aberration curves, astigmatic field curves and a distortion curve of the image capturing unit according to the 11th embodiment. In FIG. 21, the image capturing unit includes the photographing optical lens assembly (its reference numeral is omitted) of the present disclosure and an image sensor 1195. The photographing optical lens assembly includes, in order from an object side to an image side along an optical path, a first lens element 1110, a second lens element 1120, an aperture stop 1100, a third lens element 1130, a fourth lens element 1140, a fifth lens element 1150, a sixth lens element 1160, a seventh lens element 1170, an IR-cut filter 1180 and an image surface 1190. The photographing optical lens assembly includes seven lens elements (1110, 1120, 1130, 1140, 1150, 1160 and 1170) with no additional lens element disposed between each of the adjacent seven lens elements.

The first lens element 1110 with negative refractive power has an object-side surface 1111 being concave in a paraxial region thereof and an image-side surface 1112 being concave in a paraxial region thereof. The first lens element 1110 is made of plastic material and has the object-side surface 1111 and the image-side surface 1112 being both aspheric. The object-side surface 1111 of the first lens element 1110 has at least one convex critical point in an off-axis region thereof.

The second lens element 1120 with positive refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being convex in a paraxial region thereof. The third lens element 1130 is made of plastic material and has the object-side surface 1131 and the image-side surface 1132 being both aspheric.

The fourth lens element 1140 with positive refractive power has an object-side surface 1141 being convex in a paraxial region thereof and an image-side surface 1142 being convex in a paraxial region thereof. The fourth lens element 1140 is made of plastic material and has the object-side surface 1141 and the image-side surface 1142 being both aspheric.

The fifth lens element 1150 with negative refractive power has an object-side surface 1151 being convex in a paraxial region thereof and an image-side surface 1152 being concave in a paraxial region thereof. The fifth lens element 1150 is made of plastic material and has the object-side surface 1151 and the image-side surface 1152 being both aspheric. The image-side surface 1152 of the fifth lens element 1150 has at least two inflection points and at least one critical point in an off-axis region thereof.

The sixth lens element 1160 with positive refractive power has an object-side surface 1161 being convex in a paraxial region thereof and an image-side surface 1162 being convex in a paraxial region thereof. The sixth lens element 1160 is made of plastic material and has the object-side surface 1161 and the image-side surface 1162 being both aspheric. The object-side surface 1161 of the sixth lens element 1160 has at least one concave critical point in an off-axis region thereof.

The seventh lens element 1170 with negative refractive power has an object-side surface 1171 being convex in a paraxial region thereof and an image-side surface 1172 being concave in a paraxial region thereof. The seventh lens element 1170 is made of plastic material and has the object-side surface 1171 and the image-side surface 1172 being both aspheric. The object-side surface 1171 of the seventh lens element 1170 has at least one concave critical point in an off-axis region thereof. The image-side surface 1172 of the seventh lens element 1170 has at least one convex critical point in an off-axis region thereof.

The IR-cut filter 1180 is made of glass material and located between the seventh lens element 1170 and the image surface 1190, and will not affect the focal length of the photographing optical lens assembly. The image sensor 1195 is disposed on or near the image surface 1190 of the photographing optical lens assembly.

The detailed optical data of the 11th embodiment are shown in Table 21 and the aspheric surface data are shown in Table 22 below.

TABLE 21

11th Embodiment
f = 1.46 mm, Fno = 2.05, HFOV = 71.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.659 | (ASP) | 0.839 | Plastic | 1.545 | 56.0 | −2.28 |
| 2 | | 2.029 | (ASP) | 1.105 | | | | |
| 3 | Lens 2 | 5.802 | (ASP) | 0.338 | Plastic | 1.614 | 26.0 | 28.75 |
| 4 | | 8.453 | (ASP) | 0.376 | | | | |
| 5 | Ape. Stop | Plano | | −0.052 | | | | |
| 6 | Lens 3 | 5.051 | (ASP) | 0.420 | Plastic | 1.583 | 30.2 | 5.50 |
| 7 | | −8.502 | (ASP) | 0.035 | | | | |
| 8 | Lens 4 | 4.089 | (ASP) | 0.812 | Plastic | 1.544 | 55.9 | 3.27 |
| 9 | | −2.925 | (ASP) | 0.234 | | | | |
| 10 | Lens 5 | 106.856 | (ASP) | 0.250 | Plastic | 1.680 | 15.4 | −5.25 |
| 11 | | 3.453 | (ASP) | 0.077 | | | | |
| 12 | Lens 6 | 2.212 | (ASP) | 1.187 | Plastic | 1.544 | 55.9 | 2.57 |
| 13 | | −3.089 | (ASP) | 0.359 | | | | |
| 14 | Lens 7 | 11.025 | (ASP) | 0.629 | Plastic | 1.705 | 14.0 | −5.49 |
| 15 | | 2.798 | (ASP) | 0.300 | | | | |
| 16 | IR-cut filter | Plano | | 0.210 | Glass | 1.517 | 64.2 | — |
| 17 | | Plano | | 0.295 | | | | |
| 18 | Image | Plano | | 0.000 | | | | |

Note:
Reference wavelength is 587.6 nm (d-line).

TABLE 22

Aspheric Coefficients

| Surface # | 1 | 2 | 3 | 4 | 6 |
|---|---|---|---|---|---|
| k = | −5.1925E+01 | −9.7975E−01 | 0.0000E+00 | −5.3609E+01 | 0.0000E+00 |
| A4 = | 5.8896E−02 | 2.5901E−01 | −5.4667E−02 | 5.2127E−02 | 6.7300E−02 |
| A6 = | −2.2499E−02 | −2.1636E−01 | −2.0663E−02 | −4.6921E−02 | 2.0314E−01 |
| A8 = | 6.4423E−03 | 3.1943E−01 | 2.8239E−02 | 5.4993E−01 | −7.6969E−01 |
| A10 = | −1.3152E−03 | −3.4825E−01 | 7.0456E−03 | −2.0767E+00 | −2.3692E+00 |
| A12 = | 1.8748E−04 | 2.1214E−01 | −5.9735E−02 | 5.7052E+00 | 4.4514E+01 |
| A14 = | −1.8141E−05 | −3.3184E−02 | 1.3137E−01 | −1.0234E+01 | −2.1518E+02 |
| A16 = | 1.1341E−06 | −3.7506E−02 | −1.3832E−01 | 1.1845E+01 | 5.1359E+02 |
| A18 = | −4.1240E−08 | 2.1261E−02 | 6.7596E−02 | −8.0983E+00 | −6.2065E+02 |
| A20 = | 6.6285E−10 | −3.3134E−03 | −1.2495E−02 | 2.4307E+00 | 3.0343E+02 |

| Surface # | 7 | 8 | 9 | 10 | 11 |
|---|---|---|---|---|---|
| k = | 0.0000E+00 | 0.0000E+00 | −2.0813E+01 | −9.0000E+01 | −1.0000E+00 |
| A4 = | 1.0042E−01 | 8.8713E−02 | −1.7197E−01 | −9.5498E−02 | −1.9516E−01 |
| A6 = | −2.1881E−01 | −2.5889E−01 | −4.0333E−01 | −7.8508E−01 | −4.2248E−01 |
| A8 = | 6.7058E−01 | 6.8351E−01 | 2.0187E+00 | 2.5810E+00 | 1.8298E+00 |
| A10 = | −4.9528E−01 | −1.1316E+00 | −5.9254E+00 | −6.5056E+00 | −3.4708E+00 |
| A12 = | −2.6688E+00 | 9.5417E−01 | 1.1157E+01 | 1.0998E+01 | 3.9425E+00 |
| A14 = | 1.0869E+01 | 9.2045E−02 | −1.3326E+01 | −1.2711E+01 | −2.8185E+00 |
| A16 = | −1.8518E+01 | −9.6554E−01 | 9.8136E+00 | 9.7420E+00 | 1.2432E+00 |
| A18 = | 1.5457E+01 | 7.8609E−01 | −4.0555E+00 | −4.3110E+00 | −3.0695E−01 |
| A20 = | −5.1442E+00 | −2.1259E−01 | 7.1894E−01 | 8.1139E−01 | 3.2124E−02 |

| Surface # | 12 | 13 | 14 | 15 |
|---|---|---|---|---|
| k = | −1.1106E+01 | 0.0000E+00 | 0.0000E+00 | 0.0000E+00 |
| A4 = | −1.6039E−01 | −5.0779E−02 | −1.4576E−01 | −2.8146E−02 |
| A6 = | −1.0552E−01 | −1.0798E−01 | 7.1288E−02 | −1.3565E−01 |
| A8 = | 5.7365E−01 | 8.1150E−02 | −5.8122E−01 | 1.2211E−01 |
| A10 = | −7.0281E−01 | 3.3697E−02 | 1.0387E+00 | −5.3620E−02 |
| A12 = | 3.6674E−01 | −5.1416E−02 | −8.7177E−01 | 1.4014E−02 |
| A14 = | −1.9724E−02 | 1.3135E−02 | 4.1192E−01 | −2.2919E−03 |
| A16 = | −7.1382E−02 | 4.0087E−03 | −1.1340E−01 | 2.3089E−04 |
| A18 = | 3.2177E−02 | −2.5819E−03 | 1.7056E−02 | −1.3139E−05 |
| A20 = | −4.4982E−03 | 3.6751E−04 | −1.0842E−03 | 3.2349E−07 |

In the 11th embodiment, the equation of the aspheric surface profiles of the aforementioned lens elements is the same as the equation of the 1st embodiment. Also, the definitions of these parameters shown in the following table are the same as those stated in the above embodiments with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 1.46 | ΣAT/(T12 + T67) | 1.46 |
| Fno | 2.05 | TL/ImgH | 2.29 |
| HFOV [deg.] | 71.0 | Y11 [mm] | 3.31 |
| FOV [deg.] | 142.0 | Y72 [mm] | 2.56 |
| Nmax | 1.705 | Y11/Y72 | 1.29 |
| V1/N1 | 36.27 | Y11/ImgH | 1.02 |
| V2/N2 | 16.09 | Y72/f | 1.75 |
| V3/N3 | 19.11 | Y72/BL | 3.18 |
| V4/N4 | 36.23 | (R1 + R2)/(R1 − R2) | 0.29 |
| V5/N5 | 9.17 | (R11 + R12)/(R11 − R12) | −0.17 |
| V6/N6 | 36.23 | |f1/f2| | 0.08 |
| V7/N7 | 8.21 | |f3/f2| | 0.19 |
| V2 + V5 + V7 | 55.37 | |f4/f2| | 0.11 |
| V7 | 14.00 | |f5/f2| | 0.18 |
| T12/T23 | 3.41 | |f6/f2| | 0.09 |
| CT2/BL | 0.42 | f6/f7 | −0.47 |
| Dr3r12/(T23 + T34 + T45 + T56) | 5.49 | — | — |

12th Embodiment

Figure 23:
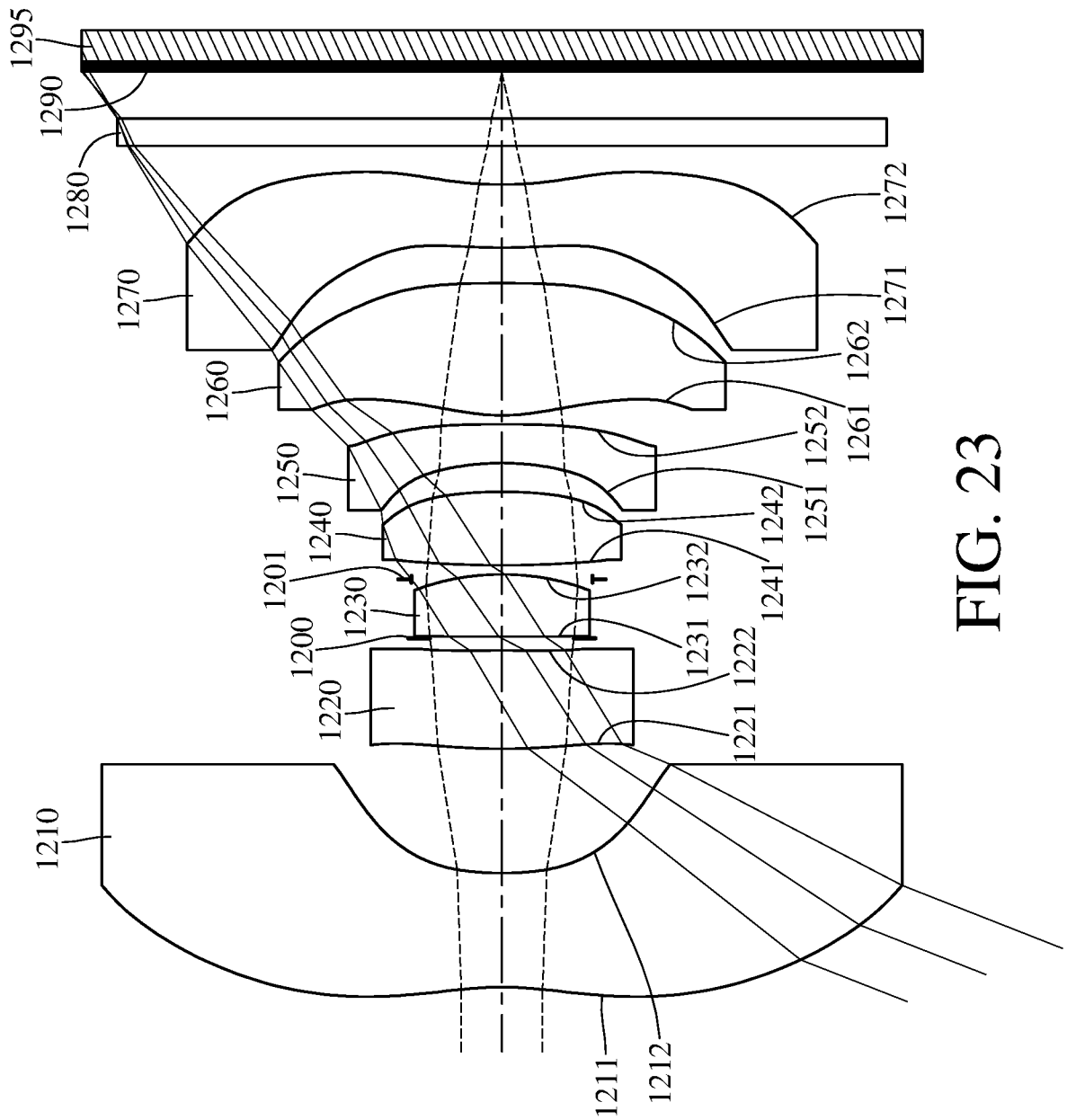
FIG. 23 is a schematic view of an image capturing unit according to the 12th embodiment of the present disclosure.
Figure 24:
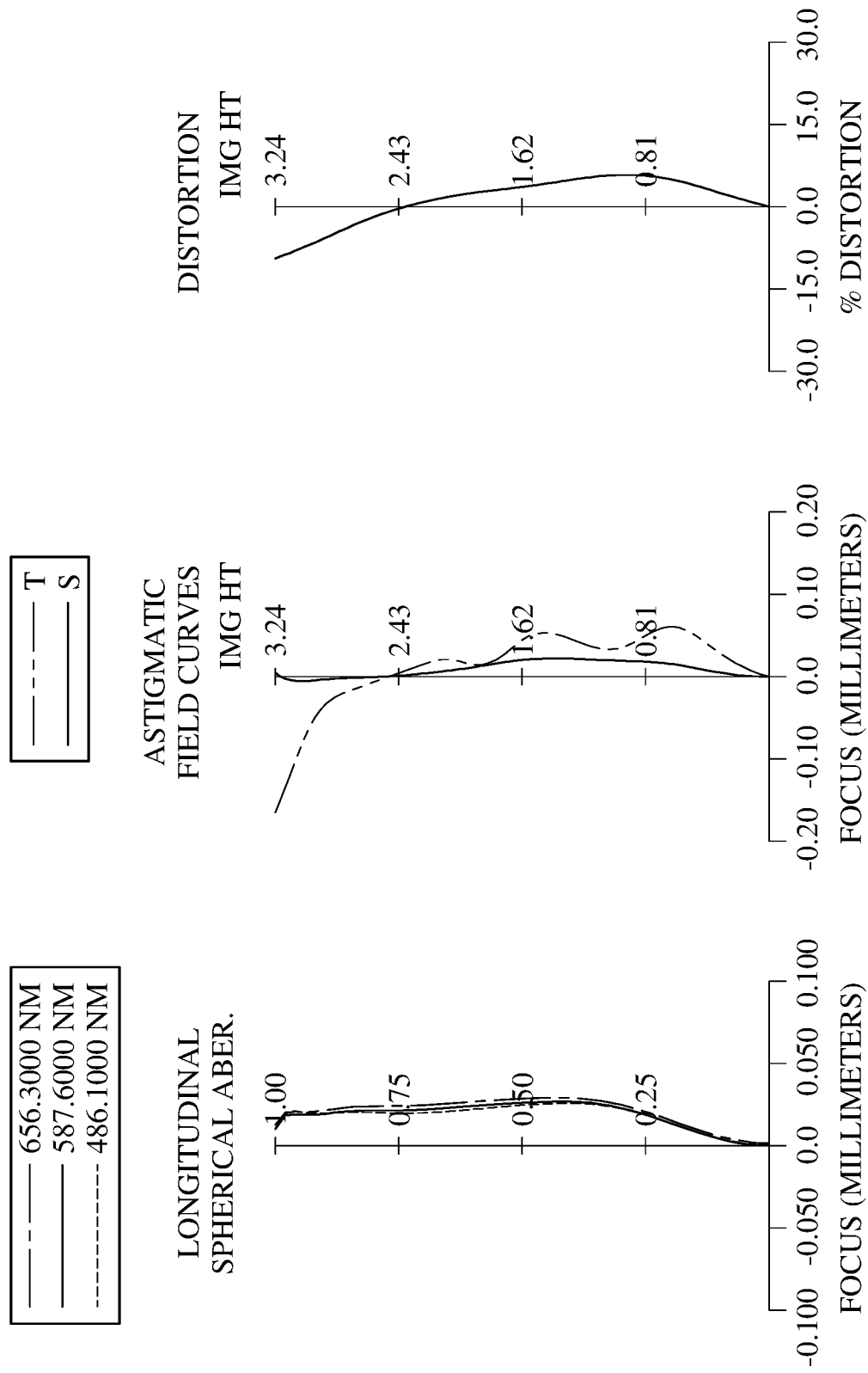
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the photographing optical lens assembly (its reference numeral is omitted) of the present disclosure and an image sensor 1295. The photographing optical lens assembly includes, in order from an object side to an image side along an optical path, a first lens element 1210, a second lens element 1220, an aperture stop 1200, a third lens element 1230, a stop 1201, a fourth lens element 1240, a fifth lens element 1250, a sixth lens element 1260, a seventh lens element 1270, an IR-cut filter 1280 and an image surface 1290. The photographing optical lens assembly includes seven lens elements (1210, 1220, 1230, 1240, 1250, 1260 and 1270) with no additional lens element disposed between each of the adjacent seven lens elements.

The first lens element 1210 with negative refractive power has an object-side surface 1211 being concave in a paraxial region thereof and an image-side surface 1212 being concave in a paraxial region thereof. The first lens element 1210 is made of plastic material and has the object-side surface 1211 and the image-side surface 1212 being both aspheric. The object-side surface 1211 of the first lens element 1210 has at least one convex critical point in an off-axis region thereof.

The second lens element 1220 with positive refractive power has an object-side surface 1221 being convex in a paraxial region thereof and an image-side surface 1222 being convex in a paraxial region thereof. The second lens element 1220 is made of plastic material and has the object-side surface 1221 and the image-side surface 1222 being both aspheric.

The third lens element 1230 with positive refractive power has an object-side surface 1231 being concave in a paraxial region thereof and an image-side surface 1232 being convex in a paraxial region thereof. The third lens element 1230 is made of plastic material and has the object-side surface 1231 and the image-side surface 1232 being both aspheric.

The fourth lens element 1240 with positive refractive power has an object-side surface 1241 being convex in a paraxial region thereof and an image-side surface 1242 being convex in a paraxial region thereof. The fourth lens element 1240 is made of plastic material and has the object-side surface 1241 and the image-side surface 1242 being both aspheric.

The fifth lens element 1250 with negative refractive power has an object-side surface 1251 being concave in a paraxial region thereof and an image-side surface 1252 being convex in a paraxial region thereof. The fifth lens element 1250 is made of plastic material and has the object-side surface 1251 and the image-side surface 1252 being both aspheric. The image-side surface 1252 of the fifth lens element 1250 has at least one inflection point in an off-axis region thereof.

The sixth lens element 1260 with positive refractive power has an object-side surface 1261 being convex in a paraxial region thereof and an image-side surface 1262 being convex in a paraxial region thereof. The sixth lens element 1260 is made of plastic material and has the object-side surface 1261 and the image-side surface 1262 being both aspheric. The object-side surface 1261 of the sixth lens element 1260 has at least one concave critical point in an off-axis region thereof.

The seventh lens element 1270 with negative refractive power has an object-side surface 1271 being convex in a paraxial region thereof and an image-side surface 1272 being concave in a paraxial region thereof. The seventh lens element 1270 is made of plastic material and has the object-side surface 1271 and the image-side surface 1272 being both aspheric. The object-side surface 1271 of the seventh lens element 1270 has at least one concave critical point in an off-axis region thereof. The image-side surface 1272 of the seventh lens element 1270 has at least one convex critical point in an off-axis region thereof.

The IR-cut filter 1280 is made of glass material and located between the seventh lens element 1270 and the image surface 1290, and will not affect the focal length of the photographing optical lens assembly. The image sensor 1295 is disposed on or near the image surface 1290 of the photographing optical lens assembly.

The detailed optical data of the 12th embodiment are shown in Table 23 and the aspheric surface data are shown in Table 24 below.

TABLE 23

12th Embodiment
f = 1.40 mm, Fno = 2.23, HFOV = 68.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.371 | (ASP) | 0.883 | Plastic | 1.545 | 56.0 | −2.20 |
| 2 | | 2.728 | (ASP) | 0.962 | | | | |
| 3 | Lens 2 | 4.630 | (ASP) | 0.761 | Plastic | 1.639 | 23.3 | 6.53 |
| 4 | | −39.481 | (ASP) | 0.094 | | | | |
| 5 | Ape. Stop | Plano | | 0.013 | | | | |
| 6 | Lens 3 | −66.068 | (ASP) | 0.482 | Plastic | 1.549 | 50.1 | 3.74 |
| 7 | | −1.998 | (ASP) | −0.037 | | | | |
| 8 | Stop | Plano | | 0.108 | | | | |
| 9 | Lens 4 | 8.533 | (ASP) | 0.569 | Plastic | 1.544 | 56.0 | 4.51 |
| 10 | | −3.367 | (ASP) | 0.223 | | | | |
| 11 | Lens 5 | −1.791 | (ASP) | 0.300 | Plastic | 1.698 | 16.3 | −3.21 |
| 12 | | −9.598 | (ASP) | 0.069 | | | | |
| 13 | Lens 6 | 1.526 | (ASP) | 1.023 | Plastic | 1.544 | 56.0 | 2.61 |
| 14 | | −15.845 | (ASP) | 0.275 | | | | |
| 15 | Lens 7 | 4.285 | (ASP) | 0.489 | Plastic | 1.698 | 16.3 | −14.76 |
| 16 | | 2.884 | (ASP) | 0.300 | | | | |
| 17 | IR-cut filter | Plano | | 0.210 | Glass | 1.517 | 64.2 | — |
| 18 | | Plano | | 0.363 | | | | |
| 19 | Image | Plano | | 0.000 | | | | |

Note:
Reference wavelength is 587.6 nm (d-line).
An effective radius of the image-side surface 1212 (Surface 2) is 1.300 mm.
An effective radius of the stop 1201 (Surface 8) is 0.700 mm.

TABLE 24

Aspheric Coefficients

| Surface # | 1 | 2 | 3 | 4 | 6 |
|---|---|---|---|---|---|
| k = | −2.9480E+01 | −1.8916E−01 | 0.0000E+00 | 9.0000E+01 | 0.0000E+00 |
| A4 = | 6.9773E−02 | 3.6577E−01 | −4.5815E−02 | 1.0392E−01 | 8.9802E−02 |
| A6 = | −3.0688E−02 | −3.2297E−01 | −7.0788E−02 | −6.6686E−01 | −2.6985E−01 |
| A8 = | 1.0756E−02 | 1.6873E−01 | 1.4613E−01 | 9.7906E+00 | 7.9047E+00 |

TABLE 24-continued

| Aspheric Coefficients | | | | |
|---|---|---|---|---|
| A10 = | −2.7310E−03 | 5.4341E−01 | −3.6273E−01 | −8.5629E+01 | −1.2600E+02 |
| A12 = | 4.8331E−04 | −1.3548E+00 | 5.6774E−01 | 4.8023E+02 | 1.1184E+03 |
| A14 = | −5.7653E−05 | 1.4381E+00 | −5.4537E−01 | −1.6977E+03 | −5.8280E+03 |
| A16 = | 4.4058E−06 | −8.2134E−01 | 3.1859E−01 | 3.6638E+03 | 1.7816E+04 |
| A18 = | −1.9440E−07 | 2.4153E−01 | −9.4581E−02 | −4.3980E+03 | −2.9581E+04 |
| A20 = | 3.7683E−09 | −2.8436E−02 | 8.0962E−03 | 2.2517E+03 | 2.0605E+04 |

| Surface # | 7 | 9 | 10 | 11 | 12 |
|---|---|---|---|---|---|
| k = | 0.0000E+00 | 0.0000E+00 | −4.3253E+01 | 2.7154E−01 | −1.0000E+00 |
| A4 = | 1.1496E−02 | 2.0535E−02 | −6.3421E−03 | 5.5018E−01 | 1.4955E−01 |
| A6 = | −3.6642E−01 | −2.6333E−02 | −1.7412E+00 | −3.0500E+00 | −1.5509E+00 |
| A8 = | 2.4589E+00 | −1.0833E+00 | 9.5998E+00 | 9.1285E+00 | 4.8206E+00 |
| A10 = | −1.9179E+01 | 7.5383E+00 | −3.5459E+01 | −1.6989E+01 | −8.3826E+00 |
| A12 = | 1.1166E+02 | −2.5770E+01 | 8.4390E+01 | 1.4784E+01 | 8.8921E+00 |
| A14 = | −4.1068E+02 | 5.2924E+01 | −1.3037E+02 | 1.2545E+00 | −5.8637E+00 |
| A16 = | 9.0794E+02 | −6.5030E+01 | 1.2708E+02 | −1.3978E+01 | 2.3283E+00 |
| A18 = | −1.0976E+03 | 4.3712E+01 | −7.1063E+01 | 1.0919E+01 | −5.0023E−01 |
| A20 = | 5.5744E+02 | −1.2267E+01 | 1.7366E+01 | −2.7405E+00 | 4.3628E−02 |

| Surface # | 13 | 14 | 15 | 16 |
|---|---|---|---|---|
| k = | −7.4623E+00 | 0.0000E+00 | 0.0000E+00 | 0.0000E+00 |
| A4 = | −1.7630E−01 | −2.2408E−01 | −2.9782E−01 | 2.0802E−02 |
| A6 = | 7.7467E−02 | 5.2224E−01 | 4.8328E−01 | −2.5969E−01 |
| A8 = | −1.9162E−02 | −1.1364E+00 | −1.2261E+00 | 2.5151E−01 |
| A10 = | 1.6858E−01 | 1.3902E+00 | 1.6524E+00 | −1.2508E−01 |
| A12 = | −3.3232E−01 | −9.7216E−01 | −1.2266E+00 | 3.7291E−02 |
| A14 = | 2.8081E−01 | 4.0228E−01 | 5.3590E−01 | −6.9345E−03 |
| A16 = | −1.2462E−01 | −9.7437E−02 | −1.3849E−01 | 7.8914E−04 |
| A18 = | 2.8688E−02 | 1.2714E−02 | 1.9662E−02 | −5.0370E−05 |
| A20 = | −2.7014E−03 | −6.8434E−04 | −1.1835E−03 | 1.3841E−06 |

In the 12th embodiment, the equation of the aspheric surface profiles of the aforementioned lens elements is the same as the equation of the 1st embodiment. Also, the definitions of these parameters shown in the following table are the same as those stated in the above embodiments with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 1.40 | ΣAT/(T12 + T67) | 1.38 |
| Fno | 2.23 | TL/ImgH | 2.19 |
| HFOV [deg.] | 68.5 | Y11 [mm] | 3.09 |
| FOV [deg.] | 137.0 | Y72 [mm] | 2.43 |
| Nmax | 1.698 | Y11/Y72 | 1.27 |
| V1/N1 | 36.27 | Y11/ImgH | 0.96 |
| V2/N2 | 14.21 | Y72/f | 1.74 |
| V3/N3 | 32.34 | Y72/BL | 2.79 |
| V4/N4 | 36.26 | (R1 + R2)/(R1 − R2) | −0.07 |
| V5/N5 | 9.60 | (R11 + R12)/(R11 − R12) | −0.82 |
| V6/N6 | 36.26 | |f1/f2| | 0.34 |
| V7/N7 | 9.60 | |f3/f2| | 0.57 |
| V2 + V5 + V7 | 55.88 | |f4/f2| | 0.69 |
| V7 | 16.30 | |f5/f2| | 0.49 |
| T12/T23 | 8.99 | |f6/f2| | 0.40 |
| CT2/BL | 0.87 | f6/f7 | −0.18 |
| Dr3r12/(T23 + T34 + T45 + T56) | 7.67 | — | — |

13th Embodiment

Figure 25:
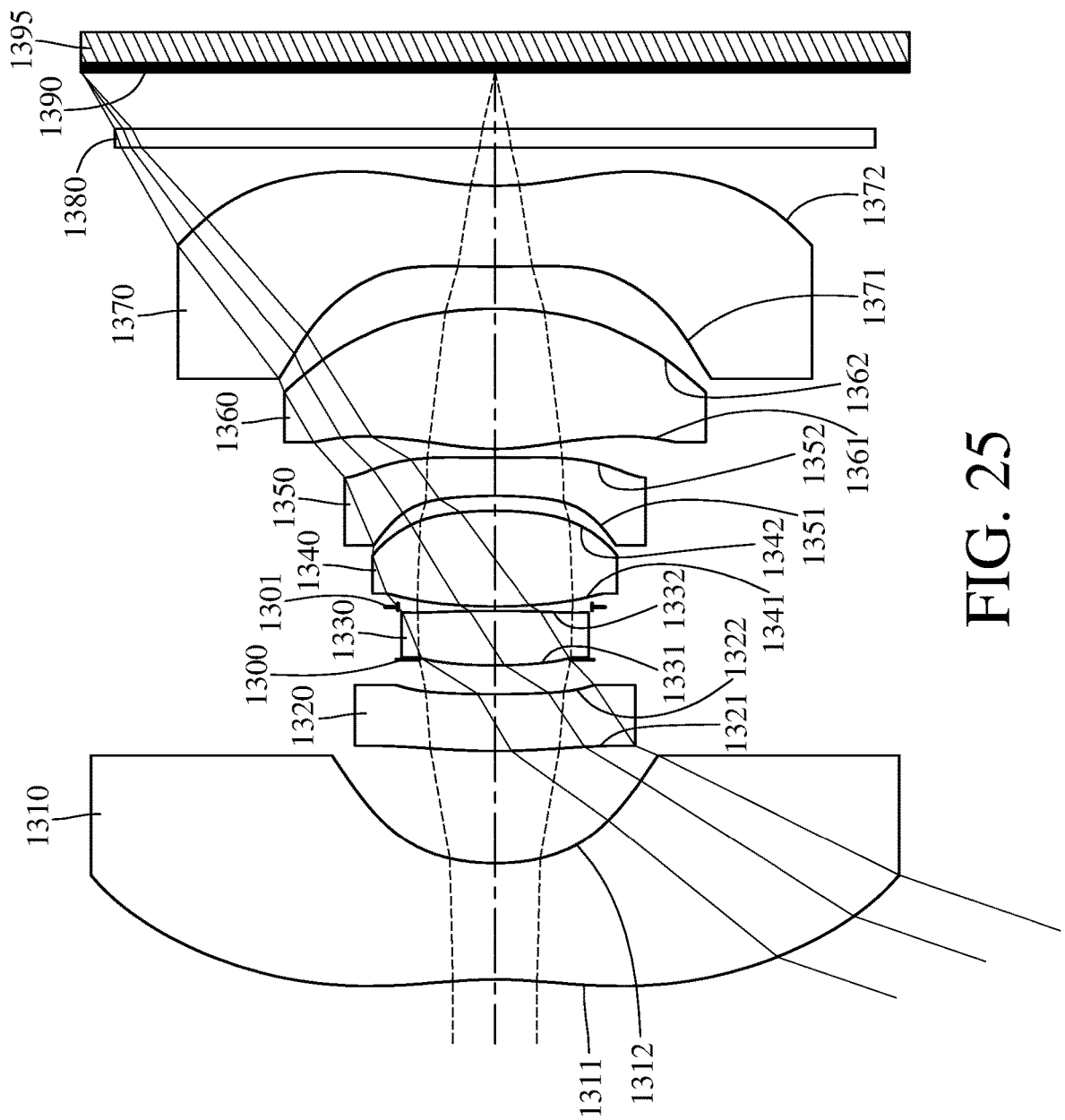
FIG. 25 is a schematic view of an image capturing unit according to the 13th embodiment of the present disclosure.
Figure 26:
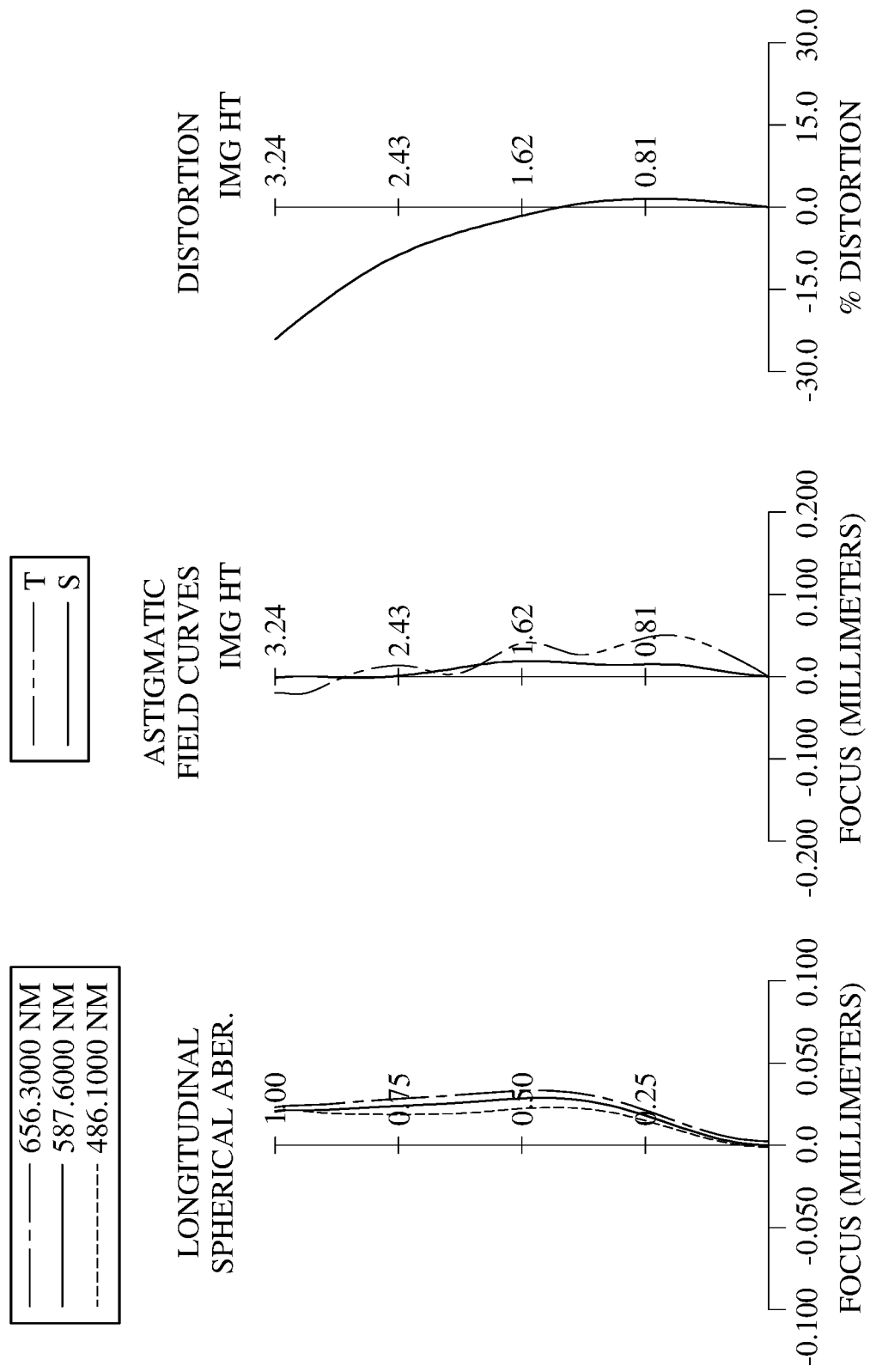
FIG. 26 shows spherical aberration curves, astigmatic field curves and a distortion curve of the image capturing unit according to the 13th embodiment.

FIG. 25 is a schematic view of an image capturing unit according to the 13th embodiment of the present disclosure. FIG. 26 shows, in order from left to right, spherical aberration curves, astigmatic field curves and a distortion curve of the image capturing unit according to the 13th embodiment. In FIG. 25, the image capturing unit includes the photographing optical lens assembly (its reference numeral is omitted) of the present disclosure and an image sensor 1395. The photographing optical lens assembly includes, in order from an object side to an image side along an optical path, a first lens element 1310, a second lens element 1320, an aperture stop 1300, a third lens element 1330, a stop 1301, a fourth lens element 1340, a fifth lens element 1350, a sixth lens element 1360, a seventh lens element 1370, an IR-cut filter 1380 and an image surface 1390. The photographing optical lens assembly includes seven lens elements (1310, 1320, 1330, 1340, 1350, 1360 and 1370) with no additional lens element disposed between each of the adjacent seven lens elements.

The first lens element 1310 with negative refractive power has an object-side surface 1311 being concave in a paraxial region thereof and an image-side surface 1312 being concave in a paraxial region thereof. The first lens element 1310 is made of plastic material and has the object-side surface 1311 and the image-side surface 1312 being both aspheric. The object-side surface 1311 of the first lens element 1310 has at least one convex critical point in an off-axis region thereof.

The second lens element 1320 with positive refractive power has an object-side surface 1321 being convex in a paraxial region thereof and an image-side surface 1322 being concave in a paraxial region thereof. The second lens element 1320 is made of plastic material and has the object-side surface 1321 and the image-side surface 1322 being both aspheric.

The third lens element 1330 with positive refractive power has an object-side surface 1331 being convex in a paraxial region thereof and an image-side surface 1332 being convex in a paraxial region thereof. The third lens element 1330 is made of plastic material and has the object-side surface 1331 and the image-side surface 1332 being both aspheric.

The fourth lens element 1340 with positive refractive power has an object-side surface 1341 being convex in a paraxial region thereof and an image-side surface 1342 being convex in a paraxial region thereof. The fourth lens element 1340 is made of glass material and has the object-side surface 1341 and the image-side surface 1342 being both aspheric.

The fifth lens element 1350 with negative refractive power has an object-side surface 1351 being concave in a paraxial region thereof and an image-side surface 1352 being concave in a paraxial region thereof. The fifth lens element 1350 is made of plastic material and has the object-side surface 1351 and the image-side surface 1352 being both aspheric. The image-side surface 1352 of the fifth lens element 1350 has at least two inflection points and at least one critical point in an off-axis region thereof.

The sixth lens element 1360 with positive refractive power has an object-side surface 1361 being convex in a paraxial region thereof and an image-side surface 1362 being convex in a paraxial region thereof. The sixth lens element 1360 is made of plastic material and has the object-side surface 1361 and the image-side surface 1362 being both aspheric. The object-side surface 1361 of the sixth lens element 1360 has at least one concave critical point in an off-axis region thereof.

The seventh lens element 1370 with negative refractive power has an object-side surface 1371 being convex in a paraxial region thereof and an image-side surface 1372 being concave in a paraxial region thereof. The seventh lens element 1370 is made of plastic material and has the object-side surface 1371 and the image-side surface 1372 being both aspheric. The object-side surface 1371 of the seventh lens element 1370 has at least one concave critical point in an off-axis region thereof. The image-side surface 1372 of the seventh lens element 1370 has at least one convex critical point in an off-axis region thereof.

The IR-cut filter 1380 is made of glass material and located between the seventh lens element 1370 and the image surface 1390, and will not affect the focal length of the photographing optical lens assembly. The image sensor 1395 is disposed on or near the image surface 1390 of the photographing optical lens assembly.

The detailed optical data of the 13th embodiment are shown in Table 25 and the aspheric surface data are shown in Table 26 below.

TABLE 25

13th Embodiment
f = 1.46 mm, Fno = 2.21, HFOV = 71.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.310 | (ASP) | 0.910 | Plastic | 1.544 | 56.0 | −2.10 |
| 2 | | 1.912 | (ASP) | 0.881 | | | | |
| 3 | Lens 2 | 5.401 | (ASP) | 0.445 | Plastic | 1.626 | 22.8 | 16.11 |
| 4 | | 11.261 | (ASP) | 0.269 | | | | |
| 5 | Ape. Stop | Plano | | −0.046 | | | | |
| 6 | Lens 3 | 3.984 | (ASP) | 0.426 | Plastic | 1.595 | 26.2 | 5.25 |
| 7 | | −13.910 | (ASP) | 0.031 | | | | |
| 8 | Stop | Plano | | 0.004 | | | | |
| 9 | Lens 4 | 3.749 | (ASP) | 0.754 | Glass | 1.543 | 62.9 | 3.08 |
| 10 | | −2.807 | (ASP) | 0.116 | | | | |
| 11 | Lens 5 | −3.523 | (ASP) | 0.300 | Plastic | 1.698 | 16.3 | −4.43 |
| 12 | | 26.357 | (ASP) | 0.068 | | | | |
| 13 | Lens 6 | 1.945 | (ASP) | 1.099 | Plastic | 1.544 | 56.0 | 2.36 |
| 14 | | −3.038 | (ASP) | 0.331 | | | | |
| 15 | Lens 7 | 12.696 | (ASP) | 0.631 | Plastic | 1.705 | 14.0 | −5.19 |
| 16 | | 2.783 | (ASP) | 0.300 | | | | |
| 17 | IR-cut filter | Plano | | 0.145 | Glass | 1.517 | 64.2 | — |
| 18 | | Plano | | 0.441 | | | | |
| 19 | Image | Plano | | 0.000 | | | | |

Note:
Reference wavelength is 587.6 nm (d-line).
An effective radius of the stop 1301 (Surface 8) is 0.760 mm.

TABLE 26

Aspheric Coefficients

| Surface # | 1 | 2 | 3 | 4 | 6 |
|---|---|---|---|---|---|
| k = | −5.1775E+01 | −6.6273E−01 | 0.0000E+00 | 3.4084E+01 | 0.0000E+00 |
| A4 = | 5.0416E−02 | 3.3831E−01 | −5.5116E−02 | 5.7233E−02 | 9.7099E−02 |
| A6 = | −1.6153E−02 | −6.1105E−01 | 2.1533E−03 | 1.4071E−01 | 5.1075E−02 |
| A8 = | 3.8119E−03 | 1.5650E+00 | −3.2400E−02 | −4.1981E−01 | 5.7239E−01 |
| A10 = | −6.1866E−04 | −2.6080E+00 | 7.8644E−02 | 1.4634E+00 | −4.5519E+00 |
| A12 = | 6.6745E−05 | 2.6881E+00 | −6.2269E−02 | −2.0917E+00 | 1.7275E+01 |
| A14 = | −4.5115E−06 | −1.6549E+00 | 1.7083E−02 | 1.0582E+00 | −3.2513E+01 |
| A16 = | 1.7162E−07 | 5.5110E−01 | — | — | 2.3760E+01 |
| A18 = | −2.7353E−09 | −7.5983E−02 | — | — | — |

TABLE 26-continued

Aspheric Coefficients

| Surface # | 7 | 9 | 10 | 11 | 12 |
|---|---|---|---|---|---|
| k = | 0.0000E+00 | 0.0000E+00 | −6.5845E+00 | 7.9498E+00 | −1.0000E+00 |
| A4 = | −1.1206E−01 | −1.3130E−01 | 2.0045E−01 | 4.2284E−01 | 1.3559E−01 |
| A6 = | 6.2153E−01 | 8.9937E−01 | −3.0986E+00 | −3.4232E+00 | −1.8286E+00 |
| A8 = | −1.9263E+00 | −4.4225E+00 | 1.2554E+01 | 9.4606E+00 | 5.1826E+00 |
| A10 = | 5.2009E+00 | 1.8001E+01 | −3.4802E+01 | −1.5693E+01 | −8.0940E+00 |
| A12 = | −8.6350E+00 | −5.1345E+01 | 6.4826E+01 | 1.1481E+01 | 7.4498E+00 |
| A14 = | 7.8805E+00 | 9.7253E+01 | −7.9567E+01 | 3.3722E+00 | −3.9143E+00 |
| A16 = | −3.1875E+00 | −1.1639E+02 | 6.2393E+01 | −1.1954E+01 | 9.8556E−01 |
| A18 = | — | 7.9458E+01 | −2.8440E+01 | 7.8007E+00 | −1.5141E−02 |
| A20 = | — | −2.3660E+01 | 5.6690E+00 | −1.7352E+00 | −3.0219E−02 |

| Surface # | 13 | 14 | 15 | 16 |
|---|---|---|---|---|
| k = | −7.8300E+00 | 0.0000E+00 | 0.0000E+00 | 0.0000E+00 |
| A4 = | −8.3617E−02 | −1.7368E−02 | −1.2607E−01 | −2.5766E−02 |
| A6 = | −4.5642E−01 | 8.7744E−02 | 1.2158E−01 | −1.2153E−01 |
| A8 = | 1.3548E+00 | −4.3298E−01 | −5.3813E−01 | 1.0389E−01 |
| A10 = | −1.7896E+00 | 6.3660E−01 | 7.1396E−01 | −4.3975E−02 |
| A12 = | 1.3724E+00 | −4.2936E−01 | −4.3449E−01 | 1.1069E−02 |
| A14 = | −6.4401E−01 | 1.3795E−01 | 1.2834E−01 | −1.7307E−03 |
| A16 = | 2.0562E−01 | −1.4675E−02 | −1.4273E−02 | 1.6451E−04 |
| A18 = | −3.8024E−02 | −2.0768E−03 | −8.6197E−04 | −8.6634E−06 |
| A20 = | 3.2159E−03 | 4.4779E−04 | 2.2992E−04 | 1.9212E−07 |

In the 13th embodiment, the equation of the aspheric surface profiles of the aforementioned lens elements is the same as the equation of the 1st embodiment. Also, the definitions of these parameters shown in the following table are the same as those stated in the above embodiments with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 1.46 | ΣAT/(T12 + T67) | 1.36 |
| Fno | 2.21 | TL/ImgH | 2.19 |
| HFOV [deg.] | 71.0 | Y11 [mm] | 3.16 |
| FOV [deg.] | 142.0 | Y72 [mm] | 2.48 |
| Nmax | 1.705 | Y11/Y72 | 1.27 |
| V1/N1 | 36.26 | Y11/ImgH | 0.98 |
| V2/N2 | 14.02 | Y72/f | 1.70 |
| V3/N3 | 16.43 | Y72/BL | 2.80 |
| V4/N4 | 40.78 | (R1 + R2)/(R1 − R2) | 0.27 |
| V5/N5 | 9.60 | (R11 + R12)/(R11 − R12) | −0.22 |
| V6/N6 | 36.26 | |f1/f2| | 0.13 |
| V7/N7 | 8.21 | |f3/f2| | 0.33 |
| V2 + V5 + V7 | 53.10 | |f4/f2| | 0.19 |
| V7 | 14.00 | |f5/f2| | 0.28 |
| T12/T23 | 3.95 | |f6/f2| | 0.15 |
| CT2/BL | 0.50 | f6/f7 | −0.46 |
| Dr3r12/(T23 + T34 + T45 + T56) | 7.84 | — | — |

14th Embodiment

Figure 27:
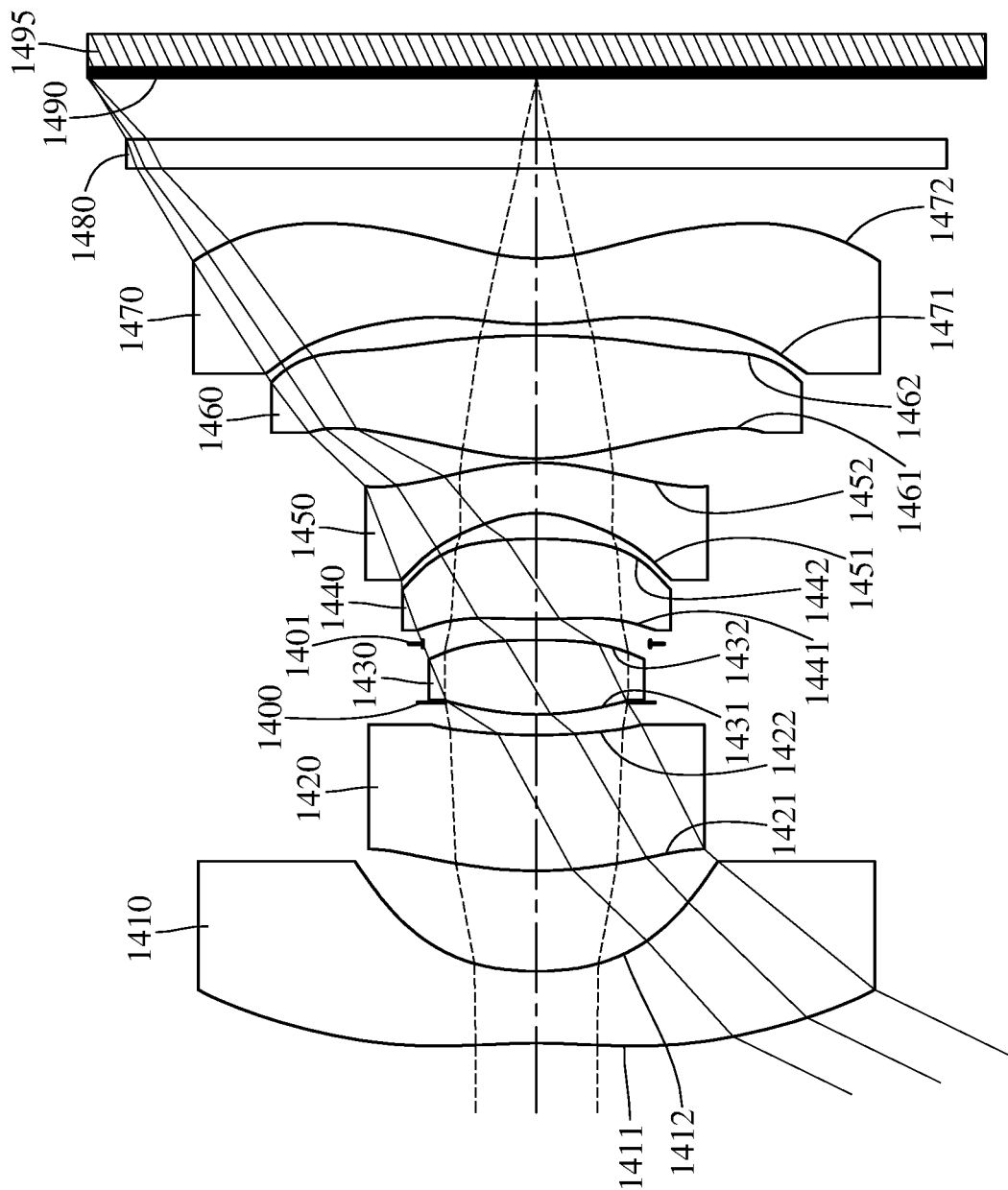
FIG. 27 is a schematic view of an image capturing unit according to the 14th embodiment of the present disclosure.
Figure 28:
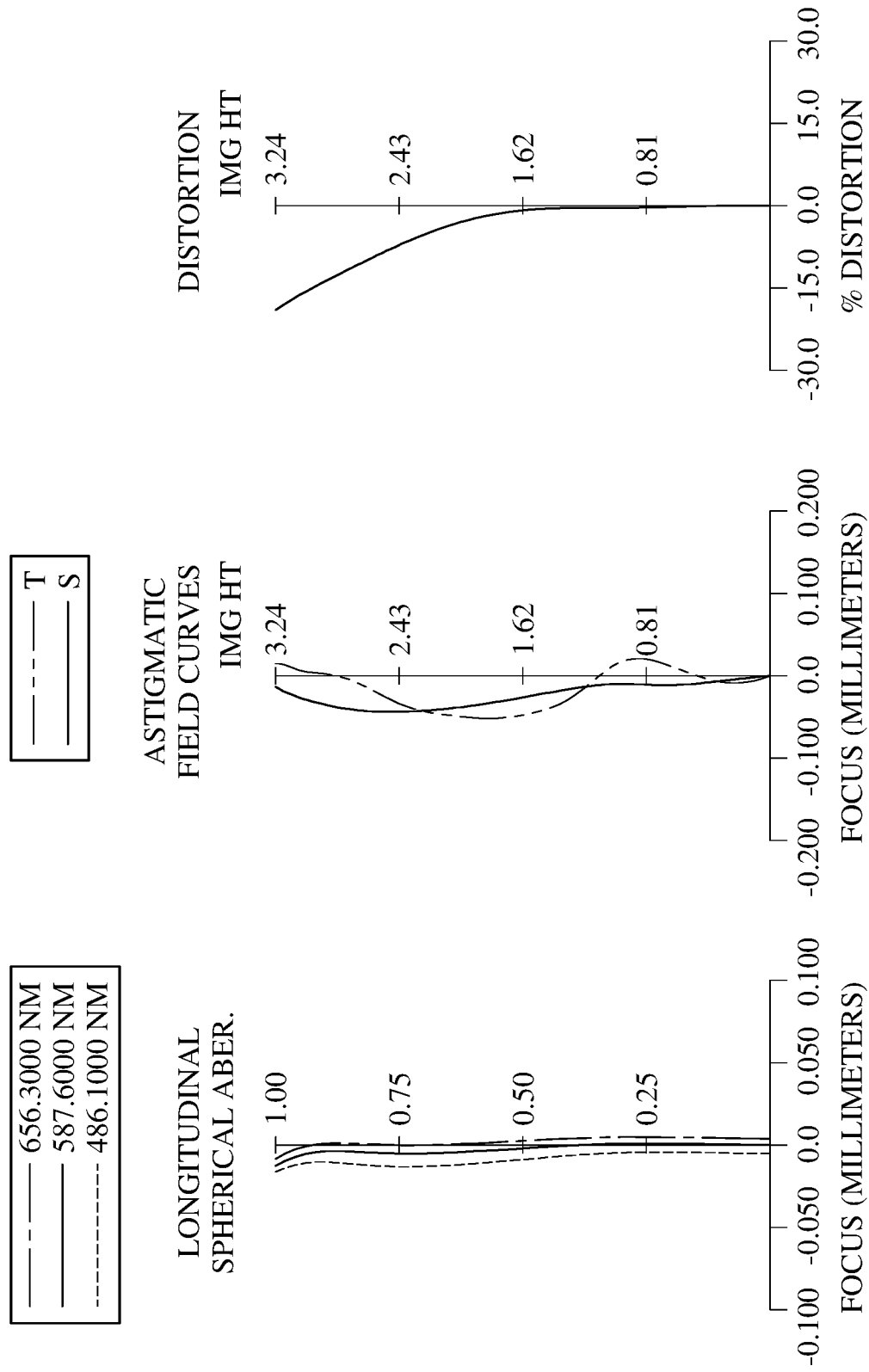
FIG. 28 shows spherical aberration curves, astigmatic field curves and a distortion curve of the image capturing unit according to the 14th embodiment.

FIG. 27 is a schematic view of an image capturing unit according to the 14th embodiment of the present disclosure. FIG. 28 shows, in order from left to right, spherical aberration curves, astigmatic field curves and a distortion curve of the image capturing unit according to the 14th embodiment. In FIG. 27, the image capturing unit includes the photographing optical lens assembly (its reference numeral is omitted) of the present disclosure and an image sensor 1495. The photographing optical lens assembly includes, in order from an object side to an image side along an optical path, a first lens element 1410, a second lens element 1420, an aperture stop 1400, a third lens element 1430, a stop 1401, a fourth lens element 1440, a fifth lens element 1450, a sixth lens element 1460, a seventh lens element 1470, an IR-cut filter 1480 and an image surface 1490. The photographing optical lens assembly includes seven lens elements (1410, 1420, 1430, 1440, 1450, 1460 and 1470) with no additional lens element disposed between each of the adjacent seven lens elements.

The first lens element 1410 with negative refractive power has an object-side surface 1411 being concave in a paraxial region thereof and an image-side surface 1412 being concave in a paraxial region thereof. The first lens element 1410 is made of plastic material and has the object-side surface 1411 and the image-side surface 1412 being both aspheric. The object-side surface 1411 of the first lens element 1410 has at least one convex critical point in an off-axis region thereof.

The second lens element 1420 with positive refractive power has an object-side surface 1421 being convex in a paraxial region thereof and an image-side surface 1422 being concave in a paraxial region thereof. The second lens element 1420 is made of plastic material and has the object-side surface 1421 and the image-side surface 1422 being both aspheric.

The third lens element 1430 with positive refractive power has an object-side surface 1431 being convex in a paraxial region thereof and an image-side surface 1432 being convex in a paraxial region thereof. The third lens element 1430 is made of plastic material and has the object-side surface 1431 and the image-side surface 1432 being both aspheric.

The fourth lens element 1440 with positive refractive power has an object-side surface 1441 being convex in a paraxial region thereof and an image-side surface 1442 being convex in a paraxial region thereof. The fourth lens element 1440 is made of plastic material and has the object-side surface 1441 and the image-side surface 1442 being both aspheric.

The fifth lens element 1450 with negative refractive power has an object-side surface 1451 being concave in a paraxial region thereof and an image-side surface 1452 being convex in a paraxial region thereof. The fifth lens element 1450 is made of plastic material and has the object-side surface 1451 and the image-side surface 1452 being both aspheric. The image-side surface 1452 of the fifth lens element 1450 has at least one inflection point and at least one critical point in an off-axis region thereof.

The sixth lens element 1460 with positive refractive power has an object-side surface 1461 being convex in a paraxial region thereof and an image-side surface 1462 being convex in a paraxial region thereof. The sixth lens element 1460 is made of plastic material and has the object-side surface 1461 and the image-side surface 1462 being both aspheric. The object-side surface 1461 of the sixth lens element 1460 has at least one concave critical point in an off-axis region thereof.

The seventh lens element 1470 with negative refractive power has an object-side surface 1471 being convex in a paraxial region thereof and an image-side surface 1472 being concave in a paraxial region thereof. The seventh lens element 1470 is made of plastic material and has the object-side surface 1471 and the image-side surface 1472 being both aspheric. The object-side surface 1471 of the seventh lens element 1470 has at least one concave critical point in an off-axis region thereof. The image-side surface 1472 of the seventh lens element 1470 has at least one convex critical point in an off-axis region thereof.

The IR-cut filter 1480 is made of glass material and located between the seventh lens element 1470 and the image surface 1490, and will not affect the focal length of the photographing optical lens assembly. The image sensor 1495 is disposed on or near the image surface 1490 of the photographing optical lens assembly.

The detailed optical data of the 14th embodiment are shown in Table 27 and the aspheric surface data are shown in Table 28 below.

TABLE 27

14th Embodiment
f = 1.95 mm, Fno = 2.23, HFOV = 64.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −4.887 | (ASP) | 0.519 | Plastic | 1.545 | 56.1 | −2.61 |
| 2 |  | 2.078 | (ASP) | 0.726 |  |  |  |  |
| 3 | Lens 2 | 2.946 | (ASP) | 0.980 | Plastic | 1.639 | 23.5 | 13.56 |
| 4 |  | 3.886 | (ASP) | 0.236 |  |  |  |  |
| 5 | Ape. Stop | Plano |  | −0.086 |  |  |  |  |
| 6 | Lens 3 | 1.940 | (ASP) | 0.537 | Plastic | 1.545 | 55.5 | 2.71 |
| 7 |  | −5.567 | (ASP) | −0.028 |  |  |  |  |
| 8 | Stop | Plano |  | 0.179 |  |  |  |  |
| 9 | Lens 4 | 4.792 | (ASP) | 0.580 | Plastic | 1.544 | 56.0 | 3.68 |
| 10 |  | −3.296 | (ASP) | 0.185 |  |  |  |  |
| 11 | Lens 5 | −0.769 | (ASP) | 0.365 | Plastic | 1.639 | 23.5 | −2.66 |
| 12 |  | −1.667 | (ASP) | 0.030 |  |  |  |  |
| 13 | Lens 6 | 1.686 | (ASP) | 0.889 | Plastic | 1.544 | 56.0 | 2.41 |
| 14 |  | −4.771 | (ASP) | 0.082 |  |  |  |  |
| 15 | Lens 7 | 2.477 | (ASP) | 0.475 | Plastic | 1.587 | 28.3 | −5.46 |
| 16 |  | 1.299 | (ASP) | 0.650 |  |  |  |  |
| 17 | IR-cut filter | Plano |  | 0.210 | Glass | 1.517 | 64.2 | — |
| 18 |  | Plano |  | 0.442 |  |  |  |  |
| 19 | Image | Plano |  | 0.000 |  |  |  |  |

Note:
Reference wavelength is 587.6 nm (d-line).
An effective radius of the stop 1401 (Surface 8) is 0.820 mm.

TABLE 28

Aspheric Coefficients

| Surface # | 1 | 2 | 3 | 4 | 6 |
|---|---|---|---|---|---|
| k = | −9.9000E+01 | −3.1888E−02 | −4.9202E+01 | −5.5141E+01 | −2.6389E+00 |
| A4 = | 8.3335E−02 | 2.0528E−01 | 1.7075E−01 | 1.5052E−02 | −1.0058E−01 |
| A6 = | −4.1510E−02 | −1.3104E−01 | −3.2453E−01 | 2.2447E−01 | 3.4744E−01 |
| A8 = | 1.3671E−02 | 1.7228E−01 | 3.7561E−01 | −1.2688E+00 | −1.0243E+00 |
| A10 = | −2.9303E−03 | −2.4699E−01 | −2.5917E−01 | 4.2842E+00 | 1.8691E+00 |
| A12 = | 3.9011E−04 | 2.1443E−01 | 8.5938E−02 | −6.8748E+00 | −1.8332E+00 |
| A14 = | −2.9059E−05 | −9.0813E−02 | −8.1746E−03 | 4.4734E+00 | 9.3823E−01 |
| A16 = | 9.3004E−07 | 1.4286E−02 | −1.1937E−03 | — | — |

| Surface # | 7 | 9 | 10 | 11 | 12 |
|---|---|---|---|---|---|
| k = | −5.6854E+00 | −4.0889E+01 | −6.4494E−03 | −1.2932E+00 | −1.1794E+01 |
| A4 = | −3.6142E−01 | −3.6685E−01 | −5.3233E−02 | 8.9851E−01 | −8.1982E−03 |
| A6 = | 2.0660E−01 | 2.9219E−01 | −3.7454E−02 | −2.9676E+00 | 2.3609E−02 |
| A8 = | 1.2120E−01 | −1.8262E+00 | −2.3189E+00 | 9.4512E+00 | −2.5458E−01 |
| A10 = | −9.6818E−01 | 6.3926E+00 | 6.2656E+00 | −3.0995E+01 | 1.2174E+00 |
| A12 = | 2.8644E+00 | −1.0012E+01 | −7.2207E+00 | 7.3738E+01 | −2.1909E+00 |
| A14 = | −4.1808E+00 | 7.2207E+00 | 3.6574E+00 | −1.0986E+02 | 2.0131E+00 |

TABLE 28-continued

| Aspheric Coefficients | | | | |
|---|---|---|---|---|
| A16 = | 2.5596E+00 | −1.8162E+00 | −5.2860E−01 | 9.5539E+01 | −1.0224E+00 |
| A18 = | — | — | — | −4.3900E+01 | 2.7734E−01 |
| A20 = | — | — | — | 8.1789E+00 | −3.1860E−02 |

| Surface # | 13 | 14 | 15 | 16 |
|---|---|---|---|---|
| k = | −3.8118E−01 | −3.7584E+01 | −4.7372E−02 | −8.6854E−01 |
| A4 = | −2.8212E−01 | 1.1064E−01 | −1.6483E−01 | −3.3483E−01 |
| A6 = | 2.4606E−01 | −4.4657E−01 | −2.7708E−01 | 2.1305E−01 |
| A8 = | −1.9126E−01 | 6.7989E−01 | 5.4083E−01 | −1.0166E−01 |
| A10 = | 1.2160E−01 | −5.4758E−01 | −4.3393E−01 | 3.3753E−02 |
| A12 = | −6.2903E−02 | 2.6751E−01 | 1.9942E−01 | −7.8864E−03 |
| A14 = | 2.2833E−02 | −8.2962E−02 | −5.5795E−02 | 1.2827E−03 |
| A16 = | −5.1590E−03 | 1.6060E−02 | 9.2942E−03 | −1.3885E−04 |
| A18 = | 6.4777E−04 | −1.7788E−03 | −8.3424E−04 | 8.9973E−06 |
| A20 = | −3.6087E−05 | 8.6417E−05 | 3.0327E−05 | −2.6378E−07 |

In the 14th embodiment, the equation of the aspheric surface profiles of the aforementioned lens elements is the same as the equation of the 1st embodiment. Also, the definitions of these parameters shown in the following table are the same as those stated in the above embodiments with corresponding values for the 14th embodiment, so an explanation in this regard will not be provided again.

Moreover, these parameters can be calculated from Table 27 and Table 28 as the following values and satisfy the following conditions:

| 14th Embodiment | | | |
|---|---|---|---|
| f [mm] | 1.95 | ΣAT/(T12 + T67) | 1.64 |
| Fno | 2.23 | TL/ImgH | 2.15 |
| HFOV [deg.] | 64.0 | Y11 [mm] | 2.44 |
| FOV [deg.] | 128.0 | Y72 [mm] | 2.48 |
| Nmax | 1.639 | Y11/Y72 | 0.99 |
| V1/N1 | 36.30 | Y11/ImgH | 0.75 |
| V2/N2 | 14.34 | Y72/f | 1.27 |
| V3/N3 | 35.89 | Y72/BL | 1.90 |
| V4/N4 | 36.26 | (R1 + R2)/(R1 − R2) | 0.40 |
| V5/N5 | 14.34 | (R11 + R12)/(R11 − R12) | −0.48 |
| V6/N6 | 36.26 | |f1/f2| | 0.19 |
| V7/N7 | 17.83 | |f3/f2| | 0.20 |
| V2 + V5 + V7 | 75.28 | |f4/f2| | 0.27 |
| V7 | 28.30 | |f5/f2| | 0.20 |
| T12/T23 | 4.84 | |f6/f2| | 0.18 |
| CT2/BL | 0.75 | f6/f7 | −0.44 |
| Dr3r12/(T23 + T34 + T45 + T56) | 7.49 | — | — |

15th Embodiment

Figure 29:
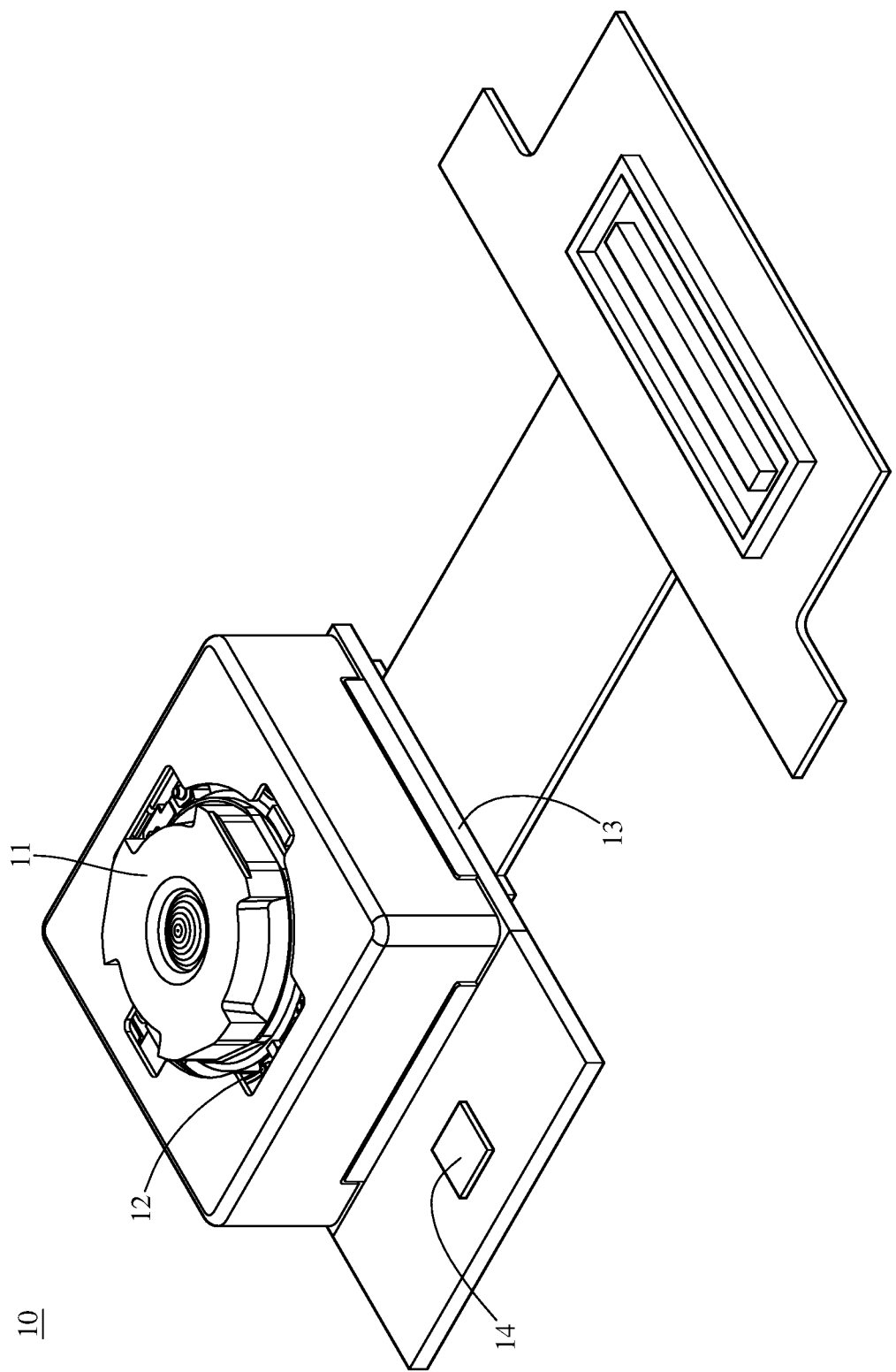
FIG. 29 is a perspective view of an image capturing unit according to the 15th embodiment of the present disclosure.

FIG. 29 is a perspective view of an image capturing unit according to the 15th embodiment of the present disclosure. In this embodiment, an image capturing unit 10 is a camera module including a lens unit 11, a driving device 12, an image sensor 13 and an image stabilizer 14. The lens unit 11 includes the photographing optical lens assembly disclosed in the 13th embodiment, a barrel and a holder member (their reference numerals are omitted) for holding the photographing optical lens assembly; the lens unit 11 may include the photographing optical lens assembly disclosed in other embodiments, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

16th Embodiment

Figure 30:
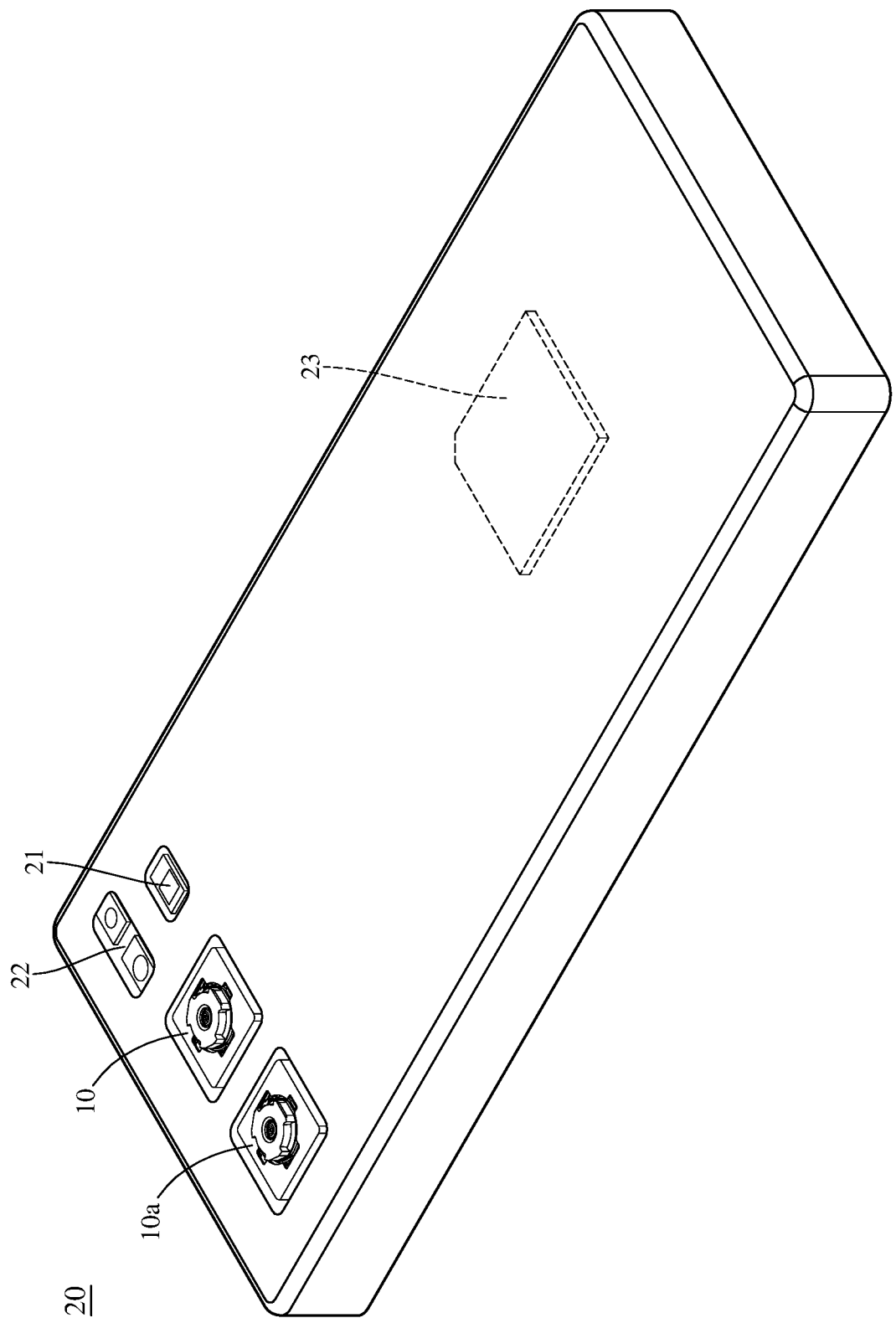
FIG. 30 is one perspective view of an electronic device according to the 16th embodiment of the present disclosure.
Figure 31:
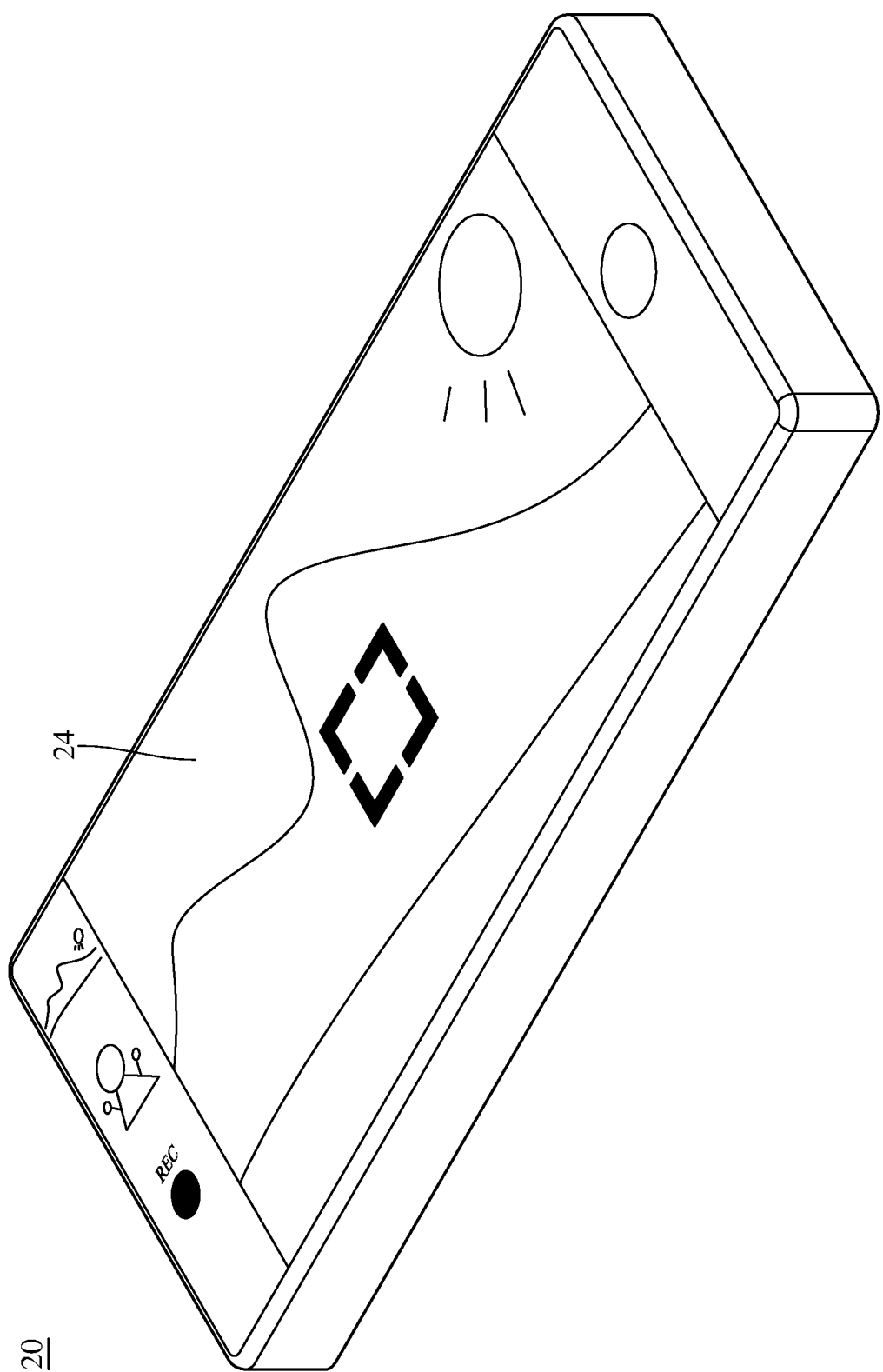
FIG. 31 is another perspective view of the electronic device in FIG. 30.
Figure 32:
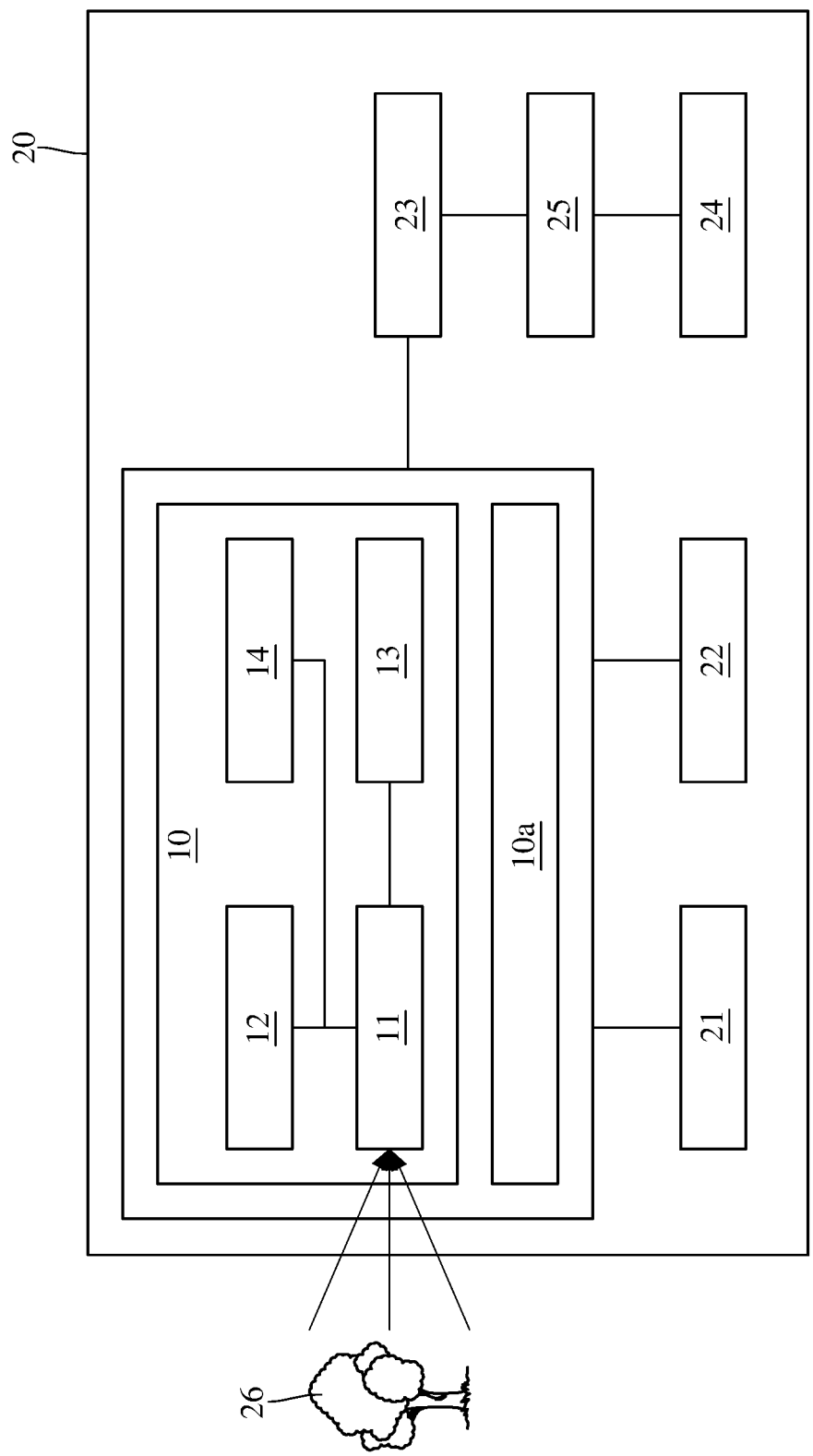
FIG. 32 is a block diagram of the electronic device in FIG. 30.

FIG. 30 is one perspective view of an electronic device according to the 16th embodiment of the present disclosure. FIG. 31 is another perspective view of the electronic device in FIG. 30. FIG. 32 is a block diagram of the electronic device in FIG. 30.

In this embodiment, an electronic device 20 is a smartphone including the image capturing unit 10 disclosed in the 15th embodiment, an image capturing unit 10a, a flash module 21, a focus assist module 22, an image signal processor 23, a user interface 24 and an image software processor 25. The image capturing unit 10 and the image capturing unit 10a face the same direction, and each of the image capturing units 10 and 10a has a single focal point. Furthermore, the image capturing unit 10a has a configuration similar to that of the image capturing unit 10. In detail, the image capturing unit 10a includes a lens unit, a driving device, an image sensor and an image stabilizer, and the lens unit includes a lens system assembly, a barrel and a holder member for holding the lens system assembly.

In this embodiment, the image capturing units 10 and 10a have different fields of view. Specifically, the image capturing unit 10 is a wide-angle image capturing unit, the image capturing unit 10a is a standard image capturing unit, and maximum fields of view of the image capturing units 10 and 10a can differ by at least 30 degrees. Moreover, the maximum fields of view of the image capturing units 10 and 10a can also differ by at least 50 degrees. As such, the electronic device 20 has various magnification ratios so as to meet the requirement of optical zoom functionality. In this embodiment, the electronic device 20 includes multiple image capturing units 10 and 10a, but the present disclosure is not limited to the number and arrangement of image capturing units.

When a user captures images of an object 26, the light rays converge in the image capturing unit 10 or the image capturing unit 10a to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-28 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising seven lens elements, the seven lens elements being, in order from an object side to an image side along an optical path, a first lens element, a second lens element, a third lens element, a fourth lens element, a fifth lens element, a sixth lens element and a seventh lens element;
    wherein the first lens element has negative refractive power, the third lens element with positive refractive power has an image-side surface being convex in a paraxial region thereof, the fifth lens element has an object-side surface being concave in a paraxial region thereof, the sixth lens element has an object-side surface being convex in a paraxial region thereof, the seventh lens element has an image-side surface being concave in a paraxial region thereof, and the image-side surface of the seventh lens element has at least one convex critical point in an off-axis region thereof;
    wherein a sum of axial distances between each of all adjacent lens elements of the photographing optical lens assembly is $\Sigma AT$, an axial distance between the first lens element and the second lens element is T12, an axial distance between the second lens element and the third lens element is T23, an axial distance between the sixth lens element and the seventh lens element is T67, a maximum effective radius of an object-side surface of the first lens element is Y11, a maximum image height of the photographing optical lens assembly is ImgH, an axial distance between the object-side surface of the first lens element and an image surface is TL, and the following conditions are satisfied:

$1.0 < \Sigma AT/(T12+T67) < 3.75;$ $Y11/ImgH < 1.40;$ $TL/ImgH < 3.0;$ and $1.50 < T12/T23.$ 2. The photographing optical lens assembly of claim 1, wherein the object-side surface of the sixth lens element has at least one concave critical point in an off-axis region thereof.

3. The photographing optical lens assembly of claim 1, wherein the sum of axial distances between each of all adjacent lens elements of the photographing optical lens assembly is $\Sigma AT$, the axial distance between the first lens element and the second lens element is T12, the axial distance between the sixth lens element and the seventh lens element is T67, and the following condition is satisfied:

$1.0 < \Sigma AT/(T12+T67) < 2.0.$

4. The photographing optical lens assembly of claim 1, wherein the seventh lens element has an object-side surface being convex in a paraxial region thereof.

5. The photographing optical lens assembly of claim 1, wherein the maximum effective radius of the object-side surface of the first lens element is Y11, the maximum image height of the photographing optical lens assembly is ImgH, and the following condition is satisfied:

$0.50 < Y11/ImgH < 1.25.$

6. The photographing optical lens assembly of claim 1, wherein the object-side surface of the first lens element is concave in a paraxial region thereof, the object-side surface of the first lens element has at least one convex critical point in an off-axis region thereof, a curvature radius of the object-side surface of the first lens element is R1, a curvature radius of an image-side surface of the first lens element is R2, and the following condition is satisfied:

$-1.50 < (R1+R2)/(R1-R2) < 0.75.$

7. The photographing optical lens assembly of claim 1, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following conditions are satisfied:

$|f1/f2| < 1.0;$ $|f3/f2| < 1.0;$ $|f4/f2| < 1.0;$ $|f5/f2| < 1.0;$ and $|f6/f2| < 1.0.$ 8. The photographing optical lens assembly of claim 1, wherein an axial distance between an object-side surface of the second lens element and an image-side surface of the sixth lens element is Dr3r12, the axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following condition is satisfied:

$4.0 < Dr3r12/(T23+T34+T45+T56)$.

9. The photographing optical lens assembly of claim 1, wherein an f-number of the photographing optical lens assembly is Fno, the axial distance between the object-side surface of the first lens element and the image surface is TL, the maximum image height of the photographing optical lens assembly is ImgH, a maximum field of view of the photographing optical lens assembly is FOV, and the following conditions are satisfied:

$1.20 < Fno < 2.60$;

$0.80 < TL/ImgH < 2.40$; and $100 \text{ [deg.]} < FOV < 160 \text{ [deg.]}$.

10. The photographing optical lens assembly of claim 1, wherein an Abbe number of the second lens element is V2, an Abbe number of the fifth lens element is V5, an Abbe number of the seventh lens element is V7, a maximum value among refractive indices of all lens elements of the photographing optical lens assembly is Nmax, and the following conditions are satisfied:

$30 < V2+V5+V7 < 85$; and $Nmax \leq 1.73$.

11. The photographing optical lens assembly of claim 1, wherein the fifth lens element has an image-side surface having at least one critical point in an off-axis region thereof.

12. The photographing optical lens assembly of claim 1, wherein an Abbe number of the seventh lens element is V7, and the following condition is satisfied:

$V7 < 30$.

13. The photographing optical lens assembly of claim 1, wherein a maximum effective radius of the image-side surface of the seventh lens element is Y72, a focal length of the photographing optical lens assembly is f, and the following condition is satisfied:

$1.0 < Y72/f < 2.0$.

14. The photographing optical lens assembly of claim 1, wherein a central thickness of the second lens element is CT2, an axial distance between the image-side surface of the seventh lens element and the image surface is BL, and the following condition is satisfied:

$0.50 < CT2/BL < 1.50$.

15. An image capturing unit, comprising:
the photographing optical lens assembly of claim 1; and
an image sensor disposed on the image surface of the photographing optical lens assembly.

16. An electronic device, comprising:
the image capturing unit of claim 15.

17. An electronic device, comprising at least two image capturing units, wherein the at least two image capturing units face a same direction, the at least two image capturing units comprises the image capturing unit of claim 15, and maximum fields of view of the at least two image capturing units differ by at least 30 degrees.

18. A photographing optical lens assembly comprising seven lens elements, the seven lens elements being, in order from an object side to an image side along an optical path, a first lens element, a second lens element, a third lens element, a fourth lens element, a fifth lens element, a sixth lens element and a seventh lens element;
wherein the first lens element has negative refractive power, the third lens element with positive refractive power has an image-side surface being convex in a paraxial region thereof, the fifth lens element with negative refractive power has an object-side surface being concave in a paraxial region thereof, the sixth lens element has positive refractive power, the seventh lens element has an image-side surface being concave in a paraxial region thereof, and the image-side surface of the seventh lens element has at least one convex critical point in an off-axis region thereof;
wherein a sum of axial distances between each of all adjacent lens elements of the photographing optical lens assembly is ΣAT, an axial distance between the first lens element and the second lens element is T12, an axial distance between the sixth lens element and the seventh lens element is T67, a maximum effective radius of an object-side surface of the first lens element is Y11, a maximum image height of the photographing optical lens assembly is ImgH, an axial distance between the object-side surface of the first lens element and an image surface is TL, and the following conditions are satisfied:

$1.0 < \Sigma AT/(T12+T67) < 1.80$;

$Y11/ImgH < 1.40$; and $TL/ImgH < 3.0$.

19. The photographing optical lens assembly of claim 18, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the i-th lens element is Ni, at least two lens elements of the photographing optical lens assembly satisfy the following condition:

$5.0 < Vi/Ni < 12.0$, wherein $i=1, 2, 3, 4, 5, 6$ or $7$.

20. The photographing optical lens assembly of claim 18, wherein a maximum effective radius of the image-side surface of the seventh lens element is Y72, an axial distance between the image-side surface of the seventh lens element and the image surface is BL, and the following condition is satisfied:

$1.5 < Y72/BL < 5.0$.

21. The photographing optical lens assembly of claim 18, wherein the sum of axial distances between each of all adjacent lens elements of the photographing optical lens assembly is ΣAT, the axial distance between the first lens element and the second lens element is T12, the axial distance between the sixth lens element and the seventh lens element is T67, and the following condition is satisfied:

$$1.0 < \Sigma AT/(T12+T67) < 1.60.$$

22. The photographing optical lens assembly of claim 18, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following conditions are satisfied:

$$|f1/f2| < 1.0;$$

$$|f3/f2| < 1.0;$$

$$|f4/f2| < 1.0;$$

$$|f5/f2| < 1.0; \text{ and}$$

$$|f6/f2| < 1.0.$$

23. The photographing optical lens assembly of claim 18, wherein the maximum effective radius of the object-side surface of the first lens element is Y11, a maximum effective radius of the image-side surface of the seventh lens element is Y72, and the following condition is satisfied:

$$0.50 < Y11/Y72 < 1.30.$$

24. The photographing optical lens assembly of claim 18, wherein an Abbe number of the second lens element is V2, an Abbe number of the fifth lens element is V5, an Abbe number of the seventh lens element is V7, a maximum value among refractive indices of all lens elements of the photographing optical lens assembly is Nmax, and the following conditions are satisfied:

$$30 < V2+V5+V7 < 85; \text{ and}$$

$$N\max \leq 1.73.$$

25. The photographing optical lens assembly of claim 18, wherein a focal length of the sixth lens element is f6, a focal length of the seventh lens element is f7, and the following condition is satisfied:

$$f6/f7 < 0.30.$$

26. A photographing optical lens assembly comprising seven lens elements, the seven lens elements being, in order from an object side to an image side along an optical path, a first lens element, a second lens element, a third lens element, a fourth lens element, a fifth lens element, a sixth lens element and a seventh lens element;
   wherein the first lens element has negative refractive power, the third lens element with positive refractive power has an object-side surface being convex in a paraxial region thereof and an image-side surface being convex in a paraxial region thereof, the fifth lens element has negative refractive power, the sixth lens element has positive refractive power, the seventh lens element has an image-side surface being concave in a paraxial region thereof, and the image-side surface of the seventh lens element has at least one convex critical point in an off-axis region thereof;
   wherein a sum of axial distances between each of all adjacent lens elements of the photographing optical lens assembly is ΣAT, an axial distance between the first lens element and the second lens element is T12, an axial distance between the sixth lens element and the seventh lens element is T67, a maximum effective radius of an object-side surface of the first lens element is Y11, a maximum image height of the photographing optical lens assembly is ImgH, an axial distance between the object-side surface of the first lens element and an image surface is TL, a curvature radius of an object-side surface of the sixth lens element is R11, a curvature radius of an image-side surface of the sixth lens element is R12, and the following conditions are satisfied:

$$1.0 < \Sigma AT/(T12+T67) < 1.80;$$

$$Y11/\text{Img}H < 1.40;$$

$$TL/\text{Img}H < 3.0; \text{ and}$$

$$(R11+R12)/(R11-R12) < 0.$$

27. The photographing optical lens assembly of claim 26, wherein the curvature radius of the object-side surface of the sixth lens element is R11, the curvature radius of the image-side surface of the sixth lens element is R12, and the following condition is satisfied:

$$-2.0 < (R11+R12)/(R11-R12) < 0.$$

28. The photographing optical lens assembly of claim 26, wherein a central thickness of the second lens element is CT2, an axial distance between the image-side surface of the seventh lens element and the image surface is BL, and the following condition is satisfied:

$$0.50 < CT2/BL < 1.50.$$

29. The photographing optical lens assembly of claim 26, wherein the object-side surface of the first lens element is concave in a paraxial region thereof, the object-side surface of the first lens element has at least one convex critical point in an off-axis region thereof, a curvature radius of the object-side surface of the first lens element is R1, a curvature radius of an image-side surface of the first lens element is R2, and the following condition is satisfied:

$$-1.50 < (R1+R2)/(R1-R2) < 0.75.$$

30. The photographing optical lens assembly of claim 26, wherein the object-side surface of the sixth lens element has at least one concave critical point in an off-axis region thereof.

31. The photographing optical lens assembly of claim 26, wherein an Abbe number of the second lens element is V2, an Abbe number of the fifth lens element is V5, an Abbe number of the seventh lens element is V7, a maximum value among refractive indices of all lens elements of the photographing optical lens assembly is Nmax, and the following conditions are satisfied:

$$30 < V2+V5+V7 < 85; \text{ and}$$

$$N\max \leq 1.73.$$

32. An image capturing unit, comprising:
   the photographing optical lens assembly of claim 26; and
   an image sensor disposed on the image surface of the photographing optical lens assembly.

33. An electronic device, comprising:
   the image capturing unit of claim 32.

* * * * *